INVENTOR.
JOHN MUELLER, DECEASED
ANNA WHITTAKER, ADMR' X.
BY *J. L. Sterling*
ATTORNEY

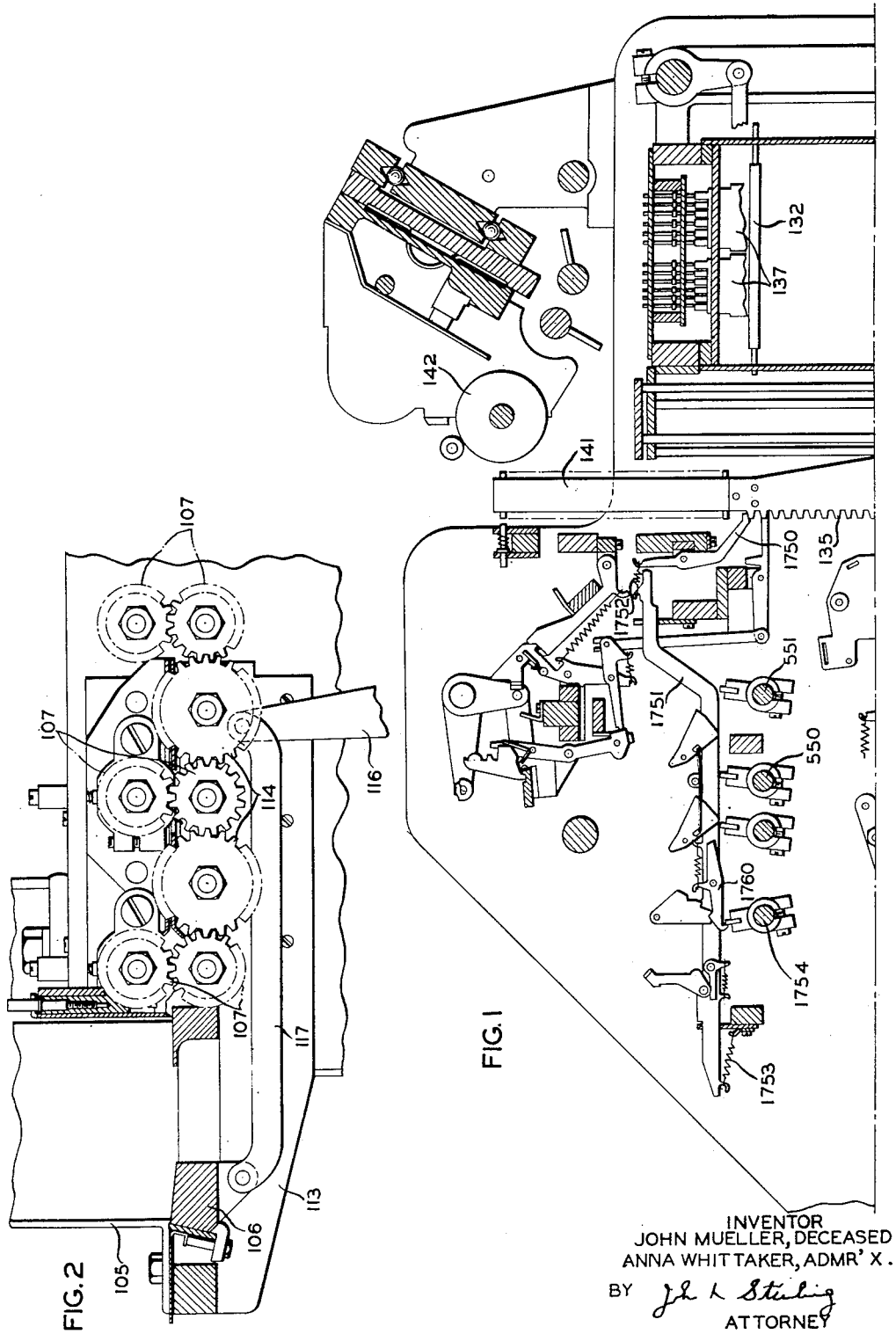

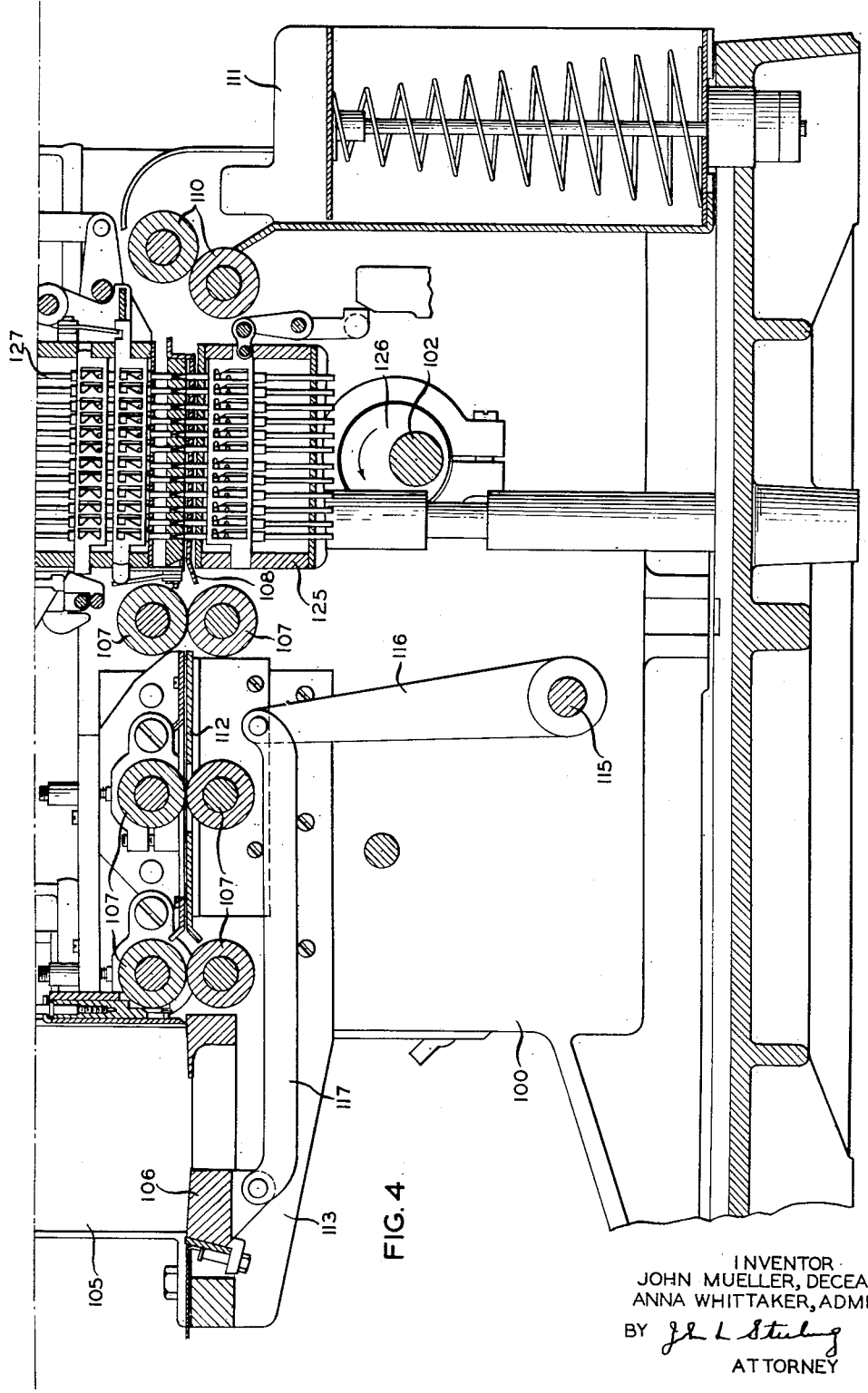

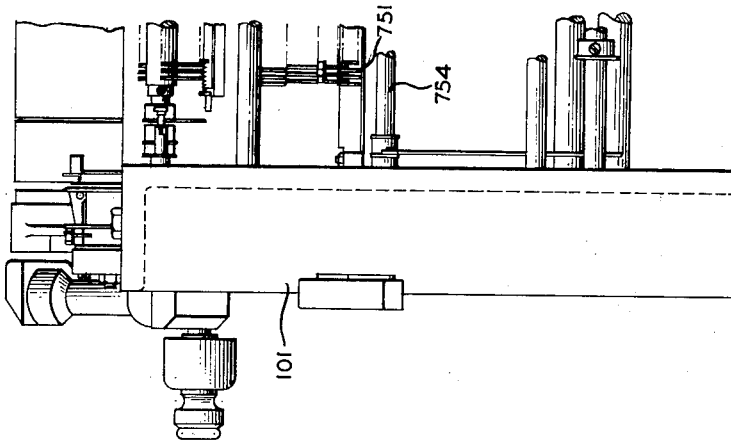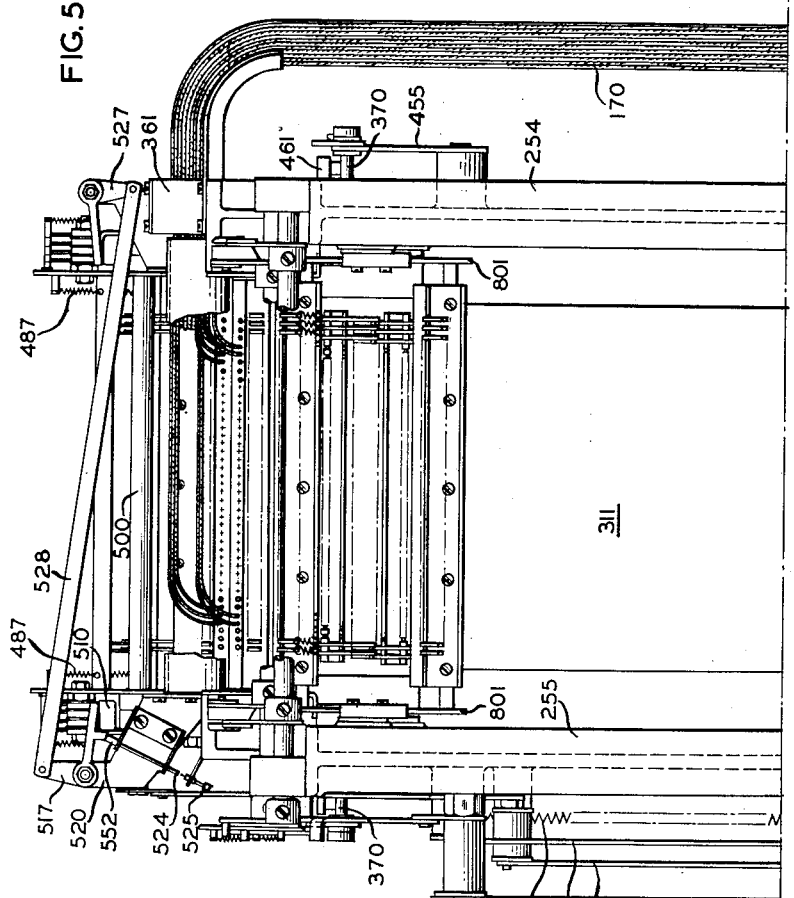

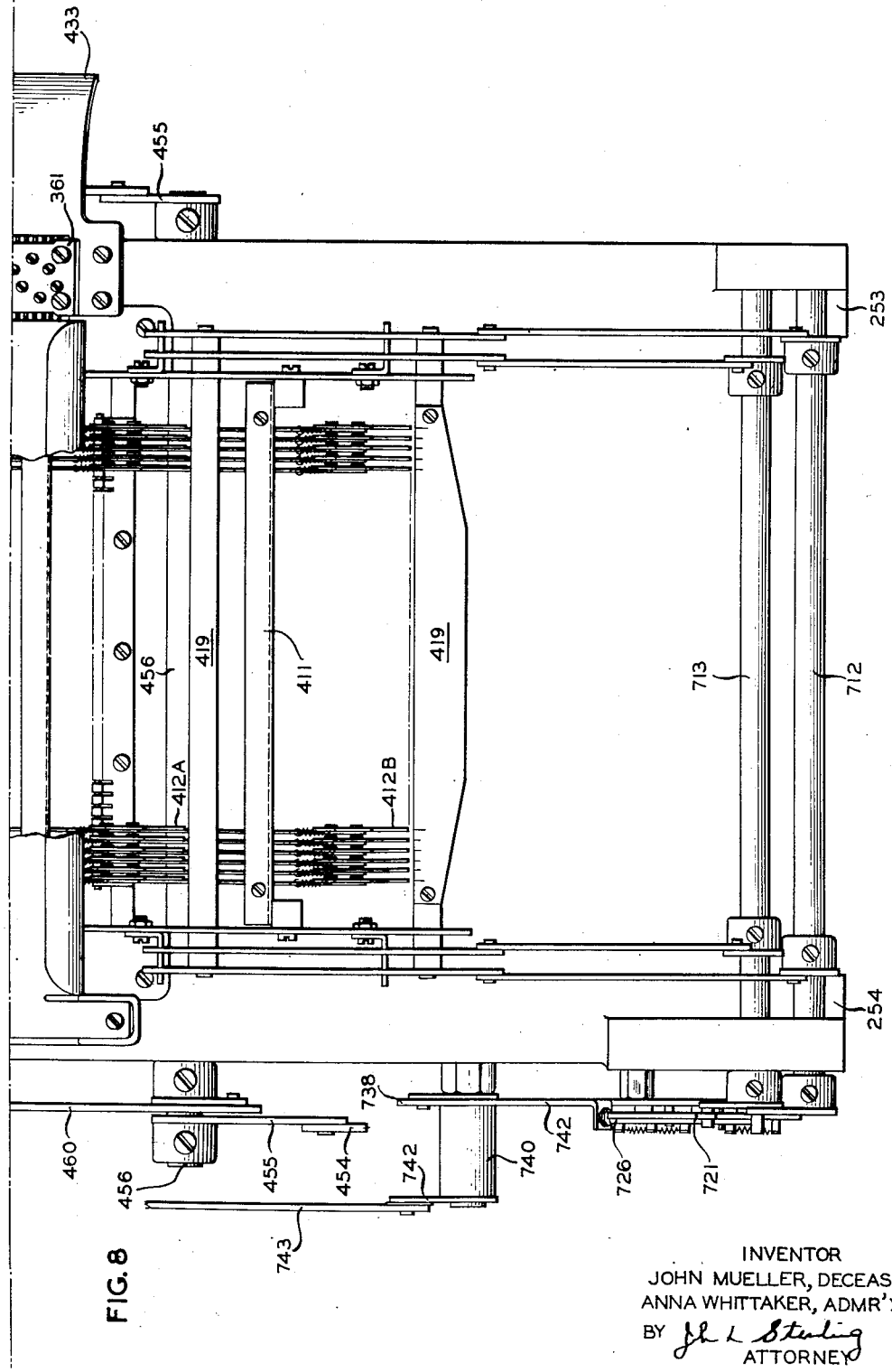

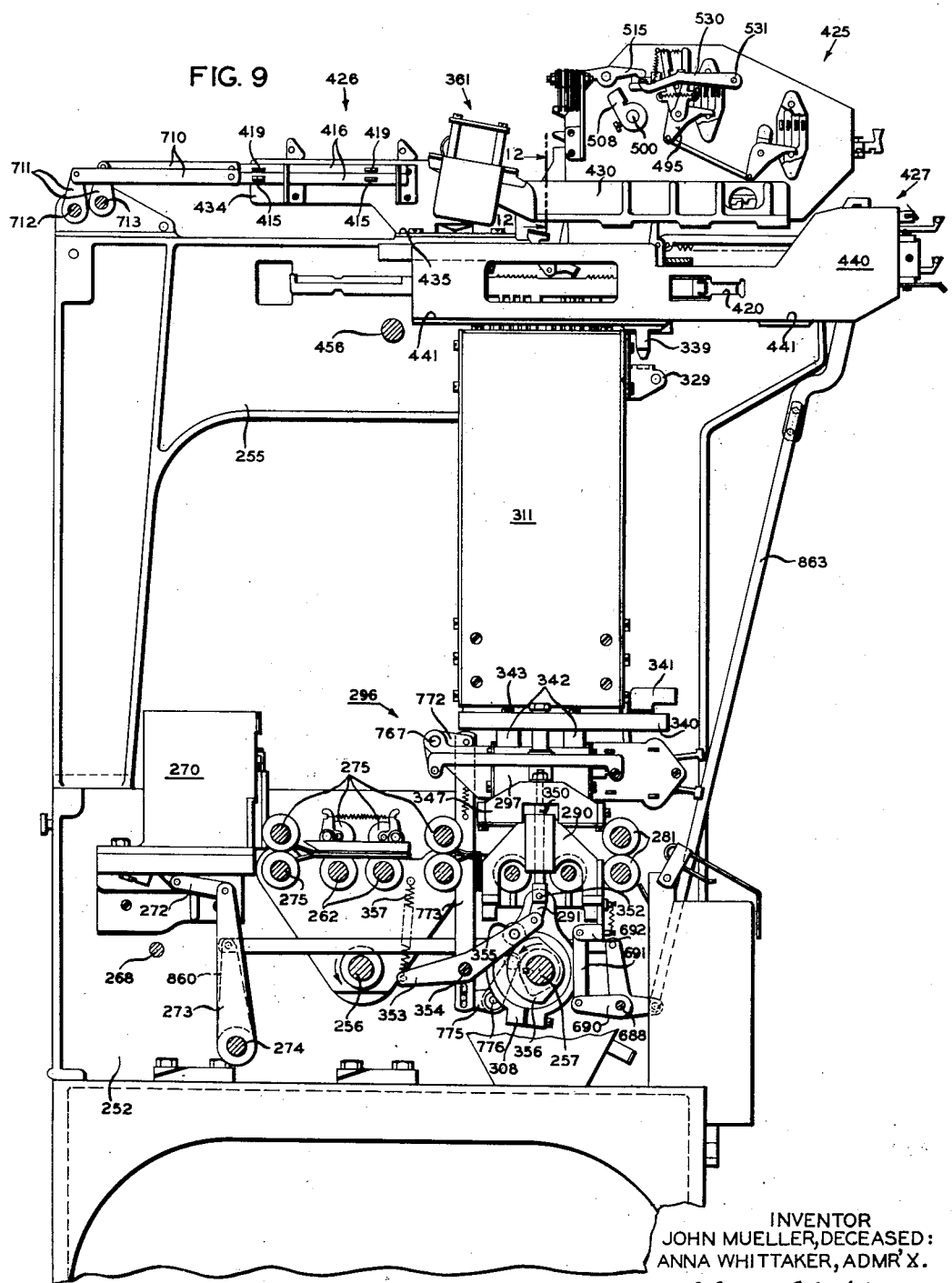

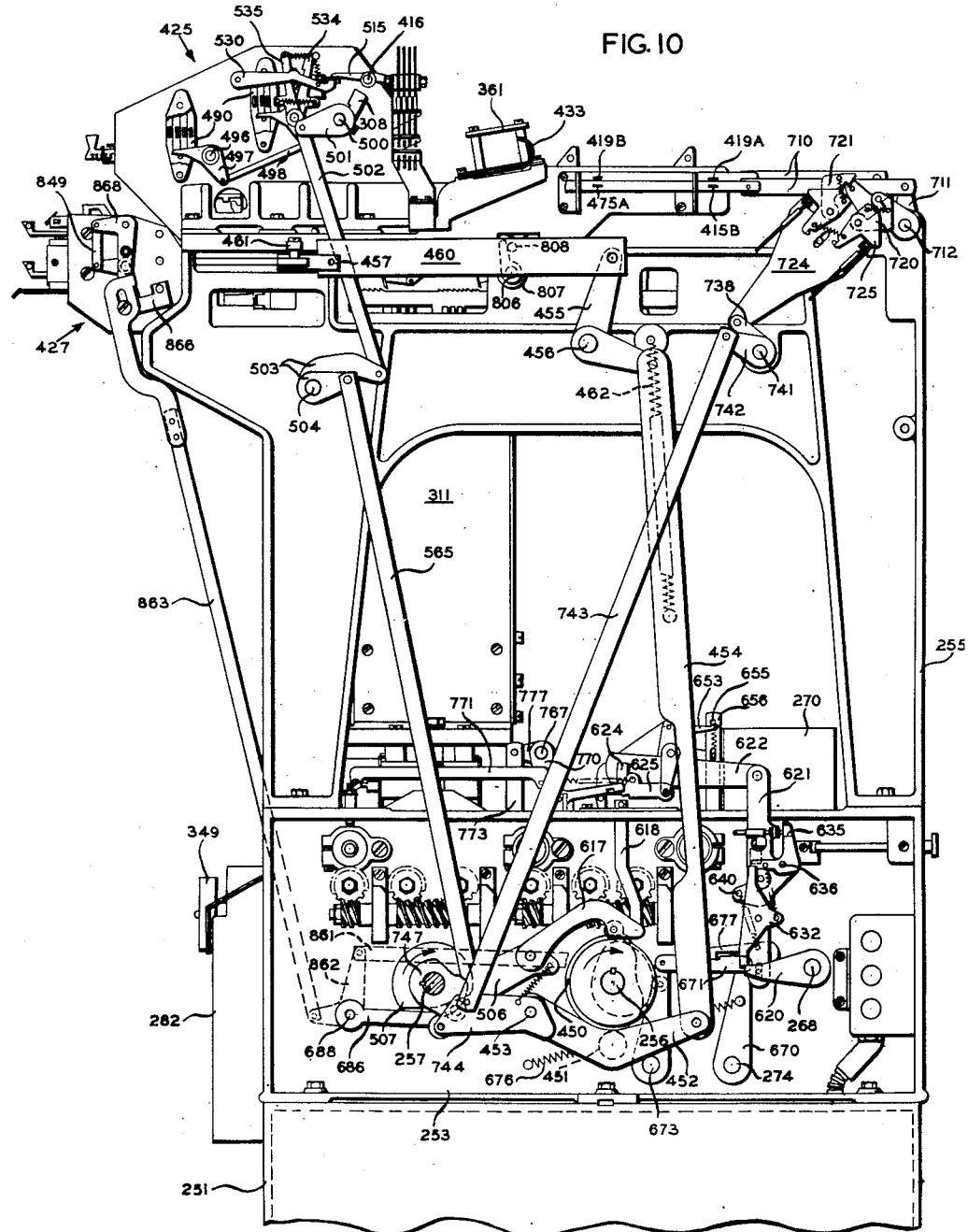

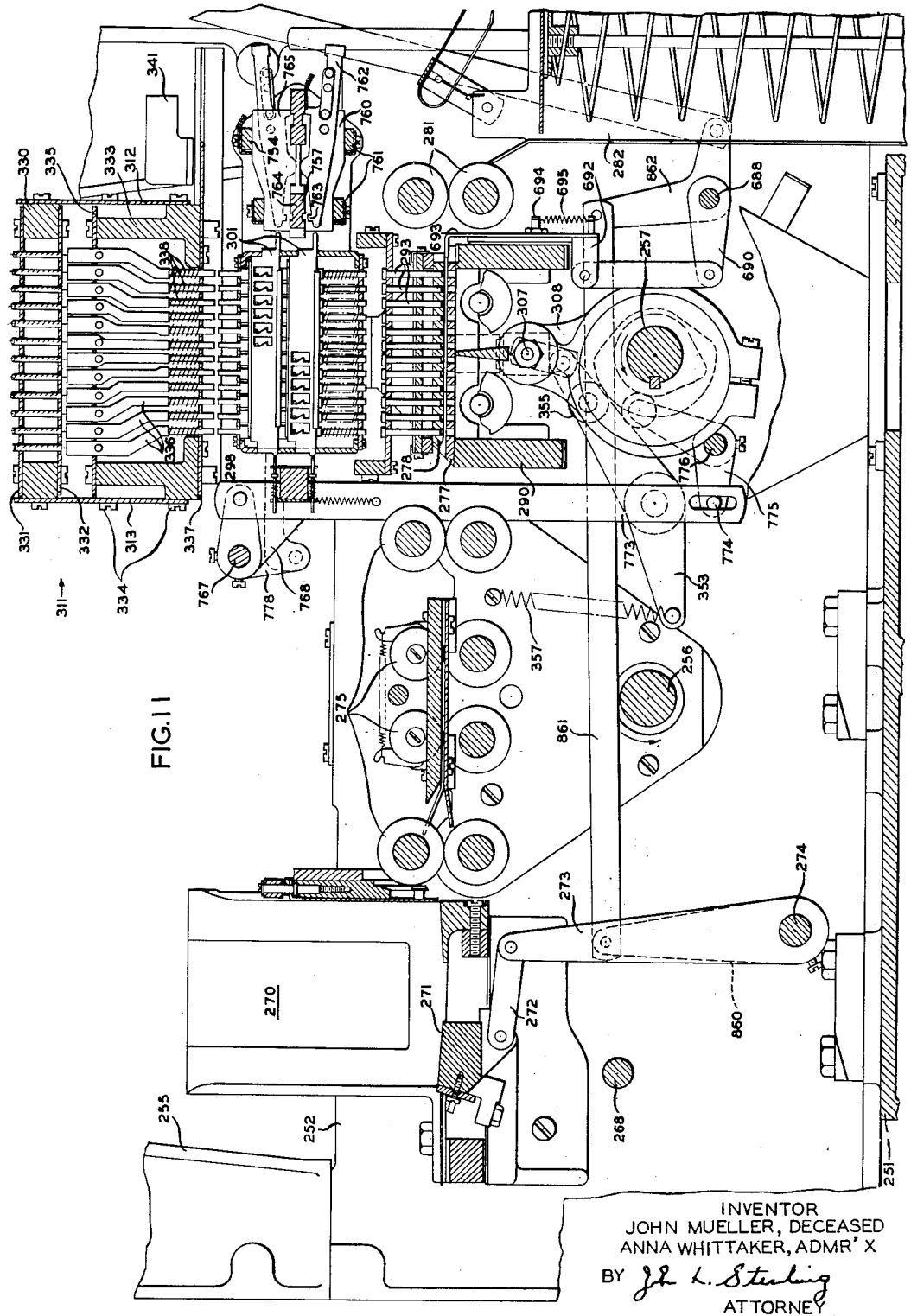

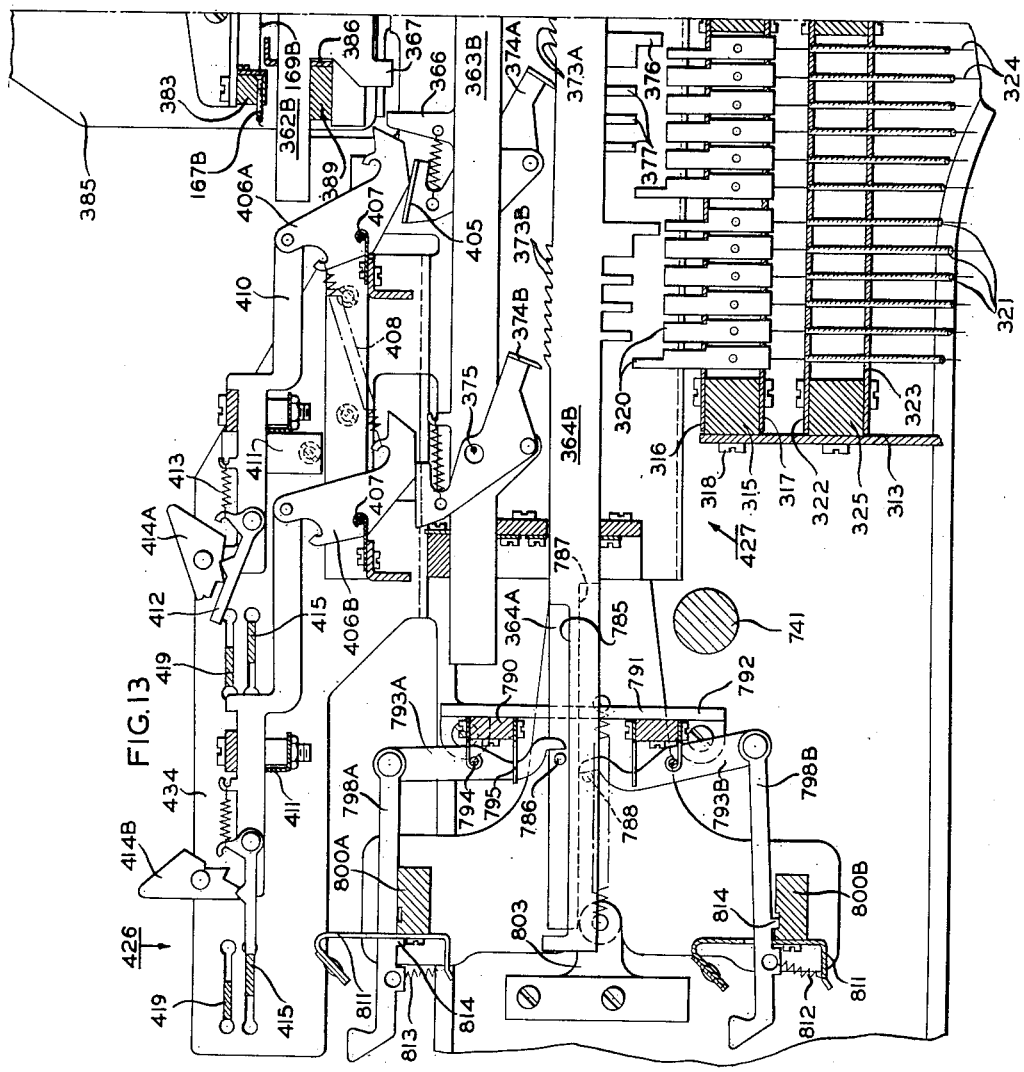
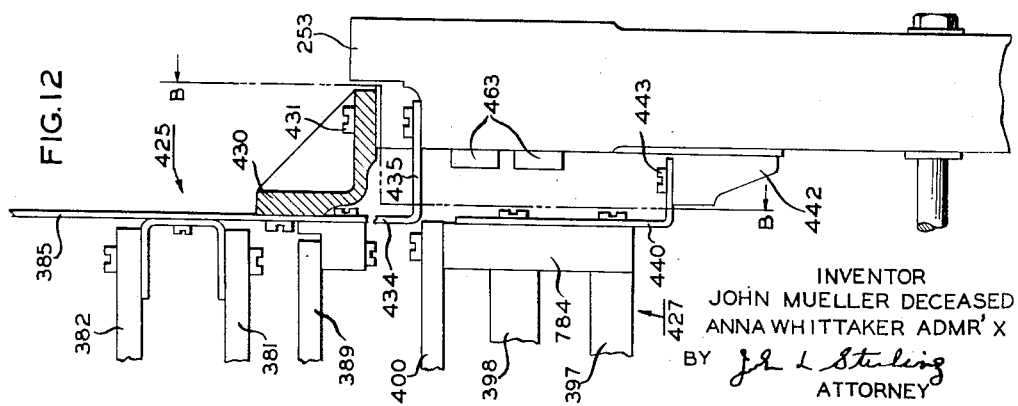

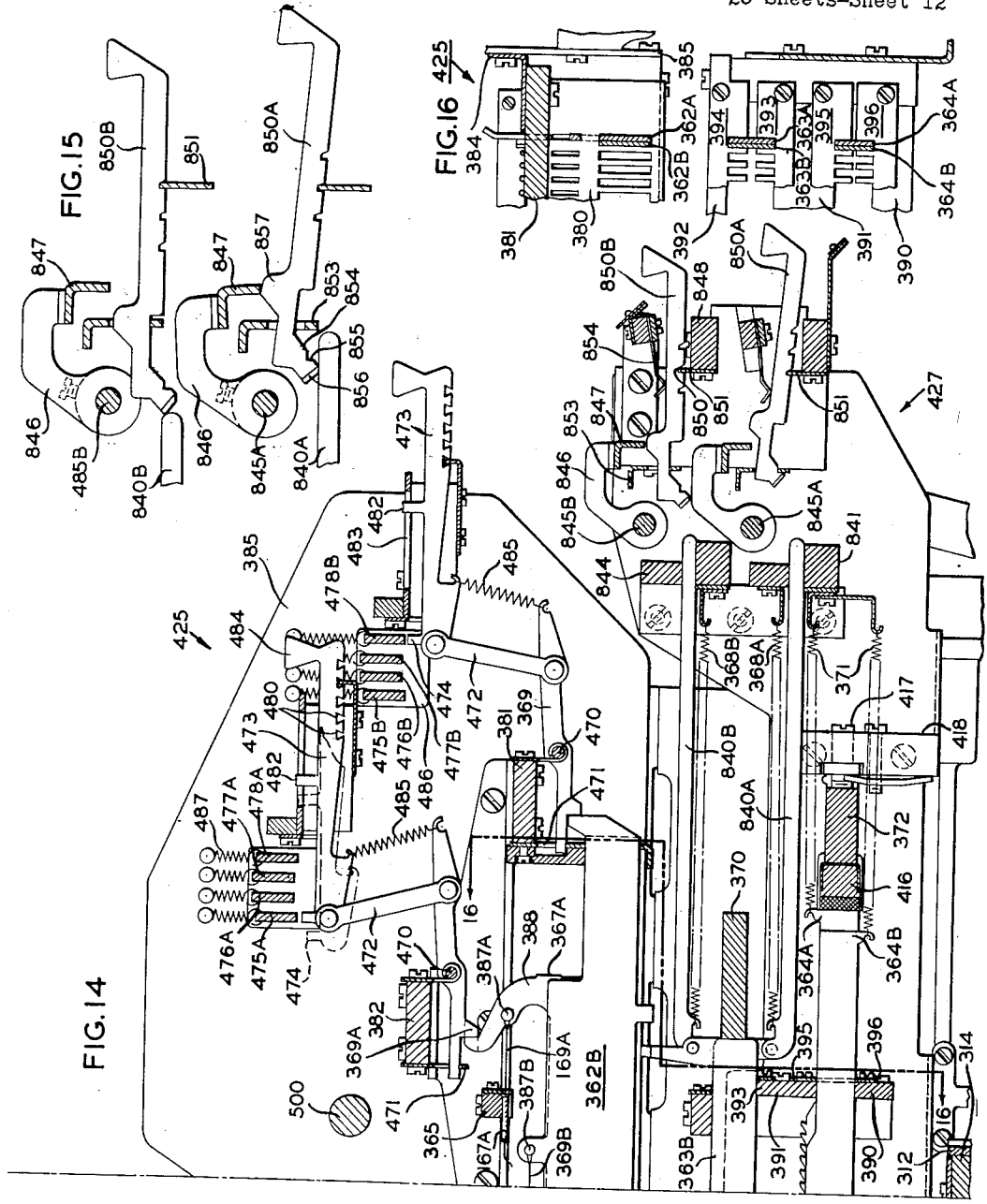

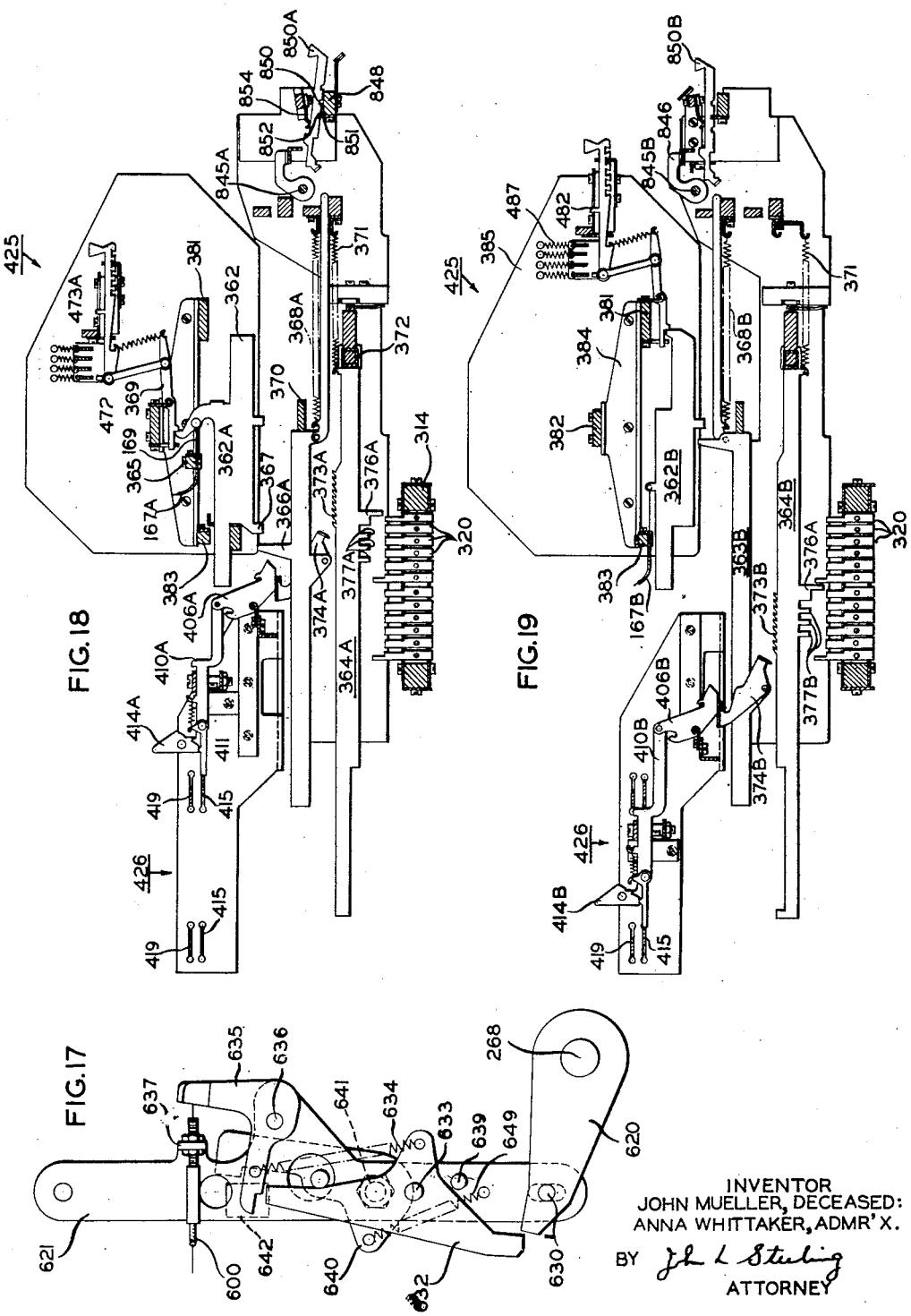

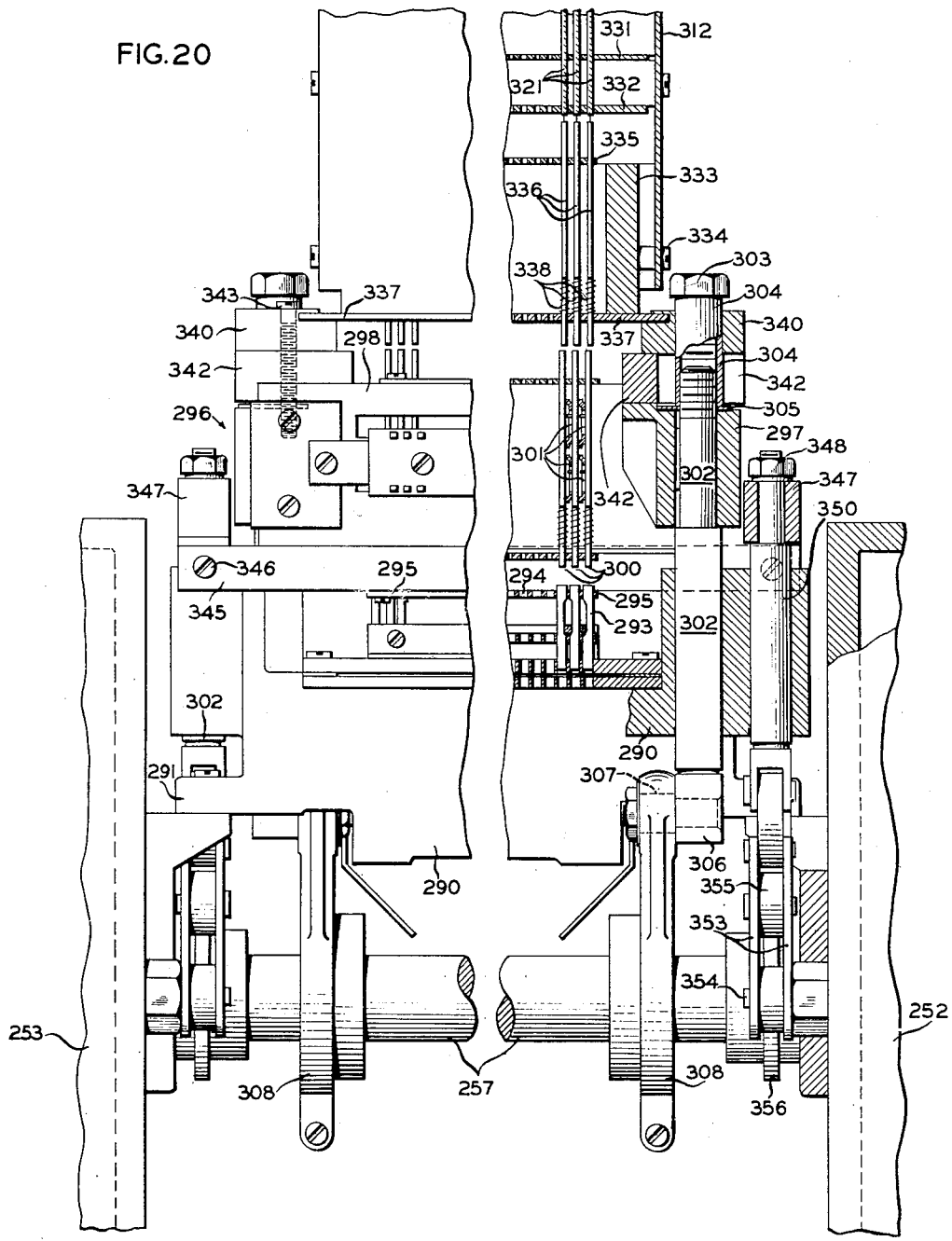

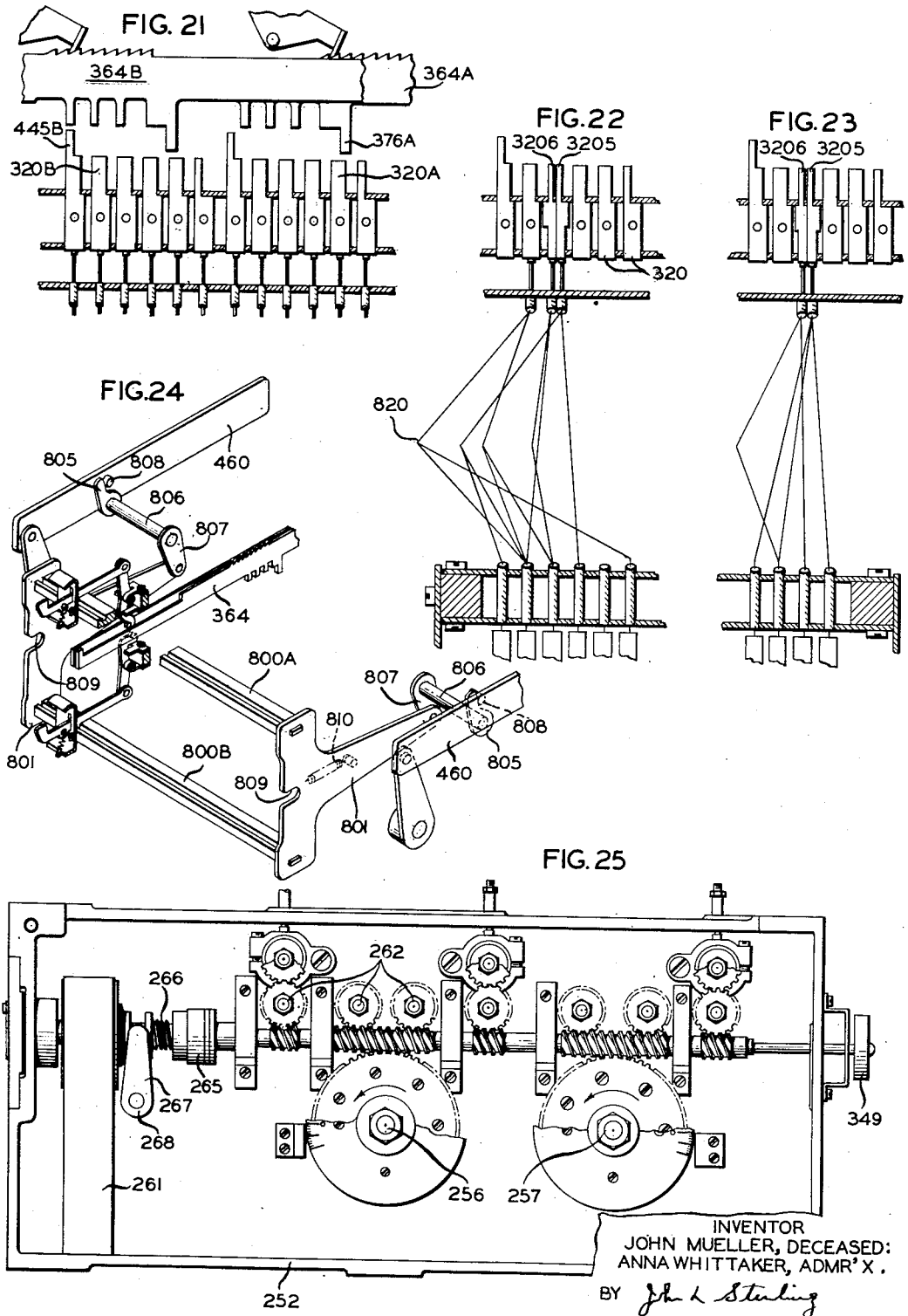

Jan. 1, 1952 J. MUELLER 2,580,693
COMBINED TABULATOR AND SUMMARY PUNCH
Filed June 10, 1948 25 Sheets-Sheet 16

INVENTOR.
JOHN MUELLER, DECEASED:
ANNA WHITTAKER, ADMR'X.

BY *John L. Sterling*
ATTORNEY

Jan. 1, 1952   J. MUELLER   2,580,693
COMBINED TABULATOR AND SUMMARY PUNCH
Filed June 10, 1948   25 Sheets-Sheet 18

*INVENTOR.*
JOHN MUELLER, DECEASED:
ANNA WHITTAKER, ADMR'X.

BY
ATTORNEY

Jan. 1, 1952 J. MUELLER 2,580,693
COMBINED TABULATOR AND SUMMARY PUNCH
Filed June 10, 1948 25 Sheets-Sheet 19
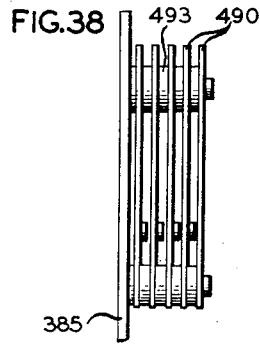
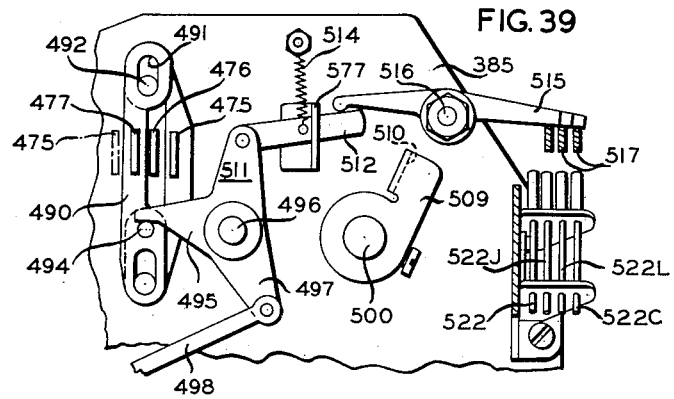
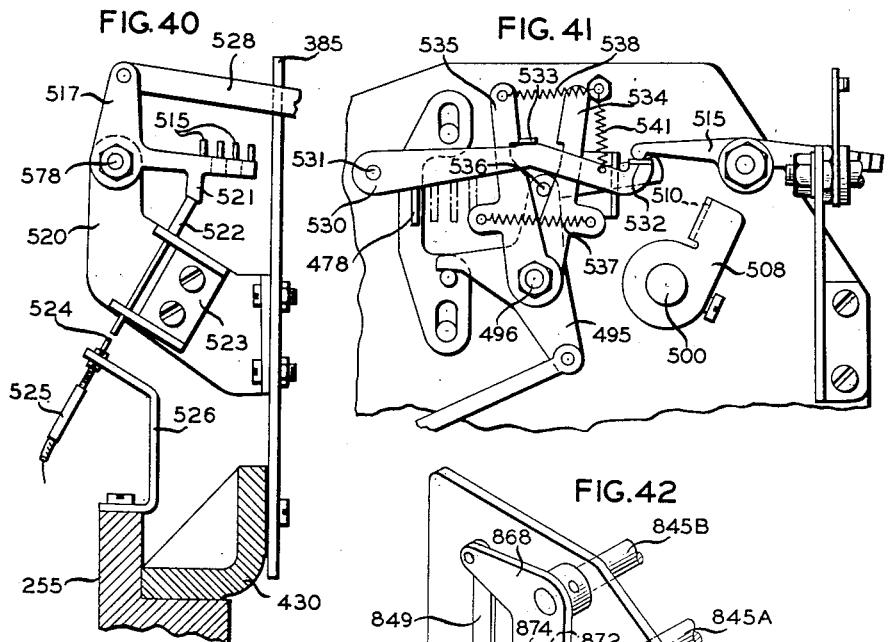
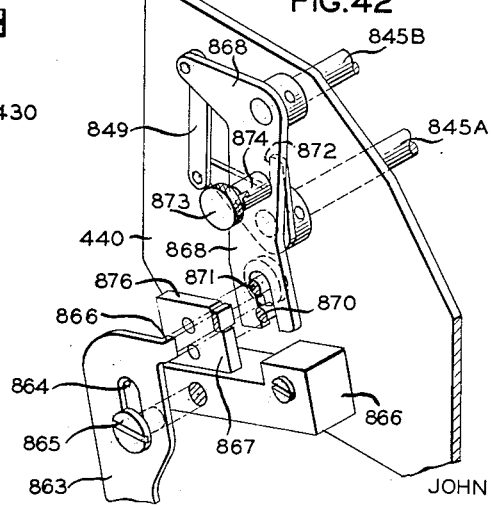
*INVENTOR.*
JOHN MUELLER, DECEASED:
ANNA WHITTAKER, ADMR'X.
BY *J. L. Sterling*
ATTORNEY

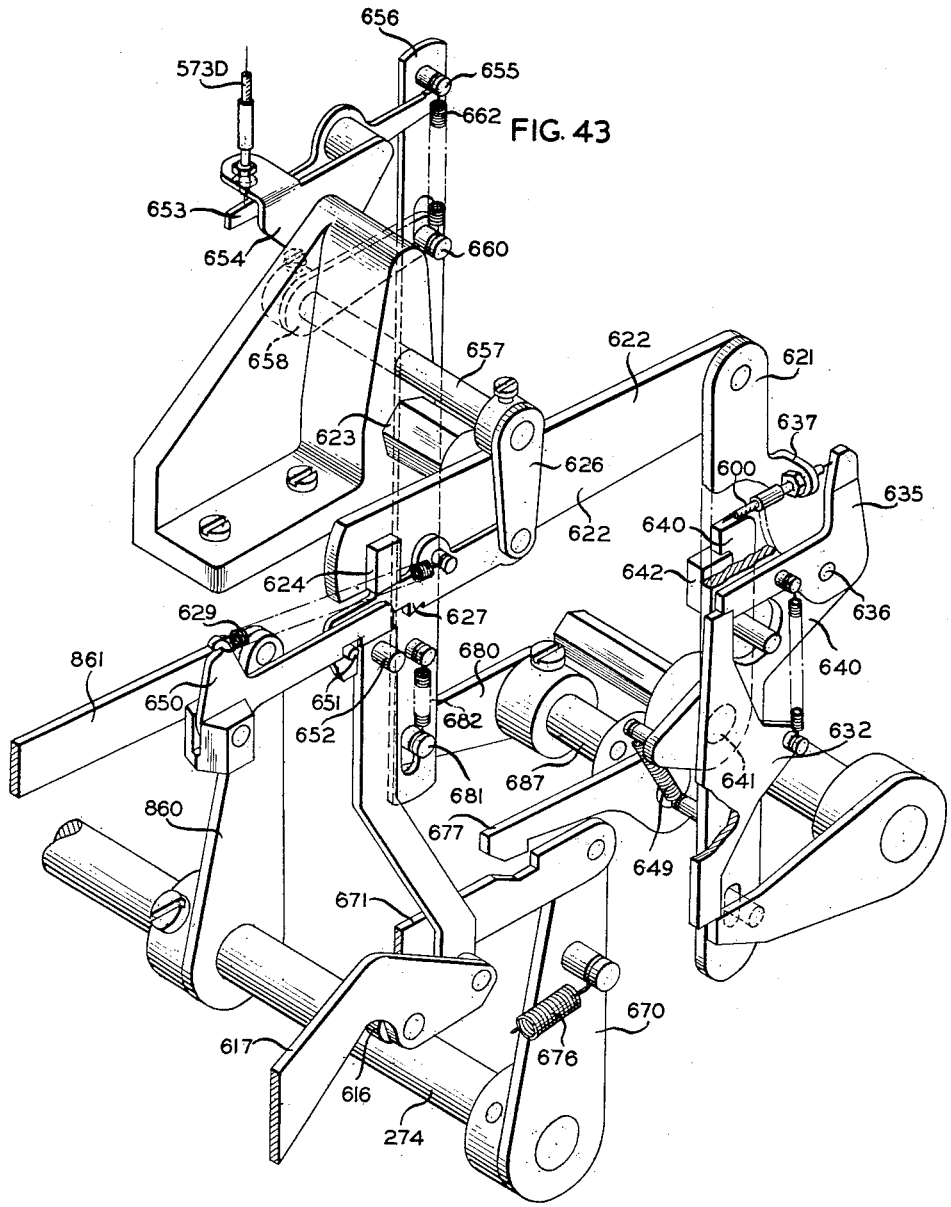

Jan. 1, 1952  J. MUELLER  2,580,693
COMBINED TABULATOR AND SUMMARY PUNCH
Filed June 10, 1948  25 Sheets-Sheet 21
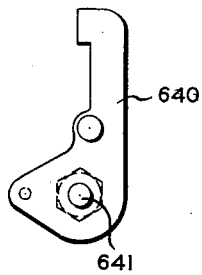
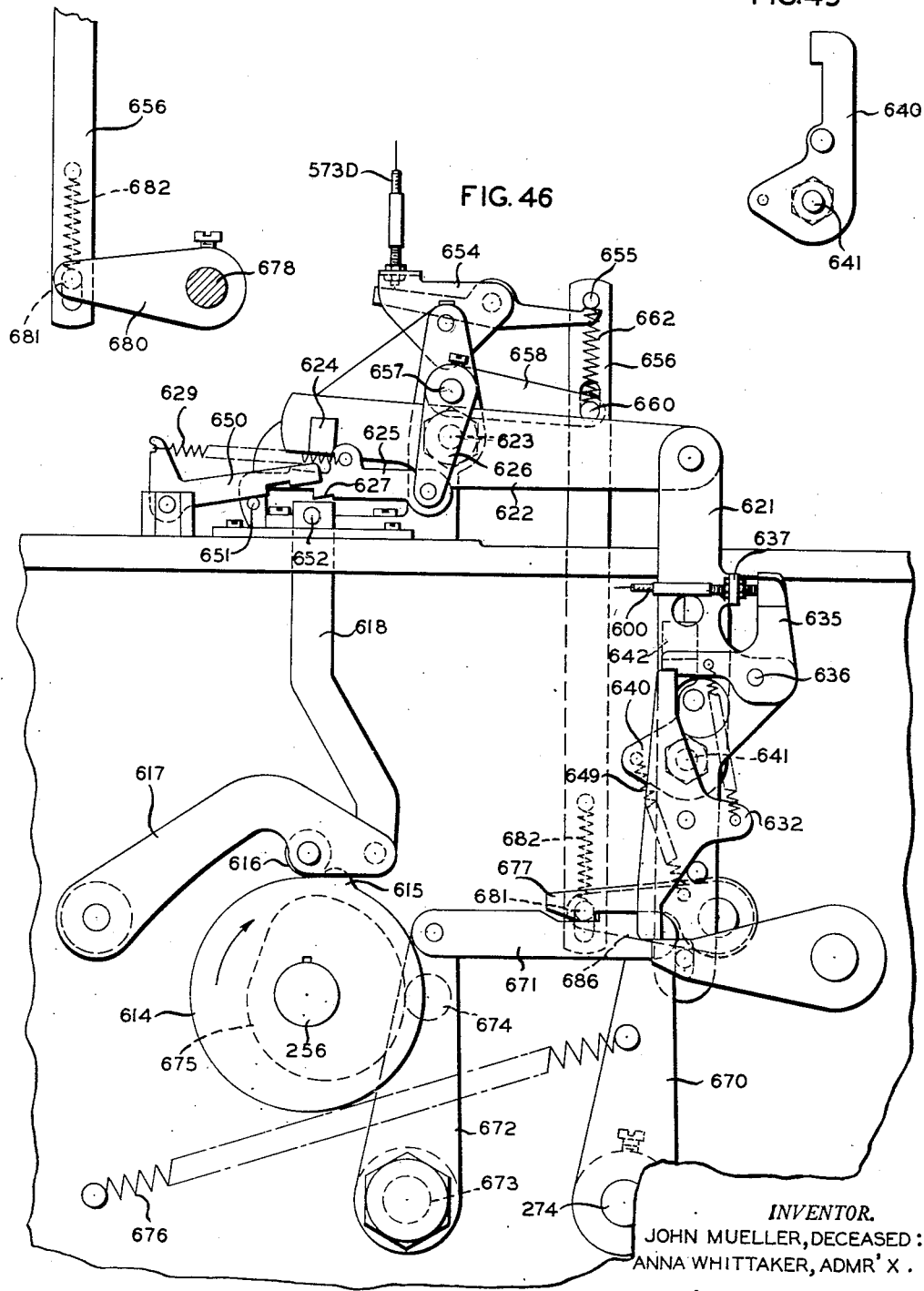
INVENTOR.
JOHN MUELLER, DECEASED:
ANNA WHITTAKER, ADMR'X.
BY *JL L Sterling*
ATTORNEY

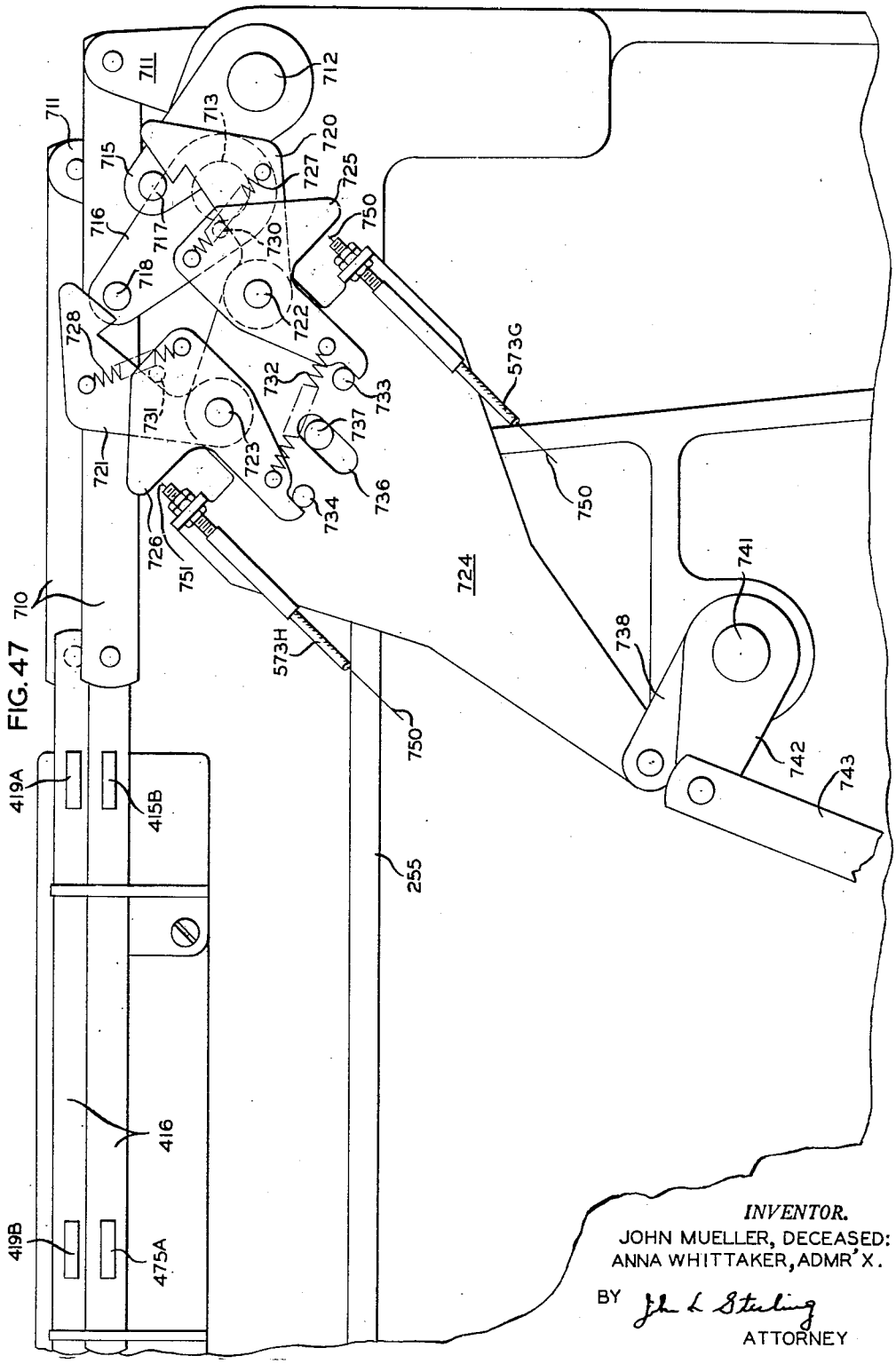

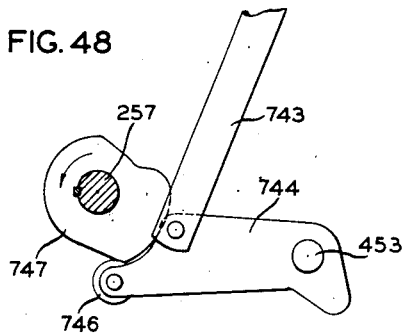
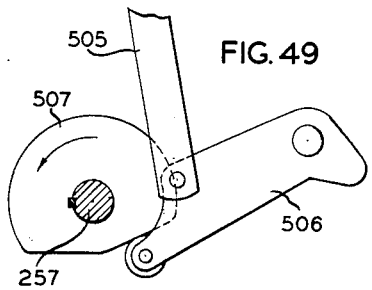
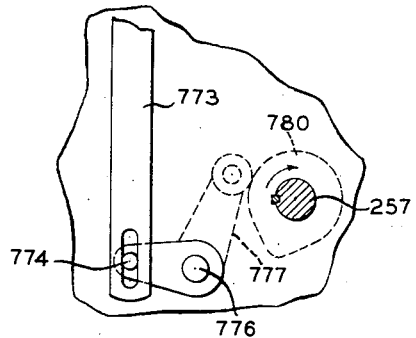
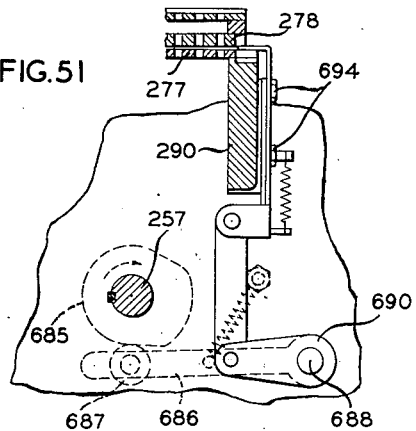
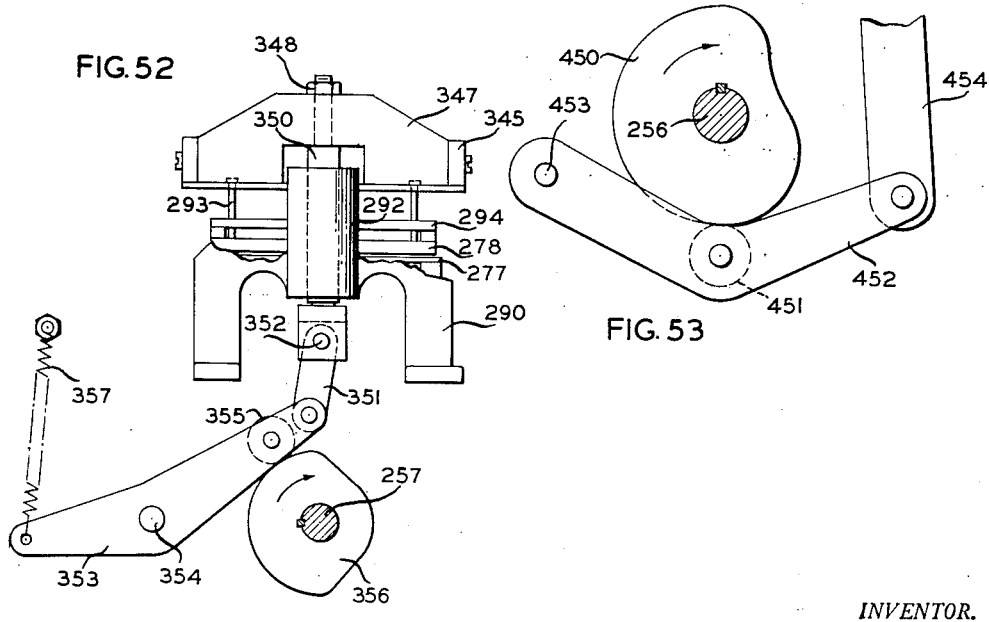

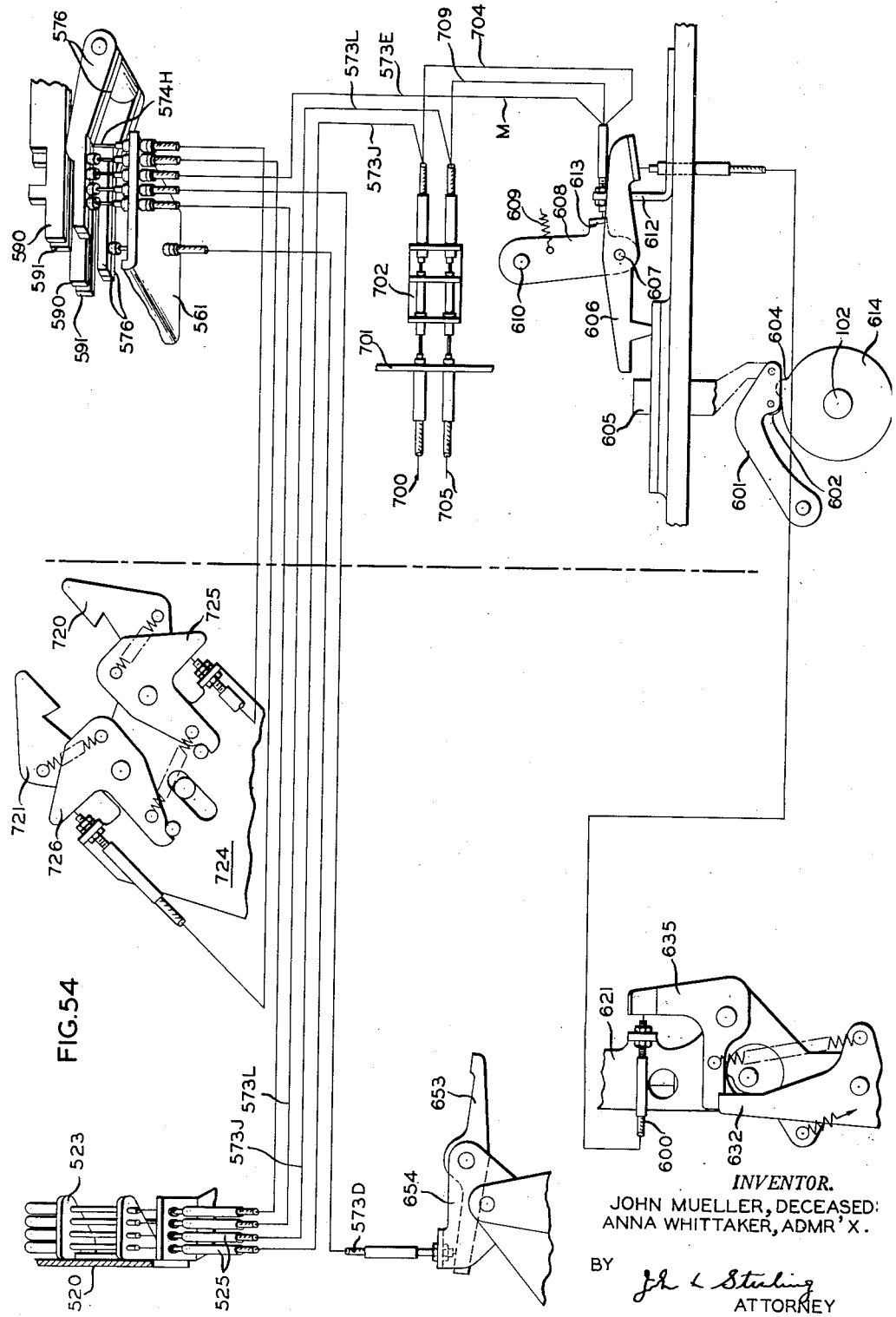

Jan. 1, 1952  J. MUELLER  2,580,693
COMBINED TABULATOR AND SUMMARY PUNCH
Filed June 10, 1948  25 Sheets-Sheet 25

*INVENTOR.*
JOHN MUELLER, DECEASED;
ANNA WHITTAKER, ADMR'X.
BY J. L. Sterling
ATTORNEY Patented Jan. 1, 1952

2,580,693

UNITED STATES PATENT OFFICE 2,580,693

COMBINED TABULATOR AND
SUMMARY PUNCH

John Mueller, deceased, late of North Bergen, N. J., by Anna Whittaker, administratrix, North Bergen, N. J., assignor to Remington Rand Inc., New York, N. Y., a corporation of Delaware Application June 10, 1948, Serial No. 32,156

53 Claims. (Cl. 235—61.1)

The invention relates to record controlled accounting and statistical machines, and more particularly to what is called herein a combined tabulator and summary punch. By a summary punch is meant mechanism to punch, usually in a card, matter or data being tabulated in a tabulating machine, such data consisting of totals accumulated by the tabulator or data taken from cards being tabulated or, and usually, both.

Some of the features of the invention are applicable or adaptable to other purposes, not necessarily consisting of punching.

The invention has for its primary object to provide an improved machine of the general character indicated.

One object of the invention is to provide improved differential set-up mechanism on which data from the tabulating machine is stored in one cycle to be punched at a subsequent cycle, usually in combination with other data introduced from the tabulator in the meantime. This set-up or storage mechanism is capable of retaining a set-up for a plurality of punch cycles, and it can also be set up so as to be retained indefinitely, some matter being punched in all of a series of summary cards.

One object of the invention is to provide for punching data taken directly from the cards being tabulated, without first adding such data into an accumulator.

It is an object of the invention to make the summary punch mechanism with a high degree of flexibility, that is to say, so that the operator may pre-set the machine to secure different modes of operation and different results. The operator may pre-set the mechanism so as to set up certain data in one selected field thereof and certain other data in another selected field thereof for one run of cards, and by a simple hand setting, change the arrangement and disposition of the matter for another run of cards. In the preferred machine illustrated in the drawing, this selectability of fields has been carried to the extent that each denominational section of the punch set-up mechanism is individually pre-settable to be brought into action at different times and for different purposes.

Another object of the invention is to provide for various special features. For example, means are provided hand settable to cause zeroes to be punched in a selected field of the card or not, as desired. Means are provided hand settable to the effect that if in a certain field nothing is to be punched, as, for example, in the total field in case a balance happens to be zero, then no card will be punched at all.

Means are provided to lock out any field of the mechanism that is not be used on a particular run of cards, and in the preferred machine any individual denominational unit of the set-up mechanism can be locked out by hand setting.

One object of the invention is to provide various controls whereby the punching mechanism and its set-up devices are controlled in their operation by signals sent out automatically by the tabulating mechanism, and it is also an object so to construct the punch and its set-up mechanism as to make it adapted to be controlled in a variety of ways by such signals.

The punching mechanism is preferably operated by its own power shaft, separate from that of the tabulator, and improved means are provided for controlling the starting and stopping of such punch shaft. In particular, means are provided to control the number of cycles through which the punch shaft will operate when set in motion, sometimes for one cycle, sometimes for two cycles, and sometimes for more than two cycles, as required by the work to be done, and this under control of signals from the tabulator.

The invention includes what may be called primary and secondary set-up mechanism, data when received from the tabulator being first set up on the primary set-up mechanism and subsequently transferred to the secondary set-up mechanism which operates the punches, leaving the primary set-up mechanism free to receive a fresh set-up before the card has actually been punched.

This secondary set-up mechanism is of improved construction and has a novel and advantageous mode of operation.

The set-up mechanism of the punch includes a series of denominational devices, each adapted to be set differentially under the control of one of the type bars of the tabulator. It is one of the objects of the invention so to construct and dispose these set-up devices or slides as to get them into a much narrower space than said type bars. In the specific instance illustrated the series of set-up slides in the punch is only half as wide as the series of type bars in the tabulator.

The selection of the punches to be used in perforating a card is effected by certain gag bars which are differentially set under the control of the type bars of the tabulator. It is one of the objects of the invention to effect and control the clearing of these gag bars in a variety of ways. Clearing means are provided pre-settable to effect the clearing of selected ones of the gag bars without at the same time clearing other of said gag bars. Said means can be set inactive so that some of the gag bars will remain in set position indefinitely to punch the same matter in a succession of cards. Means may also be provided to clear some of said gag bars automatically on one cycle of the punch and other of said gag bars on another cycle. The clearing means can thus be set up to act automatically in a variety of ways in order to secure desired results in the punching of summary cards.

The framing for the head section of the machine containing the differentially movable slides and their associated parts is preferably made in a plurality of separately attachable and detachable sections, and the movable parts are so constructed that those parts in one section of the machine come properly into cooperation with the parts in another section by the mere act of mounting that section as a unit in the machine. It is one of the objects of the invention to facilitate both the assembling and the servicing of the machine by so constructing parts and mounting them in these separately detachable units.

Other objects of the invention will appear in the course of the description.

To the above ends the invention consists in certain combinations and arrangements of parts and certain features and details of construction, all of which will be fully described herein and particularly pointed out in the claims.

A specific instance of the invention is illustrated in the accompanying drawings, in which Figs. 1, 3, and 4 together constitute a general sectional view of the tabulating machine;

Fig. 2 is a detached view of a portion of the card feed mechanism of said tabulator;

Figs. 5 and 6 together constitute a front view of the punching machine and, connected therewith, a left hand portion of the tabulator;

Figs. 7 and 8 together constitute a top plan view of the head or set-up portion of the punching machine;

Fig. 9 is a general right hand side view of the punching machine but with the right hand frame members sectioned away to show some of the mechanism;

Fig. 10 is a general left hand side elevation of the punching machine;

Fig. 11 is a right hand elevation of the lower part of the punching machine taken in section to show the internal mechanism;

Fig. 12 is a fragmentary front view partly in section and mainly illustrating features of the frame of the punch;

Figs. 13 and 14 together constitute a front to rear sectional view through the head or set-up mechanism of the punching machine;

Fig. 11 is on substantially the same section as Figs. 13 and 14 and may be viewed as ending a certain distance below the bottom of Fig. 13, most of a certain wiring unit between the two being omitted;

Fig. 15 is a fragmentary view of certain hand settable devices and the parts controlled thereby;

Fig. 16 is a fragmentary transverse section taken on an irregular line 16—16 of Fig. 15 and looking in the direction of the arrows at said line, that is to say, toward the front of the machine;

Fig. 17 is a detached view of a certain clutch tripping mechanism, the parts being shown in the positions they occupy at a certain time during the tripping of the clutch.

Figure 26:
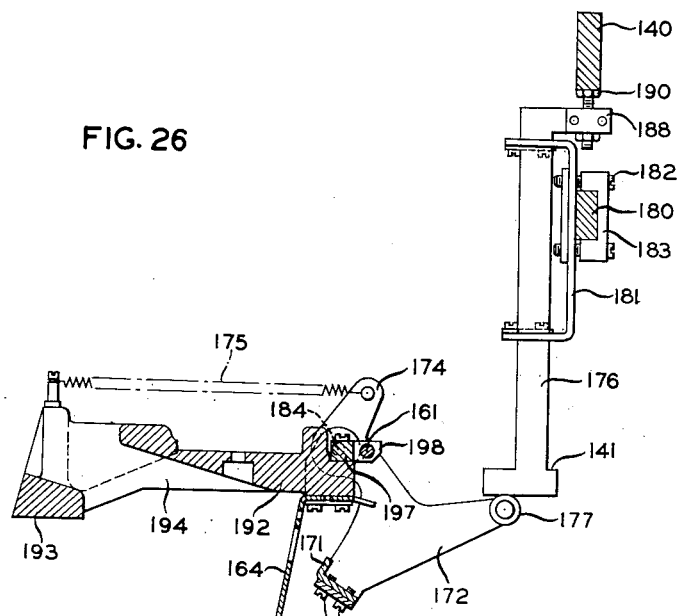
Figure 27:
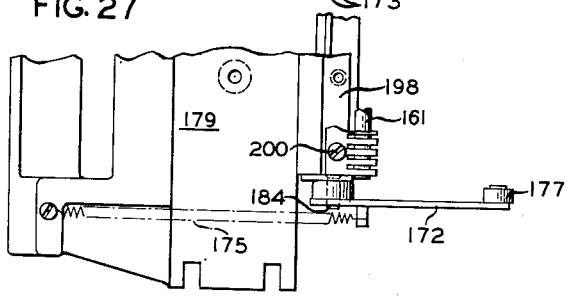
Figure 28:
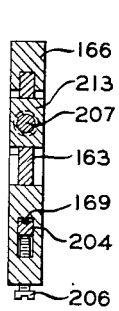
Figure 29:
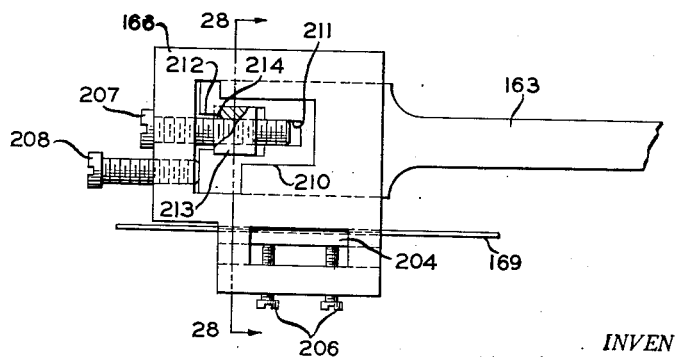
Figure 36:
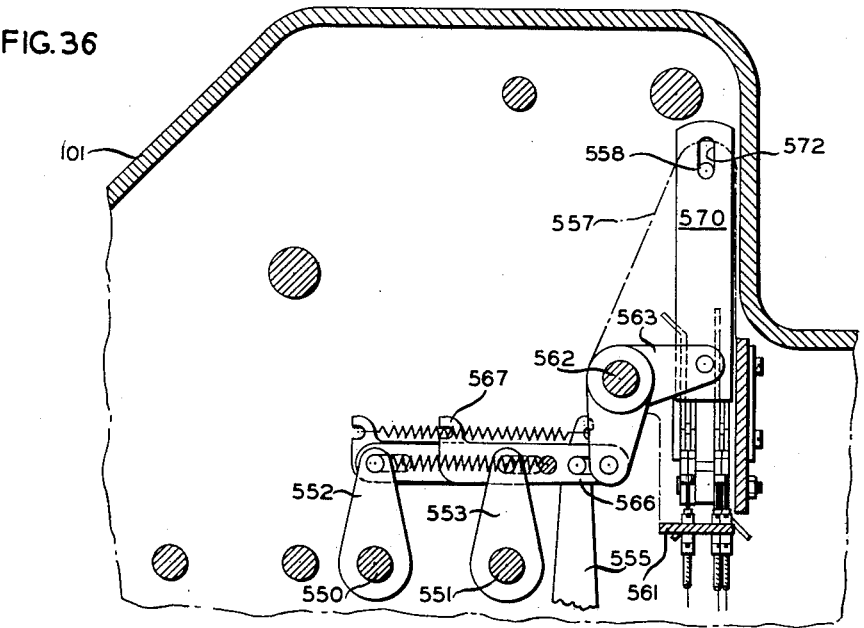
Figure 37:
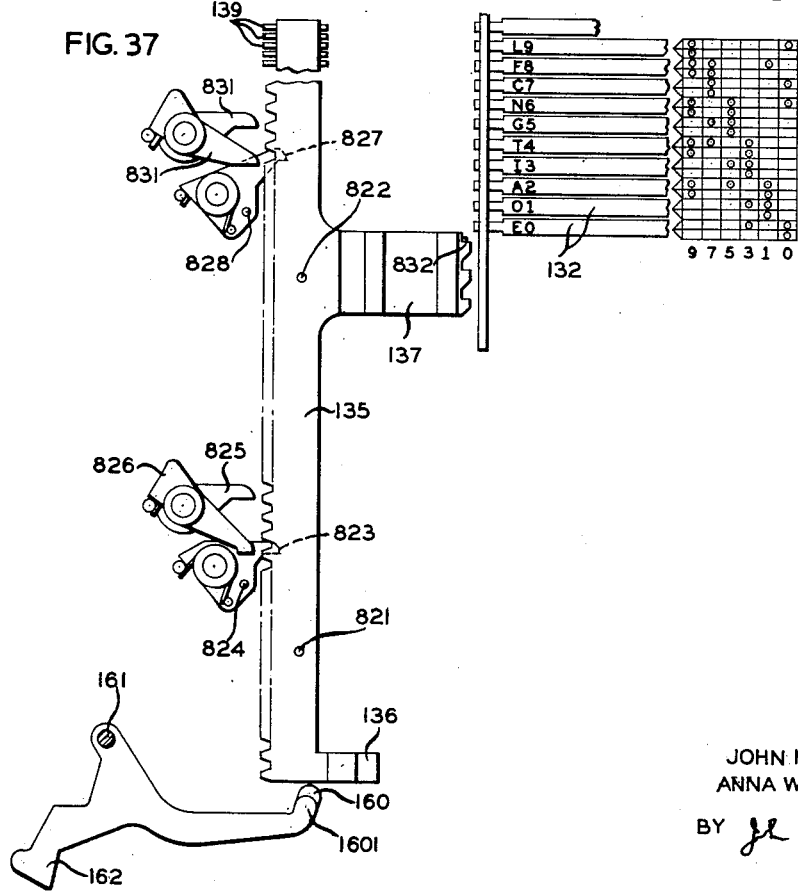

Figs. 18 and 19 are views on a smaller scale of the mechanism shown in Figs. 13 and 14, but with many parts omitted in each view for clarity of illustration;

Fig. 20 is a partial front elevation, partly in section and partly broken away, and with many parts omitted, and illustrating the mechanism for operating the punches;

Fig. 21 is a fragmentary view of two gag bars and their cooperating devices, said gag bars being shown in set positions;

Figs. 22 and 23 are fragmentary and partially diagrammatic views of certain modifications of the wiring unit mechanism;

Fig. 24 is an isometric view of the mechanism for the optional punching of zeroes;

Fig. 25 is a right hand side elevation illustrating the drive mechanism of the punching machine;

Fig. 26 is a fragmentary view of a certain restoring bar and its cooperating devices;

Fig. 27 is a fragmentary top view of a portion of Fig. 26;

Figs. 28 and 29 illustrate the adjustable mounting for one end of a Bowden wire, Fig. 29 being a side elevation and Fig. 28 a section on line 28—28 of Fig. 29, and looking in the direction of the arrow at said line;

Figs. 30-36, inc., illustrate a certain control unit in the tabulator for transmitting signals to the punch;

Fig. 30 is a plan view partly in section;

Figs. 31 and 32 are detail views of certain hand settable devices;

Fig. 33 is an elevation as viewed from the right with the frame plate of the tabulator sectioned away;

Fig. 34 is a detail top plan view;

Fig. 35 is an elevation viewed from the rear and with the frame plate of the machine sectioned away;

Fig. 36 is a view similar to Fig. 33 but with more of the machine shown;

Fig. 37 is a fragmentary and partially diagrammatic left hand elevation of one of the character type bars of the tabulator, together with certain stops and cooperating devices;

Figs. 38-41, inc., illustrate a certain releasing mechanism in the punch;

Fig. 38 is a fragmentary rear elevation;

Fig. 39 is a left hand side elevation with parts broken away and parts omitted;

Fig. 40 is a fragmentary front elevation partly in section;

Fig. 41 is a side elevation with certain parts omitted;

Fig. 42 is an isometric exploded view of a certain lock for the card feed of the punch;

Fig. 43 is an isometric view of the clutch control mechanism of the punch and means for controlling card feed;

Figs. 44, 45, and 46 illustrate in side elevation the same mechanism as Fig. 43;

Fig. 46 is a general side view, and Figs. 44 and 45 fragmentary detail views;

Fig. 47 is a left hand side elevation on a larger scale than the other drawings and showing a portion of the gag bar clearing mechanism;

Figs. 48-53, inc., are isolated drawings of various cams included in the operating mechanism of the punch, each cam being shown together with the parts immediately associated with it;

Fig. 54 is a wiring diagram of the automatic controls; and

Figure 55:
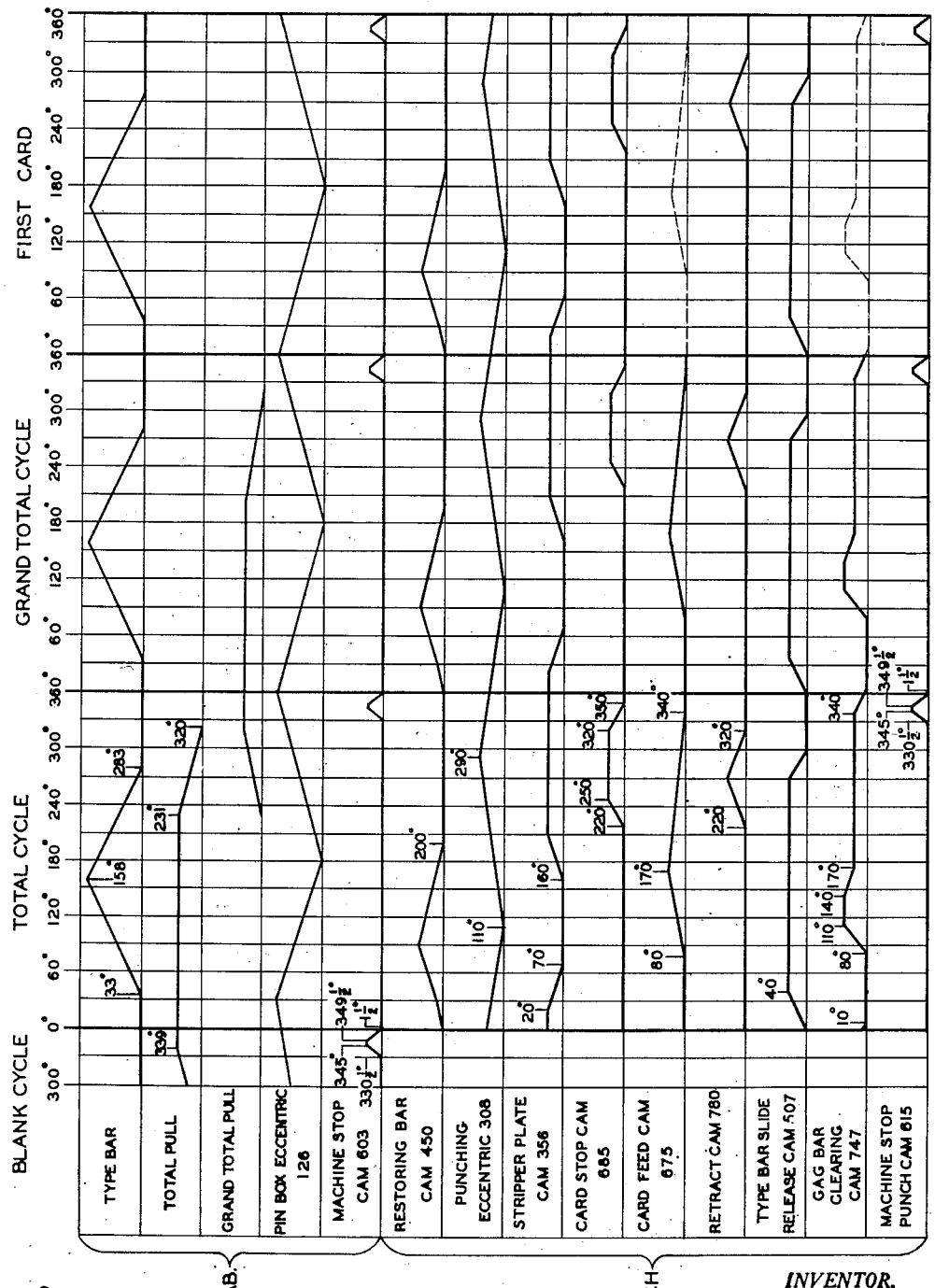

Fig. 55 is a timing diagram.

Tabulator

In the illustrated instance of the invention the tabulator is constructed substantially as described in the patent to Mueller 2,381,361, dated August 7, 1945, except for some slight changes which will be described herein. In the drawings, Figs. 1, 3, and 4 together constitute a general front to rear vertical section of the middle part of the machine. The machine comprises a base section and a head section whose left hand side frame pieces are shown respectively at 100 and 101. The mechanism includes a main base drive shaft 102, a rear head drive shaft 103, and a front head drive shaft 104, said shafts rotating in the directions indicated by arrows, and all rotating in unison, one rotation measuring a cycle of the machine. Cards stacked in a hopper 105 are fed by a picker 106 and feed rolls 107 into a sensing chamber 108 and from thence through rolls 110 to a receptacle 111. For reasons to appear hereinafter, the hopper 105 has been moved frontward to a more convenient position, the two forward pairs of feed rolls shown in Fig. 4 being added to feed the card through a channel 112. The hopper and these two extra pairs of feed rolls are mounted on a frame casting 113 suitably secured to the main frame 100 of the base. The rear pair of rolls 107 are the same as in the patent and the shaft of the lower roll drives the shafts of the forward two rolls through idler gears 114 (Fig. 2). The picker 106 is operated by the usual rock shaft 115, arm 116 and link 117, the last having been made longer than before.

The sensing pin box 125 is reciprocated up and down by an eccentric 126 shown in Fig. 4 in its stopped position, that is to say, approximately at its upper dead center with the sensing pins at the top of their stroke; and it is from this position that degrees of cycle are measured on the time chart. The set pins 127, the translator or wiring unit 128, the Bowden wires 130 therein, the permutation bars 131 and type bar stops 132, are all as described in the patent. The change of designation mechanism 133 initiates operation of the regular total taking control unit as described in the patent.

The type bars 135 have lower brackets 136 and upper brackets 137 which are guided on guide rods 138 and pressed upward by springs not shown. They are restored to, and restrained in, their depressed position by a universal restoring bar 140 which is reciprocated up and down at the times indicated on the time chart. The upper part of each type bar carries a set of types 139 including the ten numerals and the twenty-six letters of the alphabet for printing on the platen 142.

The type bars 135 have on their forward edges rack teeth to actuate one or more lower accumulators 143 and one or more upper accumulators 144, said accumulators being mounted respectively on a lower transverse frame bar 145 and an upper bar 146. In this machine, as now manufactured, there is across the machine provision for a continuous series of one hundred type bars 135, and in assembling the machine for a particular customer, group total accumulators 143 and grand total accumulators 144 are mounted on the bars 145 and 146 in whatever letter space positions the customer's work requires or makes desirable. An accumulator can be mounted on either of these bars at any desired position lengthwise of the bars. In most instances, wherever the customer wishes to locate an adding column, two accumulators are mounted, one directly above the other so that numbers printed in that column will be added on or subtracted from both accumulators. The total taking control mechanism is so designed that when running off a succession of groups of cards, at the end of each group the machine will automatically take a group total from the lower accumulator 143, leaving the amount still registered on the upper accumulator. At the end of the tabulation of the last group of the set, the mechanism first takes the group total of said last group from the lower accumulator and then immediately takes from the upper accumulator a grand total of all the groups of cards, all as explained in detail in the above cited patent.

As will appear hereinafter, the set-up of amounts to be punched is taken from the bars 135; and for that purpose it is immaterial whether or not these bars carry types and whether or not they actuate accumulators, these matters differing in different tabulators. For brevity and uniformity of nomenclature, they are herein called type bars.

Figure 3:
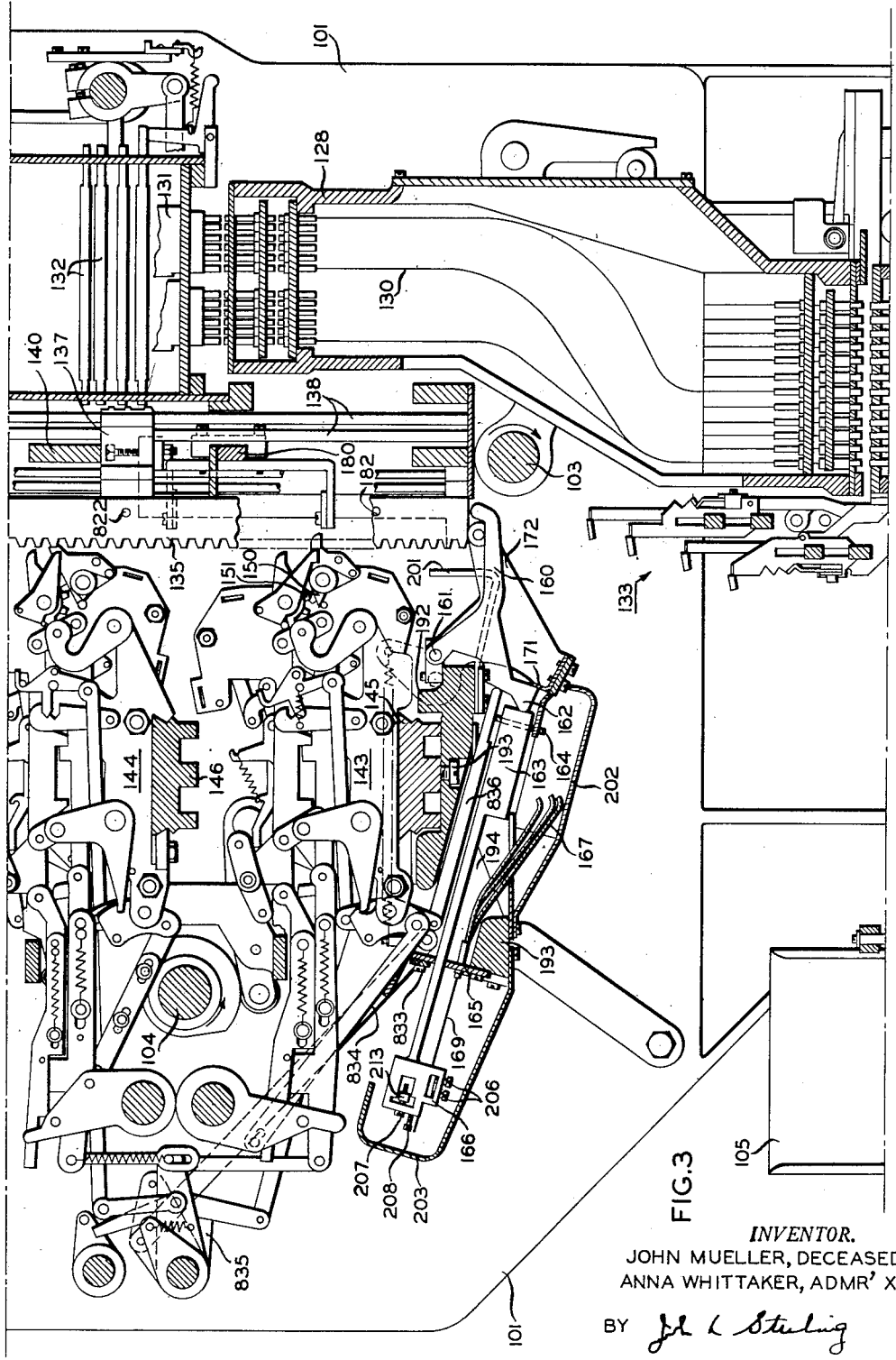

The accumulators may be adapted solely for addition but those shown in the drawing are adapted both for addition and subtraction. In each order there are two intermeshing pinions, namely, a lower adding pinion 150 and an upper subtracting pinion 151. In Fig. 3 these pinions are shown so disposed that if the accumulator be moved bodily rearward the lower or adding pinions will come into contact with the racks; but the relative positions of the two pinions can be reversed, that is to say, the lower pinions can be pulled toward the front of the machine and the upper pinions pushed toward the rear of the machine so that when the accumulator is moved rearward into mesh, the racks will be engaged by the upper or subtract pinions.

The accumulators include means to yield algebraic totals, that is to say, positive results appear in their true amounts on the lower wheels 150 and negative results appear in their true amounts on the upper wheels 151; and on a total taking operation the machine automatically sets the lower or upper pinions into position for engagement depending on whether the balance is positive or negative.

The drawings show some of the mechanism of the accumulators and of the means whereby they are set for adding and subtracting and of the means whereby they are thrown into and out of mesh with the racks; but all of this is fully described in the Mueller patent and is immaterial to the present invention. This mechanism and the other mechanisms of the machine will be described only in so far as is necessary for an understanding of the present improvements and additions thereto.

In the tabulating machine to which the invention is shown applied, each type bar 135 carries thirty-six types 139 whose spacing up and down the bar is half that of the spacing of the rack teeth which actuate the accumulators. The topmost type is the zero followed by a letter of the alphabet, then, "1," a letter, "2," a letter, "3," a letter, and so on (see Fig. 37). In other words, letter types and numeral types are interspersed with one another in the upper half of the set of types, so that nine spaces of the rack teeth equal eighteen type spaces, the "9" type being at about the middle of the series of types and the numerals or digits being all in the upper half of the bar; and type bars that are set at numerical values do not rise above about half their maximum stroke. All of the types below the middle are letter types. The punch in the form shown in the drawings is adapted primarily to punch numerical values only, although as will hereinafter appear, it can be, and is, used to punch alphabetic settings from those nine or ten of the letters in the upper half of the bar.

*Type bar sensing mechanism*

Figure 6:
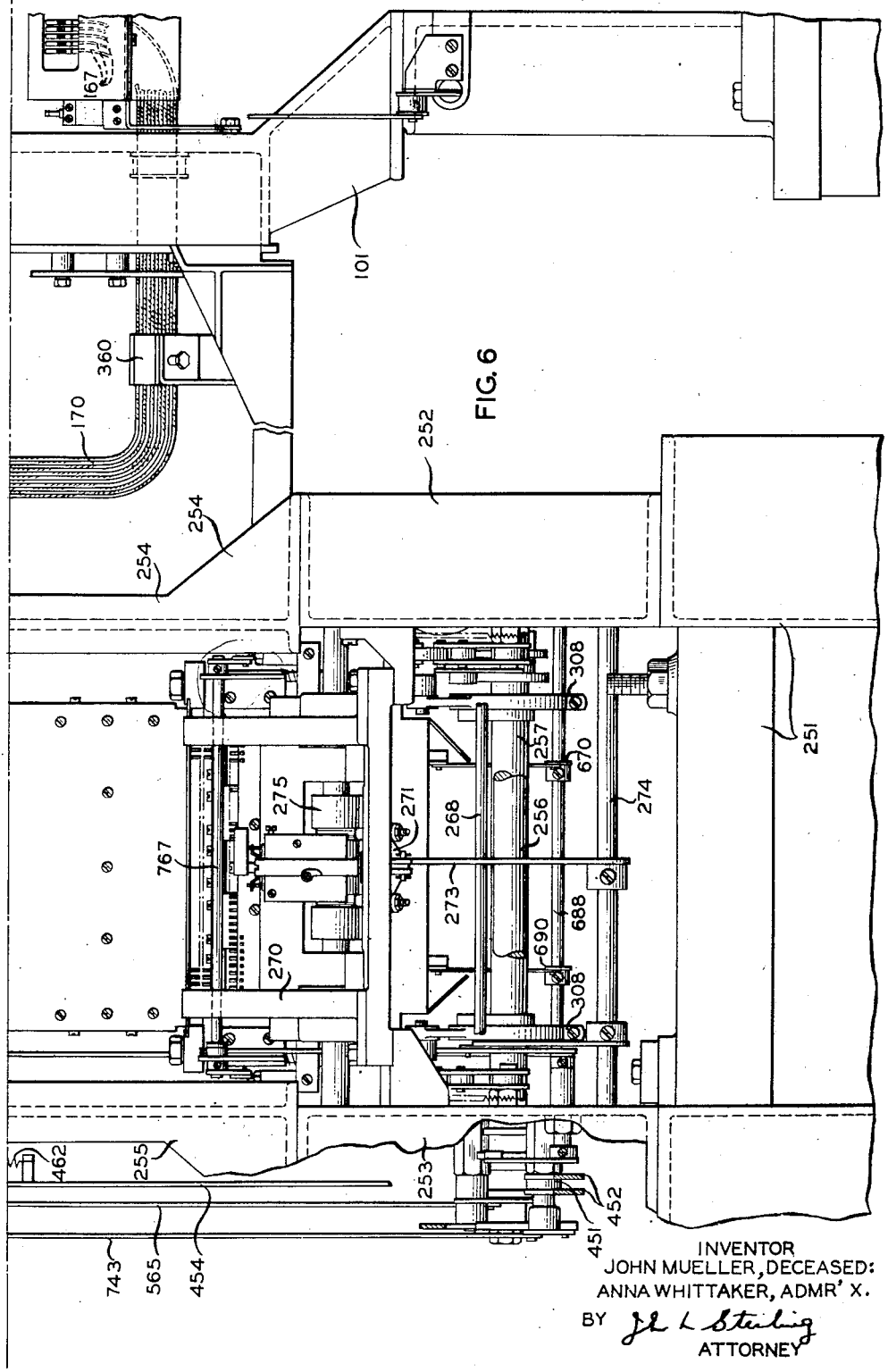

Each type bar 135 or at least each one whose setting ever has to be transmitted to the punch has cooperating therewith a sensing lever 160 (Fig. 3) pivoted at 161 and spring-operated counter-clockwise, this movement under such spring pressure being limited by contact of the rear end of said lever with the bottom edge of the type bar. The lever shown in Fig. 3 is in its initial position but if the type bar rises to the extent of 1, 2, 3, etc., to 9 units or tooth spaces, the lever can follow it until arrested by the type bar. This lever is in the form of a bell-crank whose downwardly extending arm 162 contacts with the square end of a slide 163 which is mounted and guided in comb plates 164 and 165. These slides 163 communicate their settings to the punch by Bowden wires. It will be convenient herein to distinguish between the inner wire and its outer flexible casing, and accordingly the former is herein called the wire, and the assembly of wire and casing is called a "Bowden." The front end of the slide 163 has a head 166 (Figs. 28 and 29) to which there is tightly clamped the end of the inner wire 169 of a Bowden 167. The casings of these Bowdens are secured to the plate 165. There is, of course, in the full machine a long series of these Bowdens to the number of 100. Back of the plate 165 they are suitably curved and extended into a bundle 170 leading through a hole in the side frame 101 and over to the punch machine (Figs. 5 and 6). When the latter is in operation, such of the Bowden wires as are required in that particular operation are placed under spring tension tending to pull the slides 163 toward the rear of the tabulating machine and to cause the levers 160 to move counter-clockwise until each is arrested in some numeric position by its associate type bar, so that the spring tension tending to rock the sensing levers 160 comes through the Bowden wires from the punching machine. Even when the tabulator is equipped with the full set of one hundred Bowden wires, only those are pulled which are released to be moved by their springs in the punching machine, as will be explained hereinafter. Thus, if there is only one adding column of nine places and the operation consists of setting up the total in the punch, then only those nine slides 163 and sensing levers 160 will be operated on that particular cycle. It may be mentioned that in the specific instance illustrated the pitch of the gag bars in the punch is finer than that of the racks 135 and the effective vertical lever arm 160 is less than that of the horizontal arm in proportion.

The bell-cranks 160 and slides 163 would be restored to a normal position by the down strokes of the type bars themselves, and in some instances that may be sufficient. For certain reasons presently to be explained, however, it is considered preferable to provide a restoring bar for this purpose. The one shown in the drawing is the bar 171 of a bail whose arms 172 (Figs. 3, 26 and 27) are pivoted a little forward of the pivot 161 of the sensing levers 160. A spring 175 acting on upward extensions 174 of the arms 172 tends to swing the bail counter-clockwise. This restoring bar may be operated by any suitable means. In the illustrated instance, and preferably, it is operated by the restoring bar 140 for the type bars themselves (Fig. 26). A rearward branch of each arm 172 pushes upward, by the spring 175, on a plunger 176 engaged by a roller 177 on said arm. The plunger 176 is guided in a suitable bracket 181 secured to a tabulator frame bar 180 which happens to be conveniently located. The bracket is fastened to the bar by a clamp plate 183 and screws 182. The upper end of the plunger has a rearward extension 188 with an adjusting screw 190 adapted to engage the restoring bar 140. When the latter rises the plunger follows it for about the first half of its up stroke and until arrested by shoulder 191 on the plunger engaging the bracket 181. The plunger is depressed to operate the restoring bar and restore the sensing levers 160 during the latter half of the down stroke of the restoring bar 140. The arms 172 would be pivoted on the same pivot rods 161 as the sensing levers 160, but in the instant machine there happens to be a part not shown which would interfere with the roller 177. This roller was, therefore, set a little toward the front of the machine from its logical position and the pivot 184 set correspondingly near to the front of the machine in order to make a lever arm equal to those of the sensing levers 160.

If the levers 160 were restored by the type bars themselves and if they followed in contact with the type bars during the upward movement of the latter, the rear end of such a lever would rub back and forth across the bottom edge of the type bar which might cause objectionable wear. Consequently, the parts are so proportioned and so adjusted with the screw 190 that on the up stroke of the type bar the restoring bar 171 lags a little behind the type bars so that the type bars and the sensing levers are not in actual contact during this motion. Moreover, it is desirable that the restoring bar pull the sensing levers 160 to a normal position slightly out of contact with the type bars. In most operations many type bars go up and down without being followed by sensing levers and when the type bars are restored to their bottom positions, it is desirable that they do not strike a blow against these sensing levers. Consequently, the parts are preferably so set that the restoring bar draws the sensing levers down a short distance below the type bars so that the two are not normally in actual contact. These are, of course, minor details but are useful and they make it preferable to employ the restoring bar.

As shown, all of these parts are constructed as a unit assembly, the stationary frame work of which consists essentially of a long casting 179 comprising two bars 192 and 193 connected together by end brackets 194, all cast integrally. The rear bar 192 lies directly beneath the lower accumulator supporting bar 145 to which it is secured by screws at 195. The slides 163 lie beneath the bar 192 and above the bar 193, extending forward at an upward inclination, the guide comb 164 being secured to the bar 192 and the forward guide plate 165 to the bar 193 and the front ends of the brackets 194.

The bar 192 has along its rear edge a shoulder or flange 197 to which a series of pivot blocks 198 are secured by screws 200, and the pivot 161 of the sensing levers 160 consist of rods running through these blocks, the blocks, of course, being suitably slotted out from the rear to accommodate and to guide the levers. This is a familiar construction in Powers machines.

Referring to Fig. 3, a comb 201 guides the levers 160 into proper cooperation with their respective type bars. The drawing also shows some plates 202, 203 secured to the frame casting 192, 193 and so formed as to protect the slides 163 and their appurtenances from injury.

Inspection of Fig. 3 will show that the hopper 105 in its former position in the machine would come in an inconvenient position underneath the plate 202 and it was for that reason that the hopper was moved toward the front of the machine.

In order to provide a fine adjustment for the effective length of the inner wires 169 of the Bowdens, the means shown on an enlarged scale in Figs. 28 and 29 are provided. The head 166 in the form here shown is a die casting, open at its rear end with a rectangular space into which the front end of the bar 163 is inserted, so that this head is slidably adjustable to a limited extent front and back (left and right in Fig. 29). The device has the thin or narrow form shown in Fig. 28 on account of the close spacing of these devices across the machine. The lower or depending portion of the block has inserted therethrough front to back a small clamping block 204 having a V groove into which the wire 169 is laid and clamped in position by two screws 206. The wire is thus tightly clamped to the block 166 in a straight line, without bending or kinking it. The coarse adjustment is made by loosening the clamp piece 204 and pulling the wire by hand approximately to its correct length and then tightening the screws 206. A fine adjustment is afforded by two screws 207 and 208 at the front end of the block. Said block itself, at the portion thereof that is occupied by the front end of the bar 163, is cut through by a T-shaped opening 210. The front end of said bar is cut into a forked form having the outline shown at 211. This outline includes a shoulder 212 on each branch of the fork. A nut 213 is inserted through the hole 210 and the cutout 211, said nut having the rectangular form shown in Figs. 28 and 29, and having at its front end a slot 214 like the slot in the head of a screw. This nut 213 is inserted in place and then pulled forward until the slot 214 engages the shoulders 212. The screw 207 is threaded into this nut and when tightened draws the block 166 rearward along the bar. The screw 208 is screwed through the end of the block 166 and presses at its inner end against the outer end of the bar 163. These two screws, therefore, work against one another and afford the desired fine adjustment. It will be noted that the adjustment is in a straight line in the direction of the front end portion of the wire 169, and does not involve any bending of said wire.

*The punching machine base*

The frame and some of the mechanism of the base part of the punching machine are, in the specific instance of the invention shown in the drawings, an adaptation of that used in the reproducing punch described in several patents, among others No. 2,287,828 to Braun and Kase. In the particular machine illustrated, the base castings and the drive mechanism and cam shafts and some of the other parts are identical with those used in the said reproducing punch. The framework comprises a foot piece 251 consisting of a casting with a flat top and four legs (Figs. 6, 9 and 11), and a base frame comprising a right hand side plate 252 and a left hand side plate 253, each consisting of an ordinary vertical web surrounded by flanges so as when a cover is applied to it to make a sort of box of it. These two uprights are bolted to the foot piece 251 at their bottoms and are connected by certain frame members in their upper parts. The foot piece and the side piece shown in the drawing are taken bodily from the said reproducing punch. Surmounting said side pieces is a new frame comprising a right hand upright member 254 and a left hand upright side member 255, these having the outline shown in Figs. 8 and 9, and each comprising flanged edges of the usual construction. In the base section are a front cam shaft 256 and a rear cam shaft 257 in the same locations as in the reproducing punch. In Fig. 6, which is a front view, the front shaft is shown broken away and the rear shaft is shown equipped with certain cams, etc. These shafts are driven in the same manner as in the former machine, namely, in the right hand box-like frame 252 is a worm shaft 260 driven from an electric motor by belt 261 and having thereon the usual worms for driving the two shafts 256 and 257, and also worms for driving feed roll shafts 262 as shown in Fig. 25. This whole drive mechanism is so familiar in these machines that it seems unnecessary to describe it further. The worm shaft 260 is controlled by a clutch 265 which is engaged by a spring 266 and is disengaged by a yoke 267 fast on a rock shaft 268, all as is usual in these machines. The controls for this rock shaft 268 will be described hereinafter. The clutch is, of course, opened by rocking said shaft clockwise in Fig. 26.

Summary cards to be punched are fed as usual in these machines from a hopper 270 by a picker 271 reciprocated through a link 272 and arm 273 fast on a rock shaft 274, to feed rolls 275 on shafts 262, which rolls convey it to a card chamber consisting of the space between the perforated die plate 277 (Fig. 11) and a perforated plate 278 for the punches 293. From this chamber the cards are fed by feed rolls 281 to a receptacle 282 in the usual manner.

The die plate 277 and the guide plate 278 are supported in substantially the same way as in the reproducing punch. They are mounted on an irregular shaped casting 290 as best shown in Fig. 11. Said casting, as viewed from above, is of a general rectangular shape and, as seen from the end, it has the inverted forked outline shown in Fig. 9. At its ends it has four projecting lugs 291 resting on and bolted to brackets of the side frames 252 and 253, as shown in Figs. 9 and 20. The punches 293 (Figs. 11 and 20) are guided in the perforated plate 278 and in another plate 294, secured to the plate 278. At their upper ends, the punches are headed and pass through a stripper plate 295 which, however, is a movable part not fast on the casting 290.

*Set pin unit*

Above the casting 290 and the punches 293, a vertically reciprocating set pin box 296 is mounted and operated substantially the same as in the reproducing punch, with some exceptions that will be mentioned. This box has end castings 297 (Fig. 9) to which are screwed transverse sheet metal plates 299 (Fig. 11) which in turn support the horizontal guide plates of the set pins 300. The set pins work in the usual manner and when one of them is depressed it is locked down by the usual locking slide 301, there being two of these slides for each row of pins, one for the six upper zone pins and the other for the six lower zone pins; and the two are mounted one above the other so as to be separately operable for retracting purposes, all of which will be described hereinafter. This set pin box moves upward in order for its pins to be selectively set and locked down, and then downward when the pins so set force their punches through the card.

The set pin box 296 is reciprocated up and down in a manner similar to, through not the same as, in the reproducing punch. The stationary casting 290 has at each end a bulge, bored vertically, to serve as a guide for a reciprocating rod 302 (Fig. 20). A little above the casting 290 this rod is reduced to form an annular shoulder, the rod then passing through a vertical hole in the end casting 297 of the set pin box and having on its end a nut 303. This nut bears down on a collar 304 which in turn bears on a washer 305 on top of the casting 297. The construction is such that when the nut 303 is tightened, the pressure acting through the sleeve 304, and washer 305, forces the casting 297 firmly against the shoulder in the rod 302 thus rigidly mounting the set pin basket on the rod. The rod 302 terminates at its bottom in a squared end 306 from which projects a bearing stud 307 for the upper end of a pitman 308 actuated by an eccentric 310 fast on the rear cam shaft 257 (Fig. 11). There are, of course, two of these eccentrics and pitmans, one for each rod 302, and when the machine is in operation the pin box 296 reciprocates up and down continuously. As will be apparent from the timing diagram, its stop position at the end of a cycle is about midway of its down stroke; and it is in that position that the parts are shown in the drawing. When the machine is started the set pin box completes its down stroke, during which any set pin 300 that has been depressed and locked down will operate its associate punch 293. In the latter half of its upward motion the set pins will receive a new setting in a manner to be presently explained.

The wiring unit, designated generally as 311, is in the form of a rectangular box enclosed by right and left hand plates of sheet metal and having the general form in end view shown in Fig. 9.

Its internal construction can be understood from Figs. 11 and 20, the former showing a fragmentary front view partly in section of the lower part of the unit and the latter a cross section on a front to rear plane. The rear frame plate 312 and the front frame plate 313 have mounted between them at their upper ends (Figs. 13 and 14) a slide or plunger unit consisting of two transverse bars 314 and 315 having a perforated top plate 316 and a perforated bottom plate 317 secured thereto by screws, and said bars themselves secured to frame plates 312 and 313 by screws 318. Mounted in and guided by these two perforated plates are a series of rows of plungers 320 adapted to be depressed by the gag bars as will presently be explained. The casings of the Bowden 321 are screwed at their upper ends into a plate 322 after first passing through a lower guide plate 323 in such position that one Bowden wire 324 has its end projecting from its casing against the bottom of one of the plungers 320. The plates 322 and 323 are secured to transverse bars 325 made into a unit which is secured to the plates 312 and 313 by screws.

In the specific instance of the invention illustrated, there are one hundred gag bars corresponding to the one hundred type bars in the tabulator; and there are, therefore, fifty front to rear rows of plungers 320, each row controlled by two gag bars, six plungers for each gag bar, as will be explained hereinafter.

The Bowden casings at their lower ends are secured in a unit identical with the unit 322, 323, 325, except that it is turned upside down. It comprises (Fig. 11) two transverse frame bars 330 having secured thereto an upper guide plate 331 perforated for the passage of Bowden casings and a lower plate 332 into the perforations of which said casings are screwed. This unit, however, comprises only forty five columns of front to rear rows of holes corresponding to the columns of the card to be punched.

The lowermost section of the wiring unit comprises a rectangular casting 333 secured to the plates 312 and 313 by screws 334. On top of this rectangular frame is secured a guide plate 335 for the upper ends of a series of plungers 336 whose lower ends are guided in a bottom plate 337 secured to the casting 333 by screws. There is one of the plungers 336 directly beneath each Bowden wire, by which it may be depressed. Said plungers are pressed upward by springs 338 whose pressure is communicated through the Bowden wires to the plungers 320 which are thus normally held in their upper position.

The plungers 336 project beneath the bottom plate 337 of the wiring unit and each of them stands immediately above one of the set pins 300 hereinbefore described. The construction is such that if one of the plungers 320 be depressed by the gag bar, it will set the corresponding set pin 300 which will be held in its depressed or set position as hereinbefore described.

The wiring unit has also right and left hand frame plates which also constitute casing plates which are suitably screwed to the casting 333 and also to the ends of the frame bars 325, 314 and 315.

The bottom plate 337 of the wiring unit is extended beyond the casting 333 in right and left hand directions as shown in Fig. 20. The said projecting portions, constituting flanges which secure the unit in place in the machine, can be slid from the back of the machine into slots in rails bars 340 in the manner and to the effect familiar with wiring units in these machines. Fig. 11 shows one of the finger pieces 341 common in these machines to control a lock, which accurately positions and firmly secures the unit in the said rails 340.

In the instance of the invention illustrated in the drawings, the spacing from center to center of the plungers 320 is $\frac{5}{16}$", whereas the spacing of the set bars 300 is only $\frac{1}{4}$", this being the spacing of the index positions of the cards. The lower plungers 336 are accordingly fanned in as shown in Fig. 11.

In former machines having removable wiring units, the rails or supporting bars like the bars 340 have been mounted on the stationary framing of the machine, so that said wiring unit when in place was stationary. In the present instance, however, said rails are rigidly mounted on top of the castings 297 of the set pin box so that the wiring unit reciprocates up and down with the latter. As shown in Figs. 9 and 20, said rails are mounted on blocks 342 which rest on the top of the castings 297, and screws 343 pass through the rails and blocks and are threaded into the castings.

Accurately to position the plungers 320 for engagement with the fingers of the gag bars, the wiring unit has two brackets 329 fastened to its rear cover plate 312 (Fig. 9). The upper end of each bracket 329 is bent off and perforated to receive a vertical post 339 suitably fastened to and spaced from the side casting 253 or 254 of the machine. The lower end of each post 339 is beveled, so as, when translator 311 is elevated, to insure accurate engagement of it. In stop position (Fig. 9) the flange 329 stands below the lower end of post 339. It may be remarked that, when changing wiring units, the set pin unit must be run down to a position lower than that shown in the drawing in order to avoid a conflict between a certain finger on one of the plungers 320 and a finger of the gag bar. This may be done by means of a hand wheel 349 (Figs. 10 and 25) fast on the rear end of the worm shaft 260.

In the stop position, the plungers 320 (Figs. 13 and 14) at the top of the wiring unit are out of contact with the gag bars and the set pins are not low enough to depress the punches. When the set pin box and the wiring unit move upward to the upper limit of their motion some of the plungers will be arrested by the gag bars with the result that the corresponding set pins will be set and locked by their locking slides 301; and when, thereafter, said parts are moved to their lowermost position, those set pins will push their corresponding punches through the card.

Stripper plate

In the reproducing punch hereinbefore referred to, the stripper plate was mounted on and reciprocated with the set pin box but in the present instance, where said box has not only a motion from its normal position downward, but also a motion from its normal position upward, it would lift the said stripper plate so high as to pull the punches out of their guide plates. In this machine, therefore, said stripper plate is mounted independently of the set pin box and is independently reciprocated (see Figs. 9, 20 and 52). The stripper plate 295 is screwed to two transverse bars 345 which are secured at each end by screws 346 to a yoke 347, the whole constituting a rectangular frame. Each of the yoke pieces 347 is secured by a nut 348 to the upper reduced end of a reciprocating rod 350 which passes through and is guided by the bulge part 292 of the fixed casting 290 that supports the guide plate. At its lower end the rod 350 is forked, within which fork a short link 351 is pivoted on a pivot pin 352. The link 351 is pivoted to the free end of a follower lever 353 pivoted at 354 and having a follower roller 355 riding on a cam 356 on the rear cam shaft 257, the follower being pressed against the cam by a spring 357. The lever 353 is made of two spaced pieces between which the follower roller 355 and the link 351 are pivoted.

As shown by the time chart (Fig. 55), the set pin box is at its lowest position at about 110° of cycle, reaches its top position at about 290° at which time the set pins are fully set, and reaches the mid-point of its down stroke at about 360°, and reaches its lowest position at about 110° of the next cycle, so that the set pins receive their setting between 200° and 290° of the first cycle, and the punches are pushed through the card between 20° and 110° of the next cycle. The stripper plate, as shown on the time chart, is normally at its upper position and reaches its lowest position at about 60° or 70°, descending in unison with the descending set pin box. It rises to its upper position about mid-cycle, and stops, while the set pin box continues its motion upward.

The primary set-up mechanism

Figure 7:
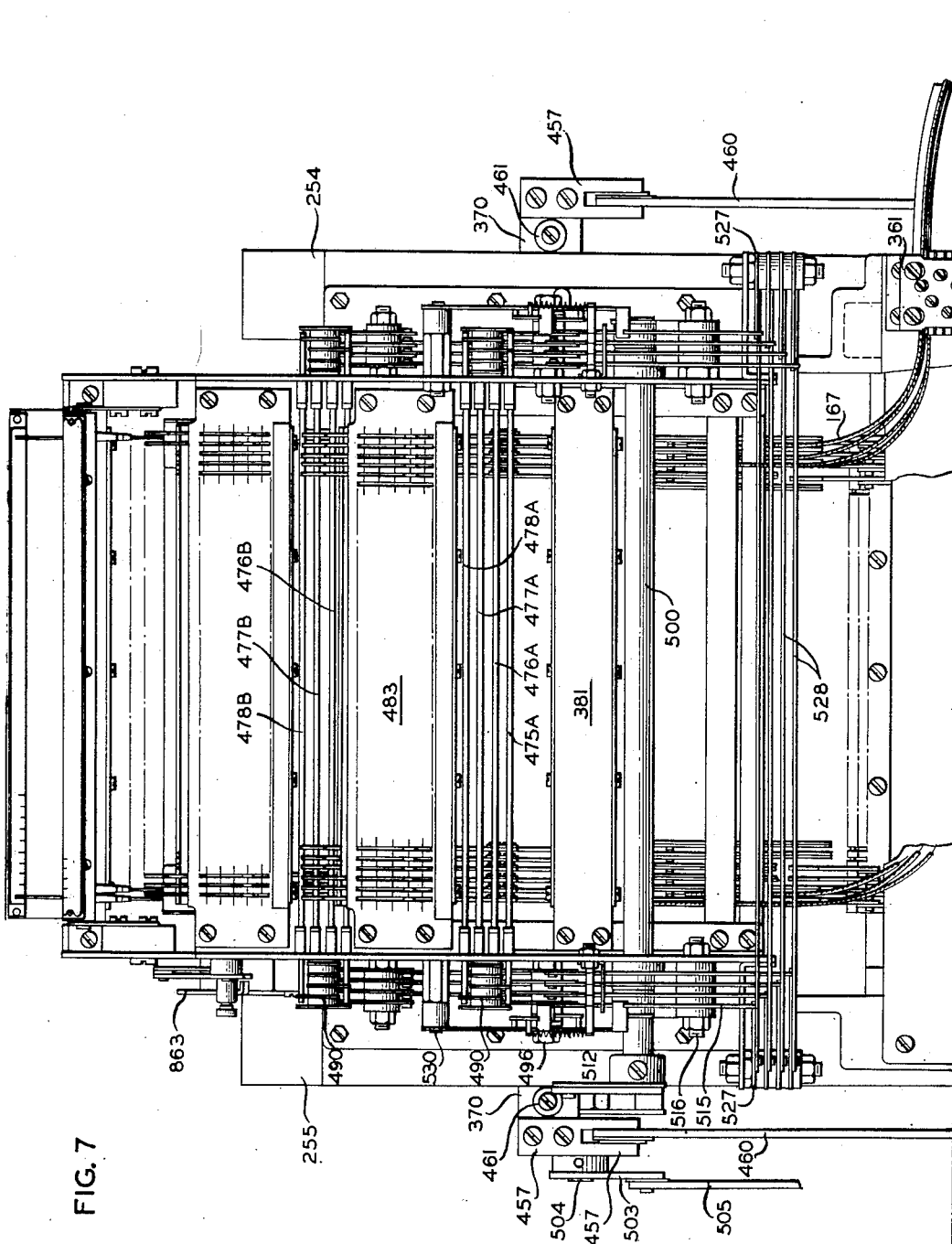

The Bowdens 167 after emerging from the left hand side of the tabulator (Fig. 6) are passed through a sort of clamp 360 and formed into the cable 170 which extends upward as shown in Fig. 5, and is bent over into the upper part of the punching machine, passing through another clamp 361. In practice, these clamps are in a way compartmented so that the Bowdens may be arranged in them in regular order for convenience of assembly and repair, but the details of this are not material and are not shown. The clamps 360 and 361 are supported on suitable brackets attached to the tabulator and the punch, respectively. As shown in plan view in Figs. 7 and 8, the Bowdens are led from the clamp 361 to their respective appropriate positions across the machine.

The means for setting the gag bars to their respective numerical positions can be understood by reference to Fig. 18. In each denominational position there are three slides, one above another, viz., a type bar slide 362, a sensing slide 363, and a sliding gag bar 364, the last having gags consisting of projections from its lower edge for cooperation with the plungers 320 of the wiring unit hereinbefore described. These three cooperating slides will be called herein a set of slides, there being one such set for each denomination.

These three slides are mounted on suitable guides and cooperate with other devices, as shown in other figures of the drawing. Each one has a limited sliding movement front and back (left and right in Fig. 18). The Bowden 167 has its casing anchored to a cross bar 365 from which the inner wire 169 extends rightward and is secured to a projection of the type bar slide 362. The construction is such that if this slide be moved toward the right it will draw after it the wire 169 which in the tabulator (Fig. 3) draws one of the slides 163 toward the rear of the machine, swinging the bell-crank 160 counterclockwise until arrested by the bottom of the type bar in some numeric position. The rightward motion of the slide 362 will, therefore, be limited to some one of ten positions appropriate to the numerals 0 to 9.

The type bar slide 362 is moved rightward by the sensing bar 363, a projection 366 on which contacts with a projection 367 on the slide 362. The sensing slide is propelled by a spring 368 but is normally held in its extreme left hand position by a reciprocatory universal restoring bar 370. When at the appropriate time this restoring bar moves rightward, the sensing bar 363 follows it under the impulse of its spring, and pushes the type bar slide 362 with it until both of them are arrested in the appropriate numeric position. Normally, however, each type bar slide 362 is locked against actuation by a latch 369. At each operation of the machine these latches are released selectively by control mechanism to be described hereinafter, so that only those slides advance that are required in that operation.

The gag bar 364 is drawn rightward (rearward) by a spring 371, its motion in that direction being limited by a fixed stop bar 372 against which the gag bar normally stands. The gag bar is drawn frontward to its set position, by pawl and ratchet connection with the sensing bar, the pawl being on one of said bars and a set of ratchet teeth on the other. In the present instance, and preferably, the gag bar has nine ratchet teeth 373 adapted to be engaged by a pawl 374, pivoted to the sensing slide at 375, and spring urged clockwise to engage the teeth 373 (see also Fig. 13). When the restoring bar 370 moves rightward and is followed by the sensing bar 363, the pawl 374 advances over the first, second, third, and so on, teeth 373, the motion of the sensing bar being arrested as above described, with the pawl in engagement with the appropriate one of said teeth. When the restoring bar 370 is again moved frontward bringing the sensing bar back to its normal position, the pawl 374 draws the gag bar 364 frontward to its appropriate numerical position where it will remain as long as the sensing bar 363 remains in its normal (left-hand) position and the pawl 374 engages the teeth 373. The nine teeth 373 conform to the numerals 1–9, inclusive. When the type bar stands at zero, the pawl 374 does not reach the first tooth and that gag bar remains in its normal position and nothing is punched in its column.

The motion of the type bar slide 362 and, therefore, of the sensing slide 363 is necessarily momentary because these slides follow the up and down motions of the type bars in the tabulator. If the type bar slide 362 were itself the gag bar, it could retain its setting only for a brief time which could not answer some of the purposes of the punching machine. As will be explained hereinafter, control devices are provided which enable the gag bar 364 to maintain its setting for a cycle or two and even, if desired, may retain the setting indefinitely. This possibility is brought about by the manner of setting the gag bar, viz., by setting it on the return stroke of the sensing bar where it can be preserved as long as the sensing bar is not operated to set up a new amount. This is effected by suitably controlling the latch 369, as will be explained hereinafter.

Means to trip the pawls 374 at suitable times, and thus to allow the gag bar to be restored to its normal right hand position free of the sensing bar, will also be described hereinafter.

Tabulating machines and summary punches may, of course, be made of different maximum capacities. The number of slide sets 362, 363, 364 may be varied according to the requirements of the user. Even where the tabulator has, like the one shown in the drawings, one hundred type bars, a smaller number of slide sets may suffice in the summary punch. In the described instance, the said punch has provision for fifty slide sets of the sort illustrated in Fig. 18 and above described. Some users may never require a summary card punched in more than, say, thirty or forty or fifty columns, and in that event, no more of these sets of slides need be provided for. In such an event, the Bowdens leading to the several slides 362 may be led in the tabulator, each to any desired one of the type bars to serve the purposes of a particular user. The amount set on any gag bar may be punched in any desired column of a card by suitably wiring the wiring unit 311.

In the present instance, however, the machine is shown equipped with a full complement of sets of slides equal to the number of type bars in the tabulator, viz., in the illustrated instance to the number of 100. In order to get this large number of slide sets into a compact assembly, laterally of the machine, said sets of slides are made in two forms, viz., the form shown in Fig. 18 as above described, and also in the form shown in Fig. 19. The latter contains the same sorts of slides as the former but they are made of different shapes and are slightly differently disposed. The slides shown in Fig. 19, however, have identically the same functions and operate in identically the same way as those of Fig. 18. These two sorts of slides are interspersed across the machine, alternating with one another. This is for reasons of compactness as will be understood from the following description. In Figs. 18 and 19 the corresponding parts are designated by the same reference numerals followed in each instance by the letter A applied to the parts of Fig. 18 and the letter B applied to the parts of Fig. 19.

Each of the gag bars has depending therefrom a long finger 376 and three shorter fingers 377 which cooperate with the plungers 320 in the top of the wiring unit 314 hereinbefore described. As shown in Figs. 18 and 19, the gag bars are in normal position, and it will be seen that the fingers of the gag bar 364A are located so as, when set to numeric positions, to act on the right hand or rear six of the plungers 320 and that in the case of the gag bars 364B, these fingers are adapted to cooperate with the left hand or forward six of the plungers. This is one of the differences between the A set of slides and the B set of slides, and in Fig. 21, the gag bar 364A is shown in position to punch the numeral "one" and gag bar 364B in position to punch "two." In Figs. 13 and 14, both sets of slides are shown and it will be noted that in those figures the B slide shown is the one nearest to the observer and is in position to punch zero, and the A slide which is in normal position is partially hidden behind it.

The disposition and manner of mounting of these two sorts of sets of slides can be understood from Figs. 13, 14, and 16, the last being a rear elevation in section on the line 16 of Fig. 14. As shown in said section, the rear ends of the type bar slides 362 are guided in a comb plate 380 secured to a cross bar 381. Three of these cross bars, viz., 381, 382 and 383 (Figs. 13 and 14) are secured to flanges of two sheet metal brackets 384 (Fig. 19), one secured by screws to a left hand frame plate 385 and the other to a right hand frame plate of the same general outline. In Fig. 16, it will be noted that the lower part of the guide plate 380 has comparatively wide slots, each of which accommodates two slides, viz., one of the slides 362A and one of the slides 362B. The slides are thus very compactly arranged. Near their forward ends these slides 362 are supported by a cross frame bar 389 (Fig. 13) and guided by a slotted guide plate 386. Each of said slides has its forward end consisting of a finger-like part, as shown in Fig. 13, and here again a pair of slides occupies each slot. These type bar slides may be connected in various ways with the Bowdens, coming over from the tabulator. In the specific machine illustrated in the drawing, the type bars are numbered from left to right from 1 to 100. All the Bowden wires from the left hand half of these type bars, that is to say, from type bars 1—50, go to the slides 362A, and all those from the type bars 51—100 go to the slides 362B. The Bowdens 167B have their casings secured in series to the cross bar 383 and the inner wires 169B are attached each to a stud 387 on an ear projecting upward from the slide 362B. The Bowdens 167A come in a little above the wires 169B in a tier, their casings being secured to the cross bar 365 and their inner wires 169A being secured each to a stud 387A on an upstanding branch 388 of a bar 362A. It will be noted that the stud 387B stands some distance nearer the front of the machine than the stud 387A so that the two slides can have their front and back motion without the studs colliding with one another, or with the ears on which they are mounted.

The sensing slides 363 and also the gag bars 364 are disposed in pairs in the same general manner as the type bar slides 362, each guide slot being occupied by an A bar and a B bar. The rear ends of the slides 363 and 364 are supported by three cross frame bars 390, 391 and 392 (Figs. 14 and 16). The sensing bars 363 rest on the frame bar 391 which has attached thereto a comb plate 393 with teeth extending upward and the bar 392 carries a comb plate 394, the teeth extending downward, these guide combs being slotted and each slot accommodating two bars as shown. The gag bars 364 are guided by upper and lower guide combs 395 and 396.

The forward ends of the sensing bars and gag bars are mounted in almost identically the same way (Fig. 13) on three bars 397, 398 and 400 with guide combs secured thereto.

*Clearing the gag bars*

The release of the gag bars 364 from the control of the sensing bars 363, so that the former may be returned to normal position by their springs 371, is effected by tripping the pawls 374; and this is done at a point in the cycle when the sensing bars are held in their forward position by the restoring bar 370. The tripping or clearing means are shown in Figs. 13, 18 and 19. Each pawl 374 has an upwardly and forwardly extending arm whose upper edge is formed off into a flange 405. This flange is engaged by the under edge of a release lever 406 pivoted at 407 and normally held in its non-contacting position by a spring 408. The flange 405 on pawl 374 and the under edge of the lever 406 are, when in the positions shown in Fig. 13, straight horizontal lines of some length, so that when the sensing bar advances, the pawl slides along the lever, holding the pawl out of engagement with the teeth 373 for some distance. These release levers are disposed in two rows across the machine, the forward row being for the "B" sets of slides and the rear row for the "A" sets of slides. Conveniently, one spring 408 serves for two adjacent release levers 406, as shown in Fig. 13, where lever 406A is in inactive position and lever 406B is in active position. Said levers are normally inactive but are swung to active position to clear the gag bars, each by a link 410, said links being guided in comb plate 411. Each link at its forward end has pivoted thereto an interponent 412 which is rocked clockwise by a spring 413 under control of a hand settable device 414 which is pivoted to the link 410. Said settable device has three notches at different distances from its pivot engageable by a nose on the interponent 412. When the settable lever 414 stands as shown at 414B (Fig. 13) the interponent is held at its lowermost position, but if said device be swung clockwise till the interponent engages the middle notch, the interponent will swing up to a higher position, and if it be swung still further clockwise as shown at 414A, the interponent will rise to its highest position. There are provided two universal cross bars 415 which, as will be described in detail hereinafter, may be moved momentarily toward the rear of the machine to the effect that any link 410 whose interponent 412 stands behind one of these bars will be pushed rearward and will cause the clearing of that particular gag bar. One of these bars 415 stands behind the other, the forward one being for the B devices and the rear one for the A devices; and as shown in Figs. 9 and 10, the two bars 415 are connected at their ends by horizontal links 416 so that the front and rear bars 415 always move together.

For some sorts of work, this one pair of bars suffices, but in some instances more than one are needed, an additional such pair 419 being shown in the present instance, above the pair 415. For example, the pair of bars 415 may be actuated at the end of a total cycle of the tabulator and the pair 419 at the end of a grand total cycle.

When an interponent is set as shown in Fig. 13 at 412B, that particular release pawl 406 is under control of the lower bar 415, and its gag bar will be cleared at the end of the total cycle, and when the setting device is in its middle position that denomination is under control of the upper bar 419 and its gag bar will be cleared at the end of a grand total cycle; and when a setting device is in the extreme position shown at 414A the interponent 412 is out of the path of both bars, and in that setting the gag bar will not be cleared at all, but its setting will be preserved indefinitely. It will be readily perceived, that in order to set up certain gag bars for punching matter common to all of the cards, the clearing mechanism for those particular gag bars would be set as shown at 414A and then the gag bars set as desired. This may either be done by drawing the gag bars forward by hand, or it may be done by running a single card through the tabulator punched with the desired matter. In the latter case it would be necessary first to release the appropriate type bar slide 362 from the restraint of their latches 369 (Fig. 14). Once the gag bars are set up, these latches will be so controlled by their set pieces 473 that they will not again be released.

In order to move the bars 415 and 419 rearward to clear any gag bars connected therewith, the links 416 which connect the front and rear bars of each pair are attached to forwardly extending links 710 (Figs. 9 and 47), which in turn are pivoted to arms 711 fast on two transverse rock shafts 712 and 713 for the lower and upper clearing bars, respectively. Both shafts are journalled in the side frames 254 and 255 (Fig. 7) and project a short distance outward from the left hand side frame 255 where shaft 712 is provided with an arm 715 (Fig. 47) and shaft 713 an arm 716. At their free ends, arms 715 and 716 are provided, respectively, with studs 717 and 718, adapted to be acted upon by hooks 720 or 721. Both of these hooks are pivoted to a slide 724, having a slot 736 guided by a fixed stud 737 for reciprocation at an inclination, herein, for brevity, called up and down. Two bellcranks 725 and 726 are pivoted, respectively, on the same studs 722 and 723 as the hooks 720 and 721, to which they are connected by a spring 727 or 728 which tends to rock the hook into contact with a limit stud 730 or 731 on the related bell-crank 725 or 726. The depending arms of the bell-cranks 725 and 726 are connected by a tension spring 732 which through limit studs 730 and 731 tends to rock the hooks 720 and 721 free of their related studs 717 and 718. This rocking is limited by two studs 733 and 734 against which the bell cranks 725 and 726 are tensioned in the inactive position of the parts as shown in Figs. 10 and 47.

The hooks 720 and 721 are rocked selectively into engagement with the studs 717 and 718 at appropriate times on signal from the tabulator. To this end, the bell-cranks 725 and 726 are provided, respectively, with arms adapted to be acted upon by a Bowden wire 750 or 751, the casings of which are affixed to flanges of the slide 724.

The construction is such that if, with the parts as shown in Fig. 47, the bell-crank 725 for example, be rocked by its Bowden wire, the hook 720 will move into contact with the stud 717, further motion of the wire stretching the spring 727. Later on, the slide 724 moves upward, and the hook snaps over the stud, and the shaft will be rocked by the downward movement of the slide 724.

At its lower end the slide 724 is pivoted to an arm 738 (Figs. 7 and 10) on a sleeve 740 loosely mounted on a stud 741. Also fast on sleeve 740 and offset from arm 738 is another arm 742 connected to a long downwardly extending link 743, which at its lower end (Fig. 48) is connected to a follower lever 744 pivoted at 453 and carrying a roller 746 which is pressed by a spring 748 against a cam 747 on the rear drive shaft 257. The timing of these parts will be described hereinafter.

In order to prevent noise and shock when the gag bars 364 are snapped back to their normal positions the stop bar 372 (Fig. 14) may have any suitable buffer 416 arranged along its forward edge. In order to provide for adjustment of said stop bar any suitable adjusting screw 417 may be provided, passing through a frame bar or block 418, one such arrangement at each end of the bar 372. The bar 372 may conveniently be supported by having each of its ends extend into a slot 420 (Fig. 9) in the side plate. Forward of said slot is shown an opening 421, wider than the slot 420, and through which the bar 420 may be inserted in assembling the machine.

*Framing of the head section*

It may be advantageous at this point to describe briefly the framing by which the mechanism in the head of the punching machine is supported. This may, of course, be of any suitable sort, but that shown in the drawings has been found advantageous. The various slides 362, 363, and 364 and their cooperating parts are mounted in three separately detachable sections 425, 426, and 427, the general form and arrangement of which may be understood from Figs. 9, 12 and 19. The section 425 carries the type bar slides 362 and their locking devices and also the ends of the Bowdens 167 that come over from the tabulating machine. The section 426 supports the gag bar releasing or clearing devices 406—415 and their associated parts, and the section 427 supports the sensing bars 363 and the devices associated with the gag bars 364 and the devices associated with them. It may be explained that Fig. 12 is a front view showing nothing but framing, and including the uppermost portion of the right hand frame casting 254, and that Fig. 9 is a view from the right, the lower part of which is taken just inside the right hand frame piece of the base of the punch and the upper part of which is taken on the line 9 of Fig. 12. In said Fig. 12 it will be seen that the side plate 385 of the section 425 has fastened thereto a casting 430, in the form of an angle bar secured to the said side plate with screws; and the left hand side plate is similarly made. Each of these flanges 430 rests on a flat surface on the top of the right hand casting 254 or the left hand casting 255 where it is secured by screws 431. On removing these screws the section 425 can be lifted off. The casting 430 (Figs. 9 and 10) has a bracket 432 cast integral therewith and supporting the clamping device 361 which carries the Bowdens coming over from the tabulator. Said bracket 432 and a similar one on the other side of the machine may support a sheet metal guard 433 to protect the Bowdens after they emerge from the clamp 361 and in their various curves around to the point where they are supported inside the section as hereinbefore described. When the section 425 is lifted off the frame castings it may be turned and moved over to one side, bending the long cable or bundle 170 of Bowdens between the punch and the tabulator. It will be noted in Figs. 13 and 14 that the relation between the bars 362 in the section 425 and the bars 363 in the section 427 are such that they can be separated simply by lifting one from the other.

The section 426 (Figs. 9, 10 and 13) has side plates 434 each of which has a flange 435 formed off from its lower edge and resting on a ledge (Fig. 12) of the casting 254 or on a similar ledge of casting 255 where it is secured by screws. In Fig. 12, all of this section except the said flange and a fragment of the side plate have been removed in order to better show the mounting of the section 425. In Fig. 12, the bracket 432 has been sectioned away on the line 12 of Fig. 9, in order to better show the construction. By unscrewing it from the frame and disconnecting certain operating devices, the section 426 may be removed as a unit from the machine.

Section 427 has side plates 440 from which, at intervals, as shown in Fig. 9, are formed off flanges 441 which (Fig. 12) rest on cast brackets or bars 442 to which they are secured by screws 443. The brackets 442 may consist of separately cast bars, suitably secured to the frame castings 254 and 255. The section 427 may be removed from the machine on removing the screws 443 and disconnecting certain operating devices. If the other two sections 425 and 426 have already been removed, the section 427 may be lifted bodily out of the machine. This section can also be drawn out from the rear end of the machine, sliding on the bars 442, provided the other two sections are first loosened and raised a little.

This manner of mounting the head mechanism in sections greatly facilitates the manufacture and service of the machine in which otherwise many of the parts would be accessible only with difficulty.

*The gag bars and the cooperating plungers*

The gag bars 364 and their depending fingers 376, 377 and also the plungers 320 acted on by said fingers have been modified from former constructions so as to secure in the upper part of the wiring unit 311 the same compactness of lateral spacing as the slides 364, etc., by which it is controlled. In Fig. 13 these parts are shown in normal position except that the gag bar 364B has been advanced to zero position by means to be described hereinafter, and in Fig. 21, a gag bar 364A is shown set to punch "one" and a gag bar 364B to punch "two." It will be observed that in the former case, the finger 376 stands over the "one" plunger 320 but extends only to about the middle of the width of said plunger, whereas in the bar 364B the finger 376 still stands over the "one" plunger, but over the left hand half of it instead of the right so that this plunger will still be acted on.

The "one," "three," "five," and "seven" plungers 320, each has its upper end wide enough so that it may be depressed either when the finger 376 is over the right hand half of it to punch an odd number, or over the left hand half of it to punch an even number; and the "nine" plunger has its right hand half of the same height as the other plungers but its left hand half is prolonged upward into a finger 445 long enough to be depressed by any one of the fingers 377. When, as in the case of the bar 364A, the bar is set at "one," the left hand finger 377 stands over the right hand half of the "nine" plunger and does not operate the latter; but when the bar is set one step further leftward as at 364B then this finger 377 will depress the "nine" plunger while the finger 376 depresses the "one" plunger. If the bar 364 be set still another space leftward the finger 376 will stand over the "three" plunger 320 and the finger 445 will be between the first and second fingers 377 and free of them, and so on. Extending leftward from the finger 376 is a shoulder 446 in line with the fingers 377, and the left hand portion of this shoulder constitutes in effect a fourth finger 377, which depressed the "nine" plunger when the gag bar is set at "eight." When the gag bar is set at "nine" the finger 376 stands over the right hand half of the "nine" plunger 320 and almost in contact with the finger 445. It will be noted that when the bar 364A is set at "nine" its fingers 377 pass in behind the fingers of the bar 364B as viewed by the observer in Fig. 21, but none of them ever reaches far enough to the left to operate finger 445B.

There are two sets of plungers 320 arranged along in a continuous row, and each of these plungers is made thick enough so that they are all properly operated, the A fingers acting on the half of the plungers 320 farthest from the observer in Fig. 21, and the B fingers on the plungers near their forward edges. The "zero" plunger 320 has only its left hand half projecting above the top of the wiring unit so that the portion of that acted on by the finger 376 is a comparatively slender finger. When a gag bar is set at "zero" (bar 364B, Fig. 13) this finger stands under the right hand half of finger 376 as viewed in the drawing. It will be noted in Fig. 13 that when the gag bar 364 is in its normal position (bar A) no zero will be punched, but the bar must be drawn leftward to the position just above described in order to punch a zero.

It will be noted in Fig. 21 that the finger 376A stands over the right hand half of the plunger 320A for the digit "one." If the gag bar 364A stood one ratchet tooth space to the right of its "one" position the finger 376 would stand over the slender finger of the zero plunger, and the parts would be set to punch a zero. If the initial inactive position of the gag bar as shown in Fig. 13 were only one tooth space to the right of the zero position, then the finger 376 would stand with its left hand edge only a very short distance to the right of the zero plunger, and in case of some slight inaccuracy of positioning, a zero might be punched when it was intended to punch anything. Accordingly, the normal position of said finger is made a little more than a tooth space from its zero position. For example, in the machine illustrated in the drawings, the spacings of the rack teeth 373 on the gag bar is $\frac{3}{32}$ inch, but the normal position of said bar places the finger 376 $\frac{7}{32}$ inch from the zero position.

For obvious reasons the parts are so designed that when the sensing bar 363 is advanced, say, to punch a "two," the point of the pawl 374 will be positioned half-way between the "two" tooth and the "three" tooth or half a tooth space beyond its two position. When the sensing bar advances, therefore, the total lost motion between it and the type bar amounts to $\frac{7}{32}$ inch plus one half tooth space.

A gag bar and plunger arrangement somewhat similar to the one here shown is described in the patent to Mixer 2,214,029, but in that patent the plungers corresponding to the present plungers 320 are comparatively slender and the finger like 376 is comparatively wide, and no provision is made for punching zeroes. The present construction lends itself better to the punching of zeroes or not, as desired, means to which end will be described hereinafter. Preferably there is no tooth 373 for the zero position because, if there were, zeroes would always be punched, which is not desired, and the teeth are only those for the digits one to nine, inclusive.

Restoring the sensing slides

The restoring bar 370 for the sensing slides 363 is reciprocated by a cam 450 (Figs. 10 and 53) on the front power shaft 256. A follower roller 451 (see also Fig. 6) is mounted between the two parallel arms of a follower lever 452 pivoted on a stud 453 projecting from the base frame 253. Said follower lever is connected by a long link 454 with an arm fast on a shaft 456 journalled in the side frames 254 and 255. The bar 370 extends clear through both the right and left frame castings (see also Fig. 8) and at each end it has secured thereto a block 457, to which is pivoted a link 460 which is also pivoted to an upright arm 455 fast on the shaft 456. The projecting portion of the bar 370 preferably has a guide roller 461 which prevents right and left hand movement of the bar in the frame. The cam 450 moves the bar 370 frontward, and the latter is moved rearward by any suitable spring 462 (Fig. 10).

The bar 370 is guided in any suitable horizontal slots in the frame work. In the present instance, on each side of the machine, the restoring bar runs between two guide bars 463, bolted to the inside face of the frame casting 254, 255 (Fig. 12).

Releasing the type bar slides

The means for tripping the latches 369, which normally restrain the type bar slides 362, will now be described. Said type bar slides are normally locked by said latches but if, on any cycle of the machine, one of them be released before the restoring bar 370 advances, then on that cycle the associated gag bar 364 may be set in position to cause the punching of a digit. Means are provided, presettable, to cause any selected one or group of the latches to be tripped at the proper time and said means may be set to cause such releasing to occur on different cycles. For example, on a total cycle, those slides will be released whose function it is to punch the total; on another cycle, slides will be released whose function it is to punch a designation taken from a card in the tabulator; and provision may be made for a variety of selections of slides to be released.

In the form of the invention shown in the drawing, the latches 369 are pivoted at 470 (Fig. 14) and guided by a comb plate 471 supported by the frame bars 382 and 381, and each of said latches is extended rearward to constitute a lever of the first order which may be rocked by a link 472 pivoted to a hand settable interponent 473. Said interponent has at its front end a nose 474 which, in the left hand part of Fig. 14, is shown standing beneath a universal releasing bar 475. If this bar be depressed, it will rock the latch lever 369 to release the slide 362. Preferably, several of these bars are provided which are moved downward under certain controls which will be described hereinafter, four such bars being shown in the present instance, and numbered 475, 476, 477 and 478. The piece 473 has on its underside a series of notches 480, one of which has seated therein the edge of a sheet metal bar 481. Each of said pieces 473 has a finger 482 projecting upward into a slot in a plate 483 to serve as a guide for said piece. Each piece has a sort of handle 484 by which, if it be lifted, the piece 473 may be slid front or back so as to engage the bar 481 with any desired one of the notches 480, thus bringing the nose, or finger, 474 into register with any desired one of the releasing bars 475—478. The piece 473 has also a fifth notch, namely, the extreme end one, and if this notch be engaged with the bar 481, the finger 474 will stand out in front of all the release bars, as shown in dotted lines in Fig. 14, and will, therefore, not be depressed by any of them. All of the pieces 473 not to be used at all in any particular run of cards would be set in this position. A spring 485 connecting the rear end of the lever 369 with the piece 473 serves to hold the latter in proper engagement with the bar 481 and to rock the latch lever to locking position.

It will be noted in Figs. 14, 18 and 19, that there are two complete sets of these releasing devices, namely, an upper forward one, serving the "A" sets of slides, and a lower rear one, serving the "B" sets of slides.

As far as the invention thus far described is concerned, the bars 475—478 may be mounted and selectively operated (depressed) by any suitable means under suitable control; but the arrangement shown in the drawings is an advantageous and preferred one. As shown, each of these is a long bar extending clear across the type bar slide section of the machine and projecting through windows 486 in the side plates 385 and extending a suitable distance beyond said plates; and it is held up by two springs 487 (Figs. 14 and 19) hung from studs projecting inward from said side plates. The guiding and operating means for the ends of these bars are alike at all four windows 486 and a description of one will make the rest readily understood. The set shown in Figs. 38 and 39 is the forward and higher one of the two shown in Fig. 10. As the one of these nearest the observer in Fig. 10 has some special device associated with it, this one has been removed in Fig. 39, which shows the other three. Four slides 490 are of different shapes and each has one of the releasing bars passing through it. Each of the slides has at top and bottom an elongated hole 491, by which it is mounted on a stud 492 for sliding motion up and down, the slides being spaced apart by spacers 493 (Fig. 38). Each of these slides is so shaped that its up and down middle part encloses one of the bars 475—478 but does not interfere with the other bars, as will be understood from Fig. 39. These slides 490 are normally held in their upper positions (Fig. 39) by the springs 487 acting on the releasing bars. Each of the slides 490 has a stud 494 which is acted on by a three-armed lever 495 pivoted on a stud 496 projecting from the side plate 385. There are, of course, four of these levers suitably spaced apart on said stud. As will be seen from Fig. 10, this whole arrangement is duplicated on the lower rear set, whose levers 495 also have depending arms connected with like arms of the forward set by links 498. The construction is such that if the forward lever 495 be rocked counter-clockwise, it will pull down its slide 490 and associated releasing bar and, through link 498, also depress the corresponding releasing bar of the rear set. Thus the releasing bar 475 of the front set and the releasing bar 475 of the rear set are operated in unison; and the same applies to all the other three bars. It will be perceived that the two sets of these devices operate in unison so as to control the "A" sets of slides and the "B" sets of slides in precisely the same way, the two sorts of sets being provided, as above explained, for economy of lateral spacing. A comparison of Figs. 9 and 10 will show that the whole arrangement above described is repeated on the right hand side of the machine in order to depress both ends of a releasing bar simultaneously, as will presently be described.

It is desired that the several releasing bars be operated selectively and to that end the following means are provided. A rock shaft 500 (Figs. 5, 9, 10 and 39) passes through both the frame plates 385 and at its left hand end has an arm 501 connected by a link 502, with the inner arm of a two armed lever 503, pivoted on a stud 504, the two arms being offset so as to bring one of them closer to the machine than the other. The outer one of said arms is connected by a link 505 with a follower lever 506 pivoted on the stud 453 (Fig. 49) in the base of the machine, said lever having a follower roller pressed by a spring against a cam 507 on the rear cam shaft 257 of the machine. This cam is so shaped as to rock the shaft 500 counter-clockwise in Fig. 10, just before the restoring bar 370 (Fig. 9) begins its advance movement. The timing of these parts appears on the time chart (Fig. 55). Said shaft 500 has two arms 509 projecting upward therefrom, one at each side of the machine, and each has formed off therefrom a flange or ear 510. Each of the levers 495 of the upper front set has an upstanding arm to which is pivoted an interponent 512 which, forward of its pivot, is guided in a comb plate 513, and which is normally held in its upper position by a spring 514. In such upper position the front end of said interponent is out of the path of movement of the flange 510, but this interponent may be swung or set downward to active position where it stands in the path of such movement and will be forced rearward, rocking the lever 495, and through the link 498, the corresponding lever of the rear set. The rock shaft 500 and the flanges 510 are herein called the actuator for the interponents and the releasing bars. There are four of these interponents, and means are provided, under automatic control, to set them selectively into the path of the ear 510.

All of this selective operating mechanism, that is to say, the interponents 512 and operating lever 508, 510, are duplicated on the right hand side of the machine, as shown in Fig. 9.

The four interponents 512 are depressed selectively by four setting levers 515 (Fig. 39) pivoted and suitably spaced on a stud 516. The forward arms of these levers are of graduated lengths to be operated by four bell-cranks 517 (Fig. 40) pivoted on a stud 518 mounted on a bracket 520 secured to the side plate 385. These bell-cranks are in transverse planes perpendicular to those of the levers 515, and their horizontal arms are of graduated lengths corresponding to those of the levers 515, and each bell-crank 517, therefore, has its end lying beneath the end of only one of the levers 515 (Fig. 8). Each bell-crank 517 has a branch 521 adapted to be operated by one of four push rods or plungers 522 mounted in a bracket 523 secured to the bracket 520. Each rod 522 registers with the plunger 524 of one of four Bowdens 525 whose casings are secured to a bracket 526, here shown mounted on the main frame casting 255. These Bowdens lead to appropriate control devices and if one of them be operated, its associate push rod 522 will rock its bell-crank 517 counter-clockwise (Fig. 40), rocking lever 515 and setting the selected interponent 512 to be operated by ear 510.

The levers 515 are repeated on the right hand side of the machine (Fig. 9) and they are controlled by bell-cranks 527 (see also Figs. 5 and 8), whose horizontal arms are of graduated lengths like those of the bell-cranks 517, but whose vertical arms extend downward from their pivots, instead of upward; and said vertical arms are connected with those of the bell-cranks 517 by links 528 (Fig. 5). Whenever a bell-crank 517 is rocked by its Bowden wire, the corresponding bell-crank 527 is rocked also, so that this whole train of linkage, both right and left, is controlled and operated in unison. The links 528 make it unnecessary to have Bowdens on both sides of the machine.

It will be noted that if the type bar slide section be loosened and lifted off of the machine, the rods 522 will go with it but the Bowdens will remain attached to the main frame.

The special mechanism for controlling the rearmost releasing bar 478, which mechanism is omitted in Fig. 39, is shown in Fig. 41. A lever 530, pivoted on a stud 531, has at its forward end an ear 532 lying over the top of the first interponent 512 and beneath the associate lever 515, so that an operation of the latter depresses the lever 530 and with it the interponent. A spring 541 tends to rock the lever 530 upward. Near its middle the lever 530 has another ear 533 formed off therefrom and adapted to be engaged and held down at times by shoulders on two latch levers, viz., a latch 534 frontward of the ear 533 and a latch 535 rearward thereof. Said latches are pivoted on the stud 496. A pin or stud 536 projects from the upright arm of the lever 495 between the two latch levers which are drawn toward each other by a spring 537. Another spring 538 draws the latch lever 535 toward the front of the machine. The operation is as follows:

The lever 530 is normally free of both of its latches and is held up by its spring 541 with its ear 532 pressing against the lever 515; and the stud 536 holds the latch 534 out of action, as shown in Fig. 41, but the spring 538 presses the latch 535 against the edge of the ear 533. On receipt of a signal from the control mechanism, that is to say, when the lever 515 is operated by its Bowden wire, the latter lever depresses the lever 530 and moves the interponent down into the path of the operating flange 510; and the latch 535 is snapped over the ear 533 by its spring 538. When the shaft 500 is rocked as above described, the flange 510 depresses the releasing bar 478, the same as with the other three above described. When in this operation the lever 495 is rocked, the stud 536 moves rearward and permits the latch 534 to swing to where its shoulder is over the ear 533; and then said stud 536 pushes the latch 535 out of engagement with said ear. During this time, the lever 530 is held depressed by the lever 515; but when that lever is released from the pressure of its Bowden wire, the spring 541 draws the lever 530 upward a short distance until it is arrested by the latch 534. Meanwhile, the friction due to the pressure of the flange 510 against the interponent 512 is ample to retain the latter depressed. This pressure is preferably, though not necessarily, maintained throughout a large part of the cycle. When it is released by the return rocking of shaft 500, the lever 495 and the releasing bar 478 swing back to their initial positions. In this movement, the stud 536 first permits the latch 535 to move into engagement with the ear 533 and then moves latch 534 out of engagement. The interponent 512 and lever 530 then snap up a short distance until arrested by the latch 535, whose shoulder is a little higher than that of latch 534, but not high enough to let the interponent 512 rise out of the path of the operating flange 510. It results that the releasing bar will be depressed a second time, viz., in the next cycle of the machine. On this second operation the parts act as before, but with these exceptions. The lever 530 is not now held down by the lever 515, but only by the latch 535. When, on the rocking of the lever 495, the stud 536 moves rearward, the latch 534 follows it, but is unable to engage the ear 533. When, therefore, the stud 536 moves latch 535 out of engagement, the lever 530 is snapped by its spring up out of range of the two latches and the interponent 512 is now held down only by friction on the flange 510. When the latter rocks back to normal, said interponent will be raised to inactive position by its spring, and this train of mechanism will be returned to normal position and will not be operated again until a fresh signal is received over the Bowden wire.

*Control unit*

The summary punch performs most of its functions under the control of the tabulating machine. The mechanism of said punch is capable of accomplishing a variety of functions and combinations of functions in order to produce the sort of summary cards required or desired in connection with the accounting or statistical systems practiced by the users of these machines. The control may be of a variety of kinds and constructed in a variety of ways. In the present instance there will be described a rather simple set of controls, adapted to the particular tabulating machine shown in the drawing and to the more ordinary requirements of a summary punch. The primary purpose of such a punch is to make a punched card record of the totals and grand totals accumulated in the tabulator, together with such designatory matter as may be required to identify the accounts to which the various totals relate and such other matter as the user of the machine needs in a summary card. The controls in the tabulating machine, therefore, include controls operated by the total taking and grand total taking mechanism of the tabulator, which in the present specific instance is substantially that described in the Mueller Patent 2,381,361, hereinbefore referred to. It will be recalled that in that patent provision is made for actuating two totalizers or accumulators by the same set of combined type bars and actuating racks, group totals being taken from the lower set of said totalizers and grand totals from the upper one. This arrangement is not necessarily followed, it being possible, if desired, to take totals from different sets of racks and type bars and also to take great grand totals and great great grand totals from another set of type bars. In the present instance no controls for great grand totals and great great grand totals are described, but only for totals and grand totals. In the Mueller patent there is described a certain total taking unit comprising several cams, one of which sets the machine to take a group total and another of which sets the machine to take a grand total. Each of these cams actuates a train of linkage, and the controls may be operated by any convenient element of such a train. These trains include a so called total shaft 550 and a grand total shaft 551 (Figs. 1, 30, 33 and 36) which project through the left hand side plate of the tabulator where they carry arms 552 and 553, which through certain links 554 rock certain bell-cranks 555 (Fig. 36). There are four of these bell-cranks and their function is to control the engagement of the totalizers with their actuators for the adding of items and the taking of totals and grand totals; and in the present instance these shafts 550 and 551 are utilized to operate some of the controls for the summary punch. Fig. 36 is a partial view of the upper left hand portion of the tabualtor with the side plate 556 sectioned away, leaving only the flange thereof and looking from the inside of the machine, that is to say, from the right, the mechanism shown being outside of said side plate. The section is taken about on the line 36 of Fig. 35. A sheet metal frame includes a vertical plate 557 having the outline shown in dot-dash in Fig. 36 and secured against the outside face of the frame plate 556 by two existing bolts 558 which have been suitably modified for the purpose. This frame also includes a rear vertical flange 560 and a horizontal flange 561, formed off from the plate 557 and shown in section in Fig. 36. A stud 562 secured to the plate 557 has pivoted thereon two bell-cranks 563 and 564, each having a depending arm and a horizontal arm offset from one another and connected by a hub (Fig. 30). The depending arm of bell-crank 563 is operated by a link 566 from one of the arms 552 of the total shaft 550, and the bell-crank 564 is similarly operated by a link 567 from an arm 553 of the grand total shaft 551. The total bellcrank 563 has its horizontal arm pivoted to a vertical slide 570 so as to pull said slide down when the total shaft is operated; and the grand total bell-crank 564 similarly operates another slide 571. The upper bolt 558 is prolonged as shown in Fig. 35 and the two slides 570 and 571 have slots 572 which are guided on the post thus provided.

The slides or plungers 570 and 571 are pulled down, the one on the operation of the total linkage of the machine and the other on the operation of the grand total linkage, and they are used to actuate or initiate the actuation of any suitable means to transmit the desired signals to the punch and, as will presently appear, such transmitting means are selectively settable to transmit whatever signals may be required on a particular run of cards. If the signals are transmitted by electric circuits, in which case these plungers would close suitable contacts, the circuit would be arranged settable to transmit the desired signals. In the illustrated instance, signals are transmitted by Bowden wires, and settable devices are provided to cause one or the other of the plungers 570 and 571 to actuate selected ones of the wires or none at all, as desired. The arrangement and number of these wires may, of course, be varied according to requirements. In Fig. 35, the Bowdens are marked generally 573, and 574 illustrates a series of plungers or small rods, projecting up from the fixtures 575, by which the Bowdens are secured in familiar fashion to the flange or bracket 561 of the frame piece 557. In the present simplified instance, seven Bowdens are shown, each terminating in one of the rods 574. In Fig. 34, these rods are indicated and numbered 574C–574H, inclusive, and for clarity of description these letters C—H will be applied to the several Bowdens throughout their length clear over into the punch. The rods or plungers 574 are operated by pieces herein called pushers 576. These are shown (Fig. 35) as levers pivoted on a post 577 in one or more pairs, each pair at their free ends being guided in a slot in a guide plate 578. In the drawing two pairs of these pushers are shown, together with their associated devices. The following description refers to the pair nearest the reader in Figs. 35 and 54 and at the bottom of Fig. 34. Of that pair the proximate one is operable by the total plunger 570 and the farther one by the grand total plunger 571, as will be explained. Above each pusher 576 and between it and the plungers 570 and 571 is a settable transmittal piece 590 or 591, herein called a selector, the former being for totals and the latter for grand totals. These pieces 590 and 591 are each hand settable to active and inactive position. In Fig. 35 they are both shown in active position. These pieces 590 and 591 are guided in the same slot in the plate 578 as the levers or pushers 576 but they are thinner and are spaced a short distance apart. At their right hand ends in Fig. 35 they are guided in a slot in a guide plate 592. Each of them has two notches 593 and is drawn upward by a spring 594 which holds the piece with one or the other of its notches in engagement with the upper end of the slot in said guide plate. Each of them has a finger 595 projecting therefrom, that from the grand total piece 591 projecting upward and that for the total selector projecting downward for convenience of manipulation. By grasping one of these fingers either of these pieces may be set to its inner, active position shown in Fig. 35 or to its outer, inactive position. The inner end of the grand total selector 591 (Fig. 31) has its upper part cut away so that when this piece is in its inactive position the grand total plunger 571 will not depress it; but when set in its active position a sort of shoulder 596 thereon comes under the slide 571 as shown in Fig. 35 so that when the latter is depressed it will push down the piece 591 which, in turn, will operate the appropriate pusher 576 which will operate the desired Bowden wires. The total selector 590 is cut away (Fig. 32) so that it can never be depressed by the slide 571, but it has a finger 597 which, when the piece 590 is set active as shown in Fig. 35, stands beneath the total plunger 570 and will be depressed by it, operating the desired lever 576 and the desired Bowden wires.

Some of these Bowden wires may need to be operated only for totals and others only for grand totals and some of them require to be operated for both totals and grand totals. A Bowden wire that is to be operated by one only of the levers 576 has its little plunger 574 extended upward as a slender rod, its upper end standing beneath the appropriate lever 576, as shown at 574H (Fig. 34); but where the Bowden is to be operated both on totals and on grand totals, the plunger is provided with a flat head wide enough to be depressed either by a total lever or a grand total lever, as illustrated. Thus, in Fig. 34 it will be seen that the Bowden 573H is operated only on grand totals, and that the remaining Bowdens are operated both on totals and on grand totals, provided, of course, the appropriate pieces 590 and 591 are set active.

The mechanism just above described may suffice for controlling all those functions of the summary punch which are required for every total and grand total card; but there may be instances of other functions that sometimes are and sometimes are not desired on some total taking operations or grand total taking operations or both. In such a case, one or more other pairs of selecting devices may be provided, one such other pair being shown, viz., a pair of pushers 5761, a total selector 5901, and a grand total selector 5911. Any Bowden may have its plunger 574 arranged, like 574H, to be operated by one only of the pushers 5761 or to be operated by both. In the present instance, only one Bowden 573F has its plunger 574F operated by these devices, and it has a head so as to be operable either on total or grand total, according to the setting of the selector pieces, all for a purpose which will be explained hereinafter.

It will be obvious that the Bowdens 573 may be used to control the functions of the punching machine in a great variety of ways and that Bowdens other than the six here shown may be added. The principle of the invention will be understood from a detailed description of the Bowdens shown in the drawings and their functions. Perhaps the simplest operation of the machine would be where a number of groups of item cards were being run off on the tabulator and their totals printed, and where a summary card is punched for each group containing the amounts of the total or totals of each group and nothing additional to that. This is not a usual operation as it is generally desired to punch designatory matter also.

In the control unit illustrated in Figs. 30-36, the plunger 574C and Bowden 573C are used to release those slides 362 in the punch which set up the amount of the total or grand total. Said Bowden goes over to the punch and operates the right hand end one of the push rods 522 (Fig. 39) which operates the right hand end one of the levers 515 (Fig. 40) which sets the interponent 512 to cause the release bar 475 to be depressed at the proper time. In setting up the punch, those slides 362 chosen to control the punching of the total will have their release devices set to be tripped by this releasing bar 475, as shown in Fig. 14, where the settable interponent 473A is set with its lug 474 beneath said bar. In the tabulator the total selector 590 will have been set in active position (as shown in Fig. 35), but the selector 591 will have been set in inactive position.

If it be desired to punch grand totals and not group totals, the set-up is the same except that selector 591 is set active and selector 590 inactive.

As previously mentioned, it is usually desired that summary cards contain certain designative data, and to this end, the instant machine provides means whereby this data may be taken from the first card of a group in the first cycle following a total cycle, and means whereby it can be taken from any other card of a group. The former means will now be described.

A plunger 574F is located so as to be depressed by either of the pair of pushers 5761 (Fig. 34) if the related total selector 5901 or grand total selector 5911 be set active. It will be noted that in the present instance this is the only plunger placed under these two pushers, the reason for which will be explained hereinafter. Plunger 574F is adapted when depressed to operate a Bowden 573F which is carried over to the punch and operates the bell-crank 517 farthest from the observer in Fig. 40, said bell-crank having the shortest horizontal arm of the four shown. This particular bell-crank 517 controls the releasing bar 478 through the two cycle mechanism hereinbefore described, and those slides 362 whose function it is to set up the designation will have their interponents 473 set so as to be operated by said bar 478.

In order to start the punching machine to punch a total or grand total summary card, the plunger 574E (Fig. 34) is depressed by the total or the grand total pusher 576, as the case may be, thus actuating the Bowden 573E (Fig. 35). The selectors 590 and 591 are operated respectively in the latter part of the blank cycle and of the total cycle of the total taking or grand total taking operation of the tabulator. It is desired that the punch when in operation shall run in cycles approximately synchronous with those of the tabulator. The total and grand total shafts are operated much too early in the cycle to produce this result and for this and another reason, the Bowden 573E does not itself trip the clutch of the punch, but is used to set an interponent into the path of some part of the tabulator which makes a movement approximately at the end of the cycle of that machine. There are several such parts in the tabulating machine, the one utilized in the present instance being a lever 601 (Fig. 54) in the base of the machine, carrying a followed roller 602 cooperating with a cam 603 on the main base shaft of the machine, said cam being concentric except for a hump 604 which passes and raises the roller 602 just at the end of the tabulator cycle. In fact, the lever 601 and its connections are the means used to bring the tabulator itself to a stop at the end of a cycle. As these parts are very familiar in these machines, they are illustrated only diagrammatically in Fig. 54. In the tabulating machine, lever 601 operates a push bar 605, which when a certain interponent is in active position, opens the clutch of the tabulator and stops the machine. The upper end of this push bar is here made of double width so as to actuate a second interponent 606 in the form of a lever of the first order whose fulcrum 607 is on an arm 608 loosely pivoted on an existing pivot rod 610. This link 608 is normally retracted by a spring 609 to the position shown in Fig. 54 where the end of the lever 606 is out of the path of the push bar 605. The Bowden 573E which is operated by the plunger 574E has its casing secured to a bracket 612 and its wire acting on an ear 613 of the lever 608 so that when said plunger is depressed the lever 608 will be rocked and the interponent 606 will be moved with its left hand end over the bar 605. When, at the end of a cycle, this bar is operated, the lever 606 will be rocked and its forward arm will operate the Bowden 600 which is carried over to the punch where it strips the clutch, thus starting the cycle of the punch coincidentally with the beginning of a new cycle of the tabulator.

The start and stop mechanism of the punch may be of any suitable sort, quite a number of such mechanisms being known in the art. The one shown in the present drawing comprises a cam 614 (Fig. 46) mounted on the front main shaft 256 of the machine and having a concentric outline except for a hump 615 which, by follower roller 616, operates the stopping lever 617 and imparts an up and down reciprocation of the push bar 618, all as familiar in these machines. It will be recalled that the clutch is closed by a strong spring 266 (Fig. 25) acting on a grooved collar controlled by a fork 267 fast on a rock shaft 268, this spring tending to impart a strong torque to the shaft 268, counter-clockwise in Fig. 25, that is to say, clockwise as shown in Fig. 46, which is a left hand view. Said shaft carries the usual arm 620, which in this as in several Remington Rand machines, is normally held down by a vertical link 621 pivoted to a horizontal lever 622 pivoted at 623 to a fixed part and having near its rear end a block or lug 624 standing above the end of the push bar 618. An interponent lever 625 of familiar design is pivoted to the arm 626 which may be rocked to the active position shown in Fig. 46 where the interponent 625 has it shoulder 627 over the end of the push bar 618 and the flat upper edge of the interponent is under the lug 624, and to an inactive position where a notch in said interponent is over said push bar (Fig. 43).

When the interponent is active, then at the end of the cycle the lever 622 will be rocked, forcing downward the link 621 and rocking the shaft 268 counter-clockwise (Fig. 46), and thus opening the clutch.

In most machines of this general type the interponent 625 is normally drawn rightward (as viewed in Fig. 46) by a spring, with the effect that when the machine is started it will run continuously until, by some means, the interponent is moved to active position. The present machine, however, is designed for intermittent operation under control of the tabulator and, when started, it is required to run only a few cycles and then stops to await a fresh signal from the tabulator. The illustrated machine is sometimes required to execute one cycle, sometimes two, and sometimes three cycles. Accordingly, the interponent is normally held in its active position by a spring 629 and, therefore, when the machine is started it will stop at the end of one cycle unless means come into action to prevent it. Such means will be described in detail hereinafter.

In these machines the clutch is closed to start the machine by momentarily breaking the connection between the link 621 and the arm 620, thus allowing said arm to rock upward, a movement which is made possible by the fact that the stud 630 on said arm engages in a slot 631 in the link (Fig. 17). Several schemes for breaking this connection are already known and any of them may be used, if desired, in the present machine, one of them being shown, for example, in Patent 2,381,361 and another in the patent to Alvine 2,151,177. In the present instance, there is provided a novel breakable connection which can be operated with less resistance on the device that trips it, which in this instance is the Bowden wire 600 which it is not desirable to overload. In the form shown, the arm 620 is held down when the machine is stopped and pushed down in the act of stopping the machine by a lever 632 (Fig. 46) pivoted at 633 to the link 621 and influenced by a spring 634 to move the lower end of the lever into engaging position determined by a limit pin 639. The engagement between this lever and the arm 620 is such that the line of force acting on the lever is at a little distance to the left of the pivot point 633 of the lever so that said pressure tends to rock the lever clockwise against the tension of its spring 634, the spring 266 of the clutch being far stronger than the spring 634. The lever 632 is normally held in its active position by a latch 635 pivoted at 636 to the link 621 and urged to latching position by the spring 634. Said latch is in the form of a bell-crank and its upright arm is engaged by the end of the Bowden wire 600 whose casing is secured to an ear 637 of the link 621. When, therefore, in the tabulator, an impulse is sent over the Bowden 600, it trips the latch 635 and the pressure of the arm 620 swings the lever 632 clockwise out of engagement with said arm and the arm immediately moves upward, thus closing the clutch. The impulse from the push bar 618 by which the link 621 was pushed downward is only momentary and said link is, therefore, locked down by a hook or latch 640 (Fig. 45) which is pivoted on the end of a fixed post 641 (Fig. 43) and influenced by a spring 649, said latch engaging over a block or lug 642 secured to the inner face of the link 621. The action of this mechanism is a bit intricate but it can be understood by reference to Fig. 17, which shows the parts in the positions they occupy for a brief instant in the act of closing the clutch. It is to be remembered that the lever 632 and latch 635 are mounted on the link 621 which has an up and down motion, but the hook or latch 640 is pivoted to a fixed part of the machine. When the arm 620 is down and said hook is caught over the lug 642 on the link, the pressure of the clutch spring 266 is communicated by the lever 632 to the link 621 which is held down by the hook 640. This pressure is considerable and there would, therefore, be considerable frictional resistance to pushing the latch 640 out of engagement. However, when the clutch is tripped and the lever 632 is turned out of engagement with the arm 620, the stud 630 on said arm is free to move upward in the link 621 and the upward pressure of said link on the hook 640 is relieved. The lever 632 is thrown out of engagement by a rapid movement due to the heavy pressure, and as it passes out, the upper arm of it strikes a pin 644 projecting from the hook 640 through a hole 645 made for the purpose in the link 621. The arm strikes this pin a blow and knocks the hook 640 out of engagement. However, the spring 639 extends from the hook 640 to a pin 646 on the link 621. As this hook is on a fixed part of the machine, the tension of the spring 649 immediately moves the link 621 to its topmost position, correspondingly rocking the lever 622 from which that link depends. This upward motion of the link brings the lower end of the lever 632 above the arm 620 which arm is then in its uppermost position. The lever 632 is, therefore, immediately thrown back over the arm 620 by its spring 634. Meanwhile, the spring 649 will cause the hook 640 to be pressed into engagement with the vertical side of the lug 642. The impulse of the Bowden 600 is only momentary so that as soon as the lever 632 returns to its normal position, the latch 635 snaps into engagement with it and holds it there. At the end of these movements the parts are in the same relative positions as shown in Fig. 46, except that the arm 620 and the link 621 are in their upper positions and the hook 640 is, therefore, not engaged over the block 642, but is merely pressed against the side of it. It will be perceived that with the parts in this position, the next time the lever 622 is rocked by the bar 618, the parts are in a position to push the arm 620 down and open the clutch, whereupon the hook 640 will be caught over the lug 642 and retain it there. It may be remarked that the several movements above described following the tripping of the latch 635 take place so quickly that the eye is unable to follow them. Once the latch is tripped the arm 620 instantly rises and all of the other motions, being spring operated, follow one another very rapidly.

In order to cause the punching machine to run for two cycles, as when punching summary totals or grand totals, the following mechanism is provided (Figs. 43 and 46). A latch 650 is pivoted on a fixed post and is adapted to engage a stud 651 on the interponent 625, said latch being influenced by the spring 629. In the normal stop position (Fig. 46) where the shoulder 627 is over the push bar 618, this latch rests on top of said stud, but if the interponent be pulled to the right out of the path of the push bar, the latch will snap down (Fig. 43) and hold the interponent in that position. When the push bar 618 makes an up stroke at the end of the first cycle, it does not stop the machine, but a stud 652 on the push bar 618 lifts said latch out of engagement with the pin 651 and as soon as the bar 618 gets out of the way, the spring 629 draws the interponent 625 to its active position where it will stop the machine at the end of the second cycle. It will be noted that normally the machine runs for only one cycle, but when the interponent is pulled back to inactive position, it will run for two cycles. This two cycle operation may be useful in various relations but in the instant machine it is used only when punching totals or grand totals. To this end the withdrawing of the interponent to its inactive position is effected by the Bowden 573D (Fig. 46) which springs from the plunger 574D (Fig. 34) which plunger is operated either by the total plunger 570 or the grand total plunger 571, or by both, according to the setting of the selectors 590 and 591. The Bowden may be connected with the arm 626 to which the interponent 625 is pivoted in any suitable way. In the instant machine this particular Bowden is used also for another purpose which will be explained presently, and for that reason the Bowden acts on a lever 653 pivoted to a fixed bracket 654 and by a stud 655 lifts a long link 656. The arm 626 is fast on the stub shaft 657 on the other end of which is an arm 658 having a stud 660 in a slot in the link 656; and said stud is connected with the stud 655 by a tension spring 662 which normally holds the stud 660 in the top of the slot. When the Bowden is operated and the link 656 moved upward, it will withdraw the interponent 625 if the latter is free to move at the moment. Otherwise it will tension the spring 662 which is stronger than the spring 629, and the latch will snap back when it is free to do so. The plunger 574D is, of course, operated in the second half of the blank cycle or the total cycle of the tabulator and remains operated until the latter part of the total or grand total cycle so that at the end of the blank cycle or of the total cycle the interponent 625 will be in inactive position.

Card feed

The card feeding mechanism of the punch is, in the form shown, of a sort familiar in these machines. The rock shaft 274 which (Fig. 11) operates the card picker has thereon outside the frame work an arm 670 (Fig. 46) connected by a link 671 to a lever 672 pivoted on a stud 673 and having a follower roller 674 acted on by the card feed cam 675 against which the follower is pressed by a strong spring 676. All of this is substantially as in former machines except that the cam 675 is differently timed. The link 671 has in it a notch for engagement by a latch or lock 677 fast on a rock shaft 678, said rock shaft having thereon inside the machine another arm 680 (Fig. 44), a stud 681 on which engages in a slot in the lower end of the link 656 hereinbefore mentioned. In most prior machines, a lock similar to the lock 677 has been provided and normally spring held out of engagement. In the present machine, however, the card feed is held by this lock normally inoperative, that is to say, the lock ordinarily holds the link 671 and, therefore, the picker in its extreme forward position against the tension of the spring 676 (as shown in Fig. 46). This lock is lifted out of locking position only when the link 656 is pulled up, as hereinbefore described. The stud 681 is held in the upper end of the slot by a spring 682 so that in case the link 671 is under strong spring tension at the time the link 656 is raised, this spring can stretch and will snap the lock out of engagement at the proper time. It will be recalled that this link 656 is pulled up by the Bowden 573D which also sets the drive mechanism for two cycles, and it is shown in Fig. 43. These two mechanisms, viz., the two cycle mechanism and the card feed, may, of course, be controlled by separate Bowdens but in the instant machine the two cycle operation and the card feed happen always to be wanted at the same time, and it is, therefore, simpler to operate both of them by one Bowden. The link 656 is normally held in its lower position not only by its weight, but also by the tension of the spring 629. It may be remarked that the timing of the card feed is such that when in the first half of the total cycle the punches are down, the card chamber is empty; and a card enters it in the latter half of the cycle when the punches are up, said card then being punched in the first half of the next cycle. The card is started by the picker at around 90°, reaches the card chamber at around 260°, and is arrested by the card stop at about 10° of the following cycle. Said stop is opened at about 250° and is closed by 350°.

Card stop

Just outside the left hand base frame 253 the rear cam shaft 257 has thereon a cam 685 (Fig.

51) which controls the card stops through a follower arm 686 having a roller 687 and fast on a transverse rock shaft 688 (Fig. 10). The shaft 688 extends through the machine to the right hand frame plate 252 and it has fast on it two arms 690 (Fig. 51), each having pivoted thereto a link 691 pivoted to an ear 692 formed off from the sliding card stop 693. Said card stop consists of a bar of sheet metal mounted on the outside of the frame 290 of the die section of the machine and slidable up and down on two headed screws 694. One of these screws has a stud to anchor a spring 695, normally pulling the stop upward. This whole construction is of an ordinary and familiar kind and is, therefore, only partially illustrated. It differs from those previously used in this class of machines only in the outline of the cam 685 which determines the timing of the stops.

*Card control of designation*

In order to provide for punching designatory or other matter taken not from the first card of a group but from some other card, the following means are provided. Where this operation is desired, the card from which the matter is to be taken is punched with a control hole which causes the actuation of a Bowden wire 700 (Fig. 54) in the wiring unit of the tabulator, said wire terminating at a fixture 701 attached to the wall of said unit, and a fixture 702 attached to the frame of the machine has a plunger 703 which when the wiring unit is in place may be operated by the Bowden wire 700. This plunger actuates a Bowden 573J which leads over to the head of the punch where it actuates plunger 522J (Fig. 39), which is adapted to set up for operation the releasing bar 477 in the manner hereinbefore described. Those type bar slides and gag bars which are intended to set up this designatory or other matter have their settable devices 473 set to be depressed by this bar 477 resulting in the release of the desired type bar slides.

In order to start the punching machine for one cycle to effect this set-up, the plunger 703 (Fig. 54) also actuates another Bowden 704 which leads to the clutch trip arm 608 so that when the card is sensed this clutching device will be pushed over to active position and at the end of the tabulator cycle the punch will be set into operation, to set up the designatory matter. At this time only a single cycle is wanted and no card feed is wanted, and the Bowden 573D is, therefore, not actuated.

A plurality of these card controlled devices may be provided, two being shown in the present instance, that is to say, another wire 705 of the tabulator wiring unit (Fig. 54) is adapted to actuate Bowden 573L to control the releasing bar 476 (Fig. 39). Any time that it is desired to use this device, the appropriate settable devices 473 will be set to be operated by this releasing bar. The Bowden 705 also operates a Bowden 709 (Fig. 54) leading to the clutch control lever 608 so as to start the punch for one cycle, the same as the Bowden 704.

Generally, the card controlled set-up for designatory matter and the automatic mechanism for setting up the designation from the first card after total would be alternative set-ups of the machine; that is to say, the user would probably want one or the other of these modes of setting up the designation but not both. It is for this reason that the plunger 574F is controlled not by the two selectors 590 and 591 but by the independent pair 590I and 591I. When the designation is to be taken only from a control card the two settable devices 590I and 591I for this special pair of pushers will both be set inactive so that the automatic first card after total mechanism will not be actuated. However, both designation set-up devices may be used if the requirements for the work make that desirable.

*Retract mechanism*

The locking slides 301 (Fig. 11) for the set pins 300 are essentially of the construction usual in these machines, that is to say, each of said set pins has a stud 750 adapted when the pin is depressed to be caught and held down by a latching shoulder 751 on the slide 300, said locking shoulder being snapped over the stud by the usual spring pressed pin 752. The operation of retracting the set pins consists of momentarily pushing the slides leftward in Fig. 11. The means for thus retracting or releasing the set pins may, for most of the purposes of the present machine, be of ordinary construction. Preferably, however, means are provided for controlling the retracting of each individual column independently of the other columns, a "column" referring to six pins. In Fig. 11, the upper slide 301 controls the six set pins for the upper zone of the card and the lower slide, the six pins for the lower zone.

The set-up mechanism for retracting the locking slides selectively is mounted in a frame comprising right and left side plates 753 (Figs. 9 and 11) connected together by four transverse bars 754 and by a fifth bar 755. Each of the end plates 753 has therein a horizontal slot in which a cross bar 757 is adapted to slide left and right in Fig. 11, that is to say, toward the front and back of the machine. Each of the slides 301 has projecting from its rear end a finger 758 adapted to be pushed leftward in Fig. 11 by a small slide 760, there being two tiers of these slides, the upper tier for the upper slides 301 and the lower tier for the lower slides 301 and each of said slides 760 is adapted to act on one of the fingers 758 to release the proper slide 301. The pusher slides 760 are guided in comb plates 761 secured to the cross bars 754. Each of the pusher slides 760 has pivoted thereto a settable control member 762 having near its forward end a tooth 763 adapted to a longitudinal slot 764 in the operating bar 757, there being such slots in the upper and lower faces of said bar adaptable to the upper and lower setting devices. If said settable member 762 be rocked to the position where its tooth 763 engages said slot then that particular pusher slide will be locked to the operating bar and that column of pins will be retracted at every cycle of the machine. The fixed transverse bar 755 also has upper and lower slots adapted to be engaged by teeth 765 on the rear part of the settable member 762 but normally standing rearward of the slot in the bar 755. If any settable member 762 be pushed by hand toward the front of the machine to the point where it moves the locking slide 301 to unlocking position, it may then be rocked to engage the tooth 765 in the slot and thus to hold that particular locking slide in releasing position so that even if one of the set pins in the column be momentarily depressed, it will not be locked down and will not operate the punch. In columns so set, no punching will occur even though set pins be depressed by the gag bars in the head of the machine. The said settable members 762 may also be rocked to an intermediate position where neither the tooth 763 nor the tooth 755 engages in a slot. In columns so set a number may be set up by the set pins once for all and said pins will not be retracted but the number so set up will be punched in all cards.

The operating bar 757 may be reciprocated by any suitable means, such bars being very common in machines of this class, and having been operated in a variety of ways. In the present instance, the means for reciprocating this bar is so constructed as to take account of the fact that when the bar is reciprocated front and back, it itself, in common with the balance of the set pin mechanism, is in motion vertically.

In the illustrated instance, a rock shaft 767 journalled in brackets 768 of the set pin box extends across the front of said box and has depending arms 770 to each of which is pivoted a link 771 extending rearward (Figs. 9 and 11), and pivoted to the projecting end of the operating bar 757 to reciprocate the latter when the shaft 767 is rocked. At one end, said shaft has a horizontal arm 772 to which is pivoted a long vertical link 773 having therein a longitudinal slot engaged by a stud 774 on an arm 775 fast on a transverse rock shaft 776. Inside the machine this rock shaft (Fig. 50) has a follower arm 777 whose roller 778 bears on a cam 780 on the rear drive shaft 257. This cam has a low concentric portion on the greater part of its periphery but has a hump which rocks arm 778 counter-clockwise and back at its high of about 270° of cycle. Examination of the time chart will show that at the this time the set pin box is near the top of its travel and, of course, the link 773 is moved up with it, bringing the lower end of the slot not far from the stud 774. The motion of the set pin box is very slow at this time being near the dead center, and the set pins are retracted at the time when the new set pins have about received their settings from the gag bars.

Several modes of operation of the specific mechanism above described in detail will now be set forth.

*Punching total alone*

It is possible for this mechanism to punch a set of cards, each one containing the total or totals of a group of cards run off in the tabulator and containing nothing more than that. It will be assumed that no grand totals are being taken at the time.

Preparatory to this operation the machine will be set up as now to be described.

For this operation, referring to Figs. 30-35, the total selecting device 590 will be set active, as shown in Fig. 35, and the total selecting device 5901 will be set inactive. The grand total selecting devices 591 and 5911 will also be set inactive, although they would never come into operation anyhow because no grand totals are being taken.

In the punching machine those type bar slides 362 which are chosen for the punching of the total will have their selecting devices 473 set to be depressed by the releasing bar 475, as shown in full lines at 473A (Fig. 14), and all other devices 473 will be set inactive. Also, in those columns chosen to punch the total, the finger pieces 414 which control the clearing of the gag bars will be set as shown in Fig. 13 at 414B, with the interponent 412 set to be operated by the clearing bar 415.

The operation is as follows:

When the total shaft 550 of the tabulator is rocked in the latter part of the blank cycle of a total taking operation, the selector 590 will be depressed, operating the four Bowdens 573C-573E, inc., and Bowden 573G. The Bowdens 573F and 573H will not be operated. In the punching machine the Bowden 573C operates the plunger 522C (Figs. 39 and 40) which raises the longest of the four levers 517 which through its associate lever 515 depresses into the path of the operating rocker 510 that interponent 512 which controls the releasing bar 475.

The Bowden 573D (Figs. 46 and 54) rocks the lever 653 which, through link 656 and arm 658, rocks shaft 657 and arm 626, which pulls the interponent 625 to the position shown in Fig. 43 where it is locked by the latch 650, thus setting the punch for a two cycle operation. Also, the link 656 when pulled up, acting through the arm 680 and rock shaft 678, swings the hook 677 out of locking engagement with the card feed link 671 and permits the card to be fed.

The Bowden 573E (Fig. 54) moves the interponent lever 606 over the top of the link 605, ready to be actuated and to operate the Bowden 600 at the end of the blank cycle.

The Bowden 573G (Figs. 10, 47 and 54) rocks the lever 725, putting the spring 727 under tension to draw the hook 720 over the stud 717, the hook 720 being at the moment in too low a position to be caught over said stud. In the course of the operation of the machine, the plate 724 will be moved upward sufficiently for the hook to catch over the stud and will later be drawn down to operate rock shaft 712 which, as hereinbefore explained, will result in the clearing of the gag bars.

When, at the end of the blank cycle, the plunger 605 operates the Bowden 600, the clutch mechanism illustrated in Fig. 46 will be tripped and the punching machine will start its operation. At that time there is no card in the card chamber of the punch, as will presently appear. For brevity of description, the set pin box of the punch and the wiring unit 311 mounted thereon will be referred to as the "set pin unit" of the machine. In the stop position this unit stands at the middle of its down stroke where the set pins (Fig. 11) are out of contact with the punches and where (Fig. 13) the plungers 320 of the wiring unit are below the fingers 376 of the gag bars so that said gag bars are free to be set. On the start of the machine, the pins 320 immediately begin to move further downward. One of the first things that occurs is the rocking of the shaft 500 (Fig. 39) which depresses the releasing bar 475 (Fig. 14) and lifts the latches 369 to free the type bar slides 362 whose function it is to set up the total. Said slides 362 are again locked at about 270° to 300° of cycle.

The first cycle of the punch is approximately contemporaneous with the total cycle of the tabulator in which the type bars which represent the amount of the total rise from about 33° to about 160° of cycle and are restored to normal position from about 160° to around 280° of cycle. As the present punch is concerned only with numbers, the only parts of this stroke which affect the punch are those at the first half of the rise and the last half of the return motion of the type bar restoring bar. The type bars reach the "9" position at about 84° of cycle, and their restoring bar reaches that position on its return stroke at about 233° of cycle. In the punch, the restoring bar 370 for the sensing slides 363 begins its forward stroke at about the beginning of the cycle but the first part of its movement is absorbed in taking up lost motion, as hereinbefore described. In the remainder of its movement it preferably lags a little behind that of the tabulator so that the sensing levers 160 do not touch the type bars until the latter are arrested.

The restoring bar 370 of the punch begins its return motion soon after the type bars in the tabulator have reached their "9" position and said restoring bar has been entirely restored by about 200° of cycle. It will be noted that the return of the slides in the punch by the bar 370 is in progress while the restoring bar of the tabulator is still proceeding upward into the alphabetic zone of the type bars.

When a sensing bar 363 advances toward the rear of the machine to set up a number, its pawl 374 (Figs. 13, 18 and 19) advances over the teeth 373 of the gag bar 364 until arrested in engagement with the appropriate one of said teeth. On the return stroke of the bar 370, therefore, when the slides 363 are restored, said slides carry with them, each to its appropriate extent, the gag bars 364, setting them into proper positions to represent the amount of the total.

The card picker 271 (Fig. 11) starts its movement and thus starts the card on its way to the punch chamber at about 80° of cycle at which time the set bar unit and the punches are near the bottom of their stroke. At from 220° to 250° of cycle, the card stop opens and it closes a little before the advancing card reaches it, which is at about 10° of the next cycle. During this time the punches are up out of the way of the card.

When at about 110° of the first cycle the set bar unit reaches its lowest position, there is no card in the chamber, so that this operation, as well as that of the retract mechanism, including the retract bar 757, are idle. However, during the up stroke of the set bar unit from 110° to 290° of cycle, said unit reaches its middle position at about 200° which is after the gag bars are set, as above described. As the set bar unit continues its upward motion, reaching its highest position at about 290°, the plungers 320 are pressed against the projections 376 and 377 on the gag bars and through the wires of the wiring unit 311 set the appropriate set bars 300. At the end of this cycle, the set bar unit has again reached its middle position but continues its downward motion on into the next or second cycle of the operation. It will be recalled that a card had reached the card stop at about 10° of this cycle, and it is, therefore, in position to be punched when the set bar unit moves down toward and to its low position which it reaches at 110°. At this time, the set bar unit is, of course, entirely free of the gag bars.

As hereinbefore explained, the release of the gag bars from the pawls 374 is effected by the up and down motion of the plate or bar 724 (Fig. 47) which carries the hook 720. In the blank cycle the Bowden 573G put this hook under tension to engage the stud 717. This plate 724 was at that time in its stop position, viz., part way down, and as soon as the punch starts to operate, this plate completes its downward motion, and rises again to its upper position at around 100° of cycle when the hook snaps into engagement with the stud 717. The hook is held in such engagement by the Bowden wire against the tension of the spring 732 which tends to release the hook. The pressure on the Bowden will be released in the latter part of the total cycle before the time when, by its downward motion, the plate 724 and hook 720 operate the shaft 712 to clear the gag bars. Therefore, a few degrees after the plate 724 reaches its highest position the cam pulls it down a short distance, as indicated on the time chart, so as to put the hook 720 into strong frictional engagement with the stud 717 sufficient to hold it against the spring 732 but not far enough to operate the clearing device. The hook is thus held in engagement with the stud until near the end of the first cycle when it makes its downward movement beginning at about 340° of said first cycle and ending at about 10° of the second cycle. This downward motion rocks the shaft 712 which through the links 710 and links 416 operates the releasing bar 415 which (Fig. 13) operates all of those clearing levers 406 whose interponents 412 have been set to be so operated. The gag bars are thus cleared at about the end of the total cycle. At that time the set bar unit has already received its setting from the gag bars and has moved downward out of contact with them, so that the set-up is preserved in the set pins until during the first half of the second cycle the punches are forced through the card. Meanwhile, the plate 724 again moves to its upper position at around 110° of the second cycle, thus relieving the frictional engagement of the hook 720 on the stud 717 and said hook snaps out of engagement ready for the next operation of the machine.

As shown on the time chart, the stripper plate 295 moves down from about 20° to 70° of cycle, and up from about 160° to 210° so that it is in its lower position at the time when the punches are operated; but by about 200° it has risen and pulled the punches out of the card. It will be recalled that the card stop opens immediately following this time and closes again at from 320° to 350° so that the punches are out of the way at the times when a card is being fed into the chamber and when it is being fed out of it.

The punched card is ejected into the receptacle 282 following the opening of the card stop in the second cycle.

The mechanism for unlocking the card feed, that is to say, the mechanism (Fig. 46) actuated by the lever 653, is operated by the Bowden 573D which in turn is operated by the total shaft of the tabulator. Said total shaft returned to normal position at about from 230° to 320° of tabulator total cycle, during which time the lever 653 returned to normal position and the lock 677 reengaged the card feed link 671. When, therefore, the card picker would normally have begun to operate at around 80° of the second cycle, it is locked against operation and a second card is not fed. At the end of the first punch cycle, the hook or latch 650 (Fig. 46) was pushed up to its unlatching position and the interponent 625 moved over the top of the plunger 618 so that at the end of the second cycle this interponent is active and stops the machine, leaving this starting and stopping mechanism in its normal position shown in Fig. 46, ready for another operation.

The entire punching mechanism is now restored to its normal condition, ready for a new operation.

*Designation from first card after total*

The set-up for this mode of operation in the specific instance illustrated is as follows:

The set-up of the tabulator itself is fully described in Patent 2,381,361, and is only briefly repeated here. The set-up mechanism includes the so called slam bail pawls 1750 (Fig. 1), each of which is controlled by a bar 1751 and, when acting, prevents upward movement of its type bar. When said bar is left free to act, spring 1753 draws it rearward and moves the pawl 1750 out of engagement; but if the bar be pulled toward the front of the machine the spring 1752 will throw the pawl into engagement.

In the designating field the pieces 1760 are set (as shown in Fig. 1 and as is usual in these machines) so as to be operated by the designation shaft 1754. The controls for this shaft are a bit complex, but the net result is that the shaft 1754 is rocked to its clockwise position, freeing the designation type bars on such cycles as required by the particular work in hand, but is rocked counter-clockwise to lock said type bars during every total and grand total operation, during the whole of which the shaft stands in the position shown in Fig. 1. It is not deemed necessary to go into all the details of how this is done because it is cited here only as an illustrative instance of a construction in which the designation type bars do not rise during total and grand total cycles. For the purposes of this specification, the shaft 1754 is a means to prevent their rising during those cycles.

In the punch control unit shown in Figs. 30-35, the selector 5901 is set active so that when the total shaft of the machine is pulled the plunger 574F will be depressed, operating the Bowden 573F which causes the releasing bar 478 to be depressed at the proper time (Fig. 41). The selector 590 is also set active as for totals only.

In setting up the punch mechanism for this operation, those slides that are used for punching the designation have their associate set pieces 473 set under the rear releasing bar 478, as shown in the case of the bar 478B in Fig. 14. Also, the gag bar clearing mechanism (Fig. 13) is set in the designating columns with the interponent 412 standing in register with the lower releasing slide 415 which slide, as explained hereinbefore, is pushed rearward at the end of the total cycle.

At the start of a run of cards the tabulator first goes through a total taking operation, although the mechanism both of the tabulator and of the punch are then clear, and no total is printed nor set up in the punch. The punch executes its two cycles, in the course of which the designation is set up from the first card, as now to be described.

During the blank cycle of the tabulator the lever 530 is rocked down by the Bowden 573F (Fig. 41). When the arm 508 advances the releasing bar 478 is depressed, but the designation type bars in the tabulator do not rise in this total cycle and the movement of the releasing bar is an idle one. Also, the latch 534 (Fig. 41) moves back and locks the lever 530 down. On the return stroke of arm 508, latch 534 is pushed out of engagement with the lever 530 which, however, is then caught by the latch lever 535, the shoulder of which is a little higher than that of the latch 534. The latch 535 holds the lever 530 and interponent 512 down until the next cycle of the machine, that is to say, the second cycle of a punching operation which is the next cycle after total. When, in the second cycle, the arm 508 advances, the pin 536 frees the latch 535 allowing the interponent 512 to rise to inoperative position as soon as the pressure of the arm 508 is relieved; and the bar 478 is depressed a second time to free the designation slides. The designation type bars in the tabulator do rise in this cycle and the sensing bars 363 advance and are then restored, setting up the designation on the gag bars. In the latter part of this cycle the designation is also set up on the set pins 300, but this is immaterial because the clearing bar 415 is not operated at the end of the second cycle, and the set-up of the gag bars themselves is also preserved until the next total taking operation for a reason which will presently appear.

In the next total taking operation, in the first half of the first cycle of the punch, the set pin unit moves down (idly, as there is no card in the chamber) and the total is set up on the appropriate gag bars. When in the second half of the cycle said unit moves to the top of its excursion to transfer the gag bar settings to the set pins, the retract device for said pins is operated, so that, if the designation gag bars were not still held in set positions, the designation set-up of the set pins would be erased and the designation lost. At the end of this cycle the gag bars are all cleared as above described. In the first half of the second cycle the total and its designation set-up on the set pins is punched in the card while the new designation from the first card of the second group is being run into the appropriate gag bars of the punch.

When the total is taken from the last group of cards of a run the total and its designation are both punched in the second punch cycle as before, but as there are no more cards, no new designation is set up. At the end of that cycle, therefore, the entire machine is clear and ready for a new run of cards.

*Grand totals only*

For some classes of work no summary cards are desired for group totals, such cards being wanted only for grand totals. It may be remarked that a similar mode of operation is common in the tabulator itself which can be so set up that individual items are not printed on the machine which merely adds such items and prints the total, so that the printed sheet gives a list of totals instead of a list of items. In this case each group of cards may have its own group designation and this designation may be printed in the same line with the total of that group. Also, the several grand totals are distinguished by their respective grand total designations. When, in connection with a job of this sort, grand total summary cards are punched, the sub-total designations or group total designations are not set up in the punch at all but only the grand total designations. All of this is only by way of explanation as, of course, it makes no difference to the punch what is or is not printed by the tabulator.

In setting up the tabulator and the controls for the punch where it is desired to punch grand total summary cards only, the "slam bail" mechanism shown in Fig. 1 is or may be set up the same as above described in connection with totals. The change of designation mechanism 133 (Fig. 3) will have those slides which control the group designation set so as to initiate a total taking operation on a change of group designation and those slides which relate to the columns used for grand total designation will be set to cause a grand total to be taken when that designation changes. As fully described in the patent, a grand total operation takes three cycles, viz., an ordinary blank cycle, a total cycle, and a grand total cycle. It will be recalled that the total shaft 550 (Fig. 1) is pulled preparatory and during the greater part of the total cycle and the grand total shaft 551 preparatory to and during the greater part of the grand total cycle. In the control unit (Figs. 30-35) the set pieces 590 and 590I which are operated by the total shaft 550 will be set inactive and selector 591 which is operated by the grand total shaft 551 will be set active. If designations are to be taken from the first card after grand total, selector 591I which is also operated by the grand total shaft will be set active. In consequence, when the group totals are taken the pusher levers 576 and 576I will not be depressed but they will be depressed preparatory to the grand total cycle. In the punch the set-up may be the same as described under the last title, that is to say, the appropriate type bar slides for the grand total are set to be released by the bar 475, and those for the designation by bar 478; and all used gag bars are set to be cleared by the bar 415. With these settings made, the mode of operation is exactly the same as when punching summary cards for totals except that the punch is started one cycle later when punching grand totals. The appropriate slides in the punch are released both for the amount of the grand total and also for the designation in the same manner as in taking totals. The punch clutch is tripped to operate for two cycles, the same as when punching totals, the only difference being that the first cycle is the grand total instead of the total cycle of the tabulator and the second cycle is the first cycle of the tabulator after grand total instead of after group total.

It may be remarked that on the grand total cycle the Bowden 573G, which controls the clearing bars 415, and also the Bowden 573H, which controls the clearing bars 419, are both operated so that both the upper and the lower clearing bars operate at the appropriate time. The interponents 412 may be set for this operation to be actuated by either of said clearing bars. As far as the modes of operation thus far described are concerned, only one pair of clearing bars is necessary, and the other may be omitted; in fact, in some installations only one pair of these clearing bars is included in the machine. A more complex mode of operation will now be described in which both are needed.

*Punching a grand total card following a total card*

It is sometimes desired after running off a series of groups of cards and punching summary cards, one for each group total and its designation, to go on and immediately punch a summary card for the grand total of all of said groups, together with the grand total designation. As described in Patent 2,381,361, the tabulator can be set up to effect the operation of printing such a series of totals and their grand total. This set-up includes the setting of some of the slides of the change of designation mechanism 133 (Fig. 3) to bring about a total taking operation on a change of designation punched in one field of each card and a grand total operation on a change of grand total designation punched in another field of the card.

In the control unit on the tabulator (Figs. 30-35) both of the selectors 590 and 591 are set active. Both of the selectors 590I and 591I are set active if designations are to be taken from the first card after total; otherwise, both are set inactive.

In the punch (Figs. 14, 18 and 19) those slides 362 which are connected with the type bars of the adding column have their settable pieces 473 set to cause the slide bars to be released by the total release bar 475. Also, those slides appropriate to the group total and grand total designations will be set to be released by the release bar 478 if the designations are to be picked up from the first card after total. If the designations are to be taken from a card other than the first, said slides will be set so as to be released by the appropriate one of the bars 476, 477. The gag bar clearing mechanism (Figs. 13, 18 and 19) is set by its finger pieces 414 and interponents 412 so that the amount of the total and grand total and the group total designation will be cleared by the lower clearing bars 415 and the grand total designation will be cleared by the upper bars 419.

The mode of operation is as follows:

As long as group totals are being taken, the mode of operation is exactly as described hereinbefore, it being noted that both the group total designation and the grand total designation are punched in each card. At each group total operation the group total designation will be cleared by the lower bars 415 but the grand total designation will not be cleared because the upper bars 419 are operated only on grand total cycles. On a grand total change of designation the last total and the designations are also punched as before. On this operation, however, the grand total shaft is pulled in the latter part of the total cycle, and it depresses the settable pieces 591 and 591I which continue to hold the four Bowdens 573C, 573D, 573E, and 573G, and also the Bowden 573F, if that is in use, in their operated positions with the result (Fig. 46) that when the latch 650 is raised at the end of the total cycle, the interponent 625 is still held back by the Bowden 573D, and the latch immediately drops back to its operating position so that the machine is thus automatically set for two cycles of operation following the total cycle. In the latter part of the grand total cycle the pressure of Bowden 573D is relieved and the interponent 625, therefore, moves over the plunger 618 in position to stop the punch at the end of one cycle following the grand total cycle, making this a three cycle operation.

In the first cycle, the Bowden 573D, acting through link 656, unlocks the card feed as usual, to feed a card in which the last group total is punched during the second cycle; but said Bowden is now held operated and the card feed unlocked, so that a second card is fed during the second cycle, and the grand total is punched in it during the third cycle. Late in the second cycle the grand total shaft 551 returns to normal, and with it the Bowden 573D and the card feed lock 677, so that no card is fed in the third and last cycle.

It may be remarked that the Bowden 573E is also maintained operated so that at the end of the total cycle the plunger 605 will give a momentary impulse to the Bowden 600 which (Fig. 46) will trip the latch 635 of the clutch mechanism of the punch. However, it will be recalled that whereas the parts mounted on the heavy link 621 are all in nearly their normal relative positions, said link is itself in its upper position where the lever 632 is not quite in contact with the arm 620 and is, therefore, not under any pressure from that arm. Also, said lever was itself drawn back by its spring 634 against the limit pin 639 and its upper end is not quite touching the shoulder of the latch 635. This latch is, therefore, entirely free and the momentary tripping of it is without effect.

In the first card after total mechanism (Fig. 41), for all group totals except the last one, the operation is as usual, that is to say, the lever 530 is depressed by its Bowden 573F and is held down to cause two operations of the releasing bar 478, one at the beginning of the first or total cycle and one at the beginning of the second cycle, after which said lever returns to its normal position. In the grand total operation, however, the pressure on the Bowden 573F is maintained into the second cycle and the lever 530 is again caught by the latch 535 and is thus held down for a third operation at the beginning of the third cycle so that all of the designation slides are released to receive the new designations from the first card of the first group of cards of the next set of groups if such a succeeding set is run off. The first two of the three operations of these release bars 478 are without effect as the type bars do not rise during the total or grand total cycles.

The gag bar clearing mechanism operates as follows:

Beneath the grand total push lever 576 (Fig. 34) is a plunger 574H which has no button on the end of it and is operated only by the grand total shaft 551 and not by the total shaft 550. This plunger operates a Bowden 573H (Fig. 54) which (Fig. 47) operates the rear lever 736 on the plate 724 which operates the gag bar clearing device. This lever 736 is like the lever 735, and like it, controls the hook 721 to engage a stud 718 on the arm 716 of the grand total clearing shaft 713. This hook comes into use, therefore, only on grand total cycles. The mode of operation is as follows:

In the latter part of the total cycle the hook 720 is caught over the stud 717 and on the reciprocation of the plate 724 rocks the shaft 712 and operates the lower clearing bars 415. This clears the amount of the total and the group total designation, whose clearing interponents 412, as above described, were set to be operated by these lower bars, but leaves uncleared the grand total designation whose interponents were set to be operated by the upper bars 419. At the end of the total operation, therefore, the punch mechanism was cleared except for this grand total designation which still remains and which will be cleared in the latter part of the grand total cycle.

During most of the grand total cycle the Bowden 573G is also maintained operated. At the end of that cycle, therefore, both hooks 720 and 721 are operated and both the lower clearing bars 415 and the upper bars 419 are operated, the former clearing the amount of the grand total and the latter the grand total designation. In the latter part of this cycle the pressure on the Bowdens 573G and 573H is relieved and when in the third cycle the plate 724 reaches the top of its motion the hooks 720 and 721 move out of engagement and this mechanism is thus restored to normal. In the latter part of the grand total cycle the set pin unit rises and transfers the setting of the gag bars to the set pins, and the grand total and its designation are punched in the first half of the third and concluding cycle. At the end of the third cycle the plunger 618 acts on the interponent 625 and stops the machine, leaving said interponent in its active position.

In those cases where designatory matter is picked up from a card or cards other than the first of a group under the control of a special hole, this makes no difference in the mode of operation of the machine except that it causes a single cycle to set up the designation, as explained hereinbefore. When a summary card is punched it will contain the matter picked up in that manner.

In those cases where the operation includes punching a grand total immediately following a total, this picked up designatory matter may be punched only in the sub total card by connecting the clearing interponents 412 to be operated by a lower release bar 415. In that case the matter will be cleared from the gag bars after the total cycle. If on the other hand it be desired to punch this matter also in the grand total card, said interponents 412 will be set to be operated by an upper bar 419.

Zero punching

In the 90 column card, the numerical code includes a position for a zero hole, and such holes are sometimes needed; but in the majority of instances, zero is indicated merely by a blank column. According to the invention, therefore, the summary punch is preferably equipped with means pre-settable in association with any desired one or any desired succession of gag bars to cause that particular bar or succession of bars, when not set for a number, either to punch zeroes or not, as desired. One form of such mechanism is illustrated in the drawing.

In Figs. 13 and 14, the gag bar 364A is resting against its stop 372, etc., and its finger 376A stands a certain distance to the right or rearward of the zero plunger 320 so that nothing at all will be punched in the column occupied by this bar. In order to punch a zero, this bar must be drawn leftward to the position shown at 376B. It would be possible to do this by the pawl 374 if a tenth or zero tooth 373 was provided at the left of the first tooth shown. If that were done, then when the type bar stood at zero, and the sensing bar 363 advanced, the pawl 374 would move just far enough to the right (taking up the lost motion hereinbefore described) to engage this zero tooth, and the zero plunger 320 would be operated the same as the other plungers. In this event, where it was not desired to punch zeroes, this zero plunger would not be wired in the wiring unit. A certain prior summary punch works on this principle, that is to say, the gag bar is brought at least to its zero position on each operation and in the wiring unit where it is desired to punch zeroes the zero wire is included, and in those columns where it is not desired to punch zeroes the wire is omitted. This answers the general purpose, but makes it necessary to have one wiring unit where zeroes are wanted and another one where they are not wanted. The present machine makes this provision of extra wiring units unnecessary by providing in each column a device settable by hand to cause zeroes to be punched or not, as desired, in any particular run of cards. To this end the zero tooth is omitted from the gag bar and the pawl 374 does not set the gag bar to zero position, but other means are provided so to set it whenever no other number has been set up on that bar.

In Fig. 13 the gag bar 364B (the one of a pair nearest the observer) has near its front end its upper part cut away as shown at 786 and into the space thus provided a stud 786 projects from the slide 364A. Similarly, said slide 364A has its lower part cut away as shown in dotted lines at 787 and a stud 788 projects from the slide 364B into the space thus provided. Two cross bars 790 and 791 are secured at their ends to brackets 792 which in turn are supported by the side frame castings 253 and 254. Levers 793A are pivoted to the upper bar 790 on a rod 794 supported by a comb plate secured to said bar 790, and said levers are guided by a second comb plate 795 secured also to said bar. There is one of these levers for each of the "A" gag bars and each such lever, at its lower end, stands just behind a stud 786 so that, if said lever be rocked clockwise, it will draw the gag bar forward to its zero position. A series of levers 793B are mounted on the lower frame bar 791 and are in all respects identical with those just described except that they are inverted and the upper end of each one stands just behind one of the studs 782 on a "B" gag bar.

The levers 793 are rocked to their operated positions where they have drawn their gag bars to zero position, and to their unoperated positions where they have not so set the gag bars by means of upper links 798A and lower links 798B. The means for operating these links will now be described.

Two cross bars 800A and 800B are, at appropriate times, reciprocated the proper distance rearward and frontward of the machine. These bars may be mounted and operated in a variety of ways. As here shown, they are both fast at their ends to two T-shaped plates 801 (Fig. 24), the cross of the T being vertical. Near its front end each of said plates has a horizontal cut-out 809 in which is an anti-friction guide roller 802 mounted on a bracket 803 secured to the inner face of the side frame casting 253 or 254. As shown, each of said brackets 803 has mounted on it a fibre block 804 which serves to arrest the frontward movement of the plate 801.

The rear end of each of the plates 801 is pivoted to an arm 805 fast on a stub shaft 806 which passes through and is journalled in the frame casting 253 or 254; and on its outer end said stub shaft has fixed an arm 807 which (Figs. 10 and 24) stands in the path of a stud 808 on the heavy link 460 which operates the restoring bar 370 for the sensing slides 363. There are two of these stub shafts 806, one on each side of the machine. The construction is such that as said link and restoring bar are approaching their extreme forward position, this stud will impart a slight rocking movement to the stub shaft 806 and pull the T links 801 and bars 800 to their rear or operated position, in which position they are shown in Fig. 13. When the restoring bar moves toward the rear of the machine the T links and the parts connected to them are restored to their forward positions by springs 810.

It may be pointed out that each of the arms 805 and the rear ends of the T plates 801 are situated in the space between the sheet metal frame plates of the unit 427 and the casting 253 or 254.

Each of the operating bars 800A and 800B has a longitudinal groove 813 and has mounted on its forward face a comb plate 811 (Fig. 13) having slots in which the links 798 are guided. The links 798A and 798B are all alike. Each is shaped at its front end for manipulation by the fingers and each has a lug 814 on its under edge. The link may be lifted by hand and set in its inactive position shown at 798A (Fig. 13) where the lug 814 is in front of the comb plate 811, or it may be pushed back to its active position shown at 798B where the lug 814 is shown seated in the groove 813 and held in place by a spring 812. The construction is such that when the bar 800 moved rearward, it rocked the lever 793B counter-clockwise and pulled the gag bar 364B to zero position as shown in Fig. 13, where it will be observed that the finger 376B stands over the zero plunger 320. However, the upper lever 793A whose link 798 was set inactive has been rocked just enough to bring it about up to the stud 786 without setting the gag bar 364A, which remains in its normal inactive position.

When in any column a number has been set up other than zero, the pawl 374 on the sensing bar 363 pulls the gag bar frontward and moves said stud clear out of range of lever 793 so that the rocking of said lever is without any effect.

When the machine starts, the frame 800—801 immediately moves forward to its unoperated position as the restoring bar 370 starts its advance movement, and it is restored to the position shown in Fig. 13 by the last part of the return stroke of said restoring bar 370 which is fully restored by 200° of cycle. At that time the set pin unit is at the mid point of its up stroke in the course of which any gag bars whose set pieces 798 have been set active will depress the zero plunger 320 of the set bar unit and cause a zero to be punched.

It will be recalled that the pawl 374 on a sensing slide 363 normally stands a certain distance forward (leftward in Fig. 13) of the first tooth 373, and that when the sensing bar advances, even when the type bar stands at zero, the pawl moves rightward a distance a little more than a tooth space of the rack, and to the position where it would catch the zero tooth of the rack if such a tooth existed, such advance of the sensing bar taking up lost motion including that between the finger 366 on the sensing bar and the finger 367 on the type bar slide.

In Fig. 13, the gag bar 364B has been advanced just enough to take up said lost motion. If now the type bar stands at "8," for example, and the sensing bar and the pawl 374B be advanced rightward accordingly, the pawl would catch the "9" tooth, the gag bar being out of normal position. If the type bar stands at "0" the pawl would catch the "1" tooth 373. In short, in the early part of the cycle when the sensing bars and pawls are selecting the appropriate teeth of the gag bars, the gag bars must be in normal position and, therefore, the bars 800 in their forward positions. In the latter half cycle when the set-up is being transferred to the set pins the parts must be in the positions shown in Fig. 13.

It is for this reason that the bars 800 have their reciprocating movement. The required timing can, of course, be accomplished in a variety of ways, the one above described being a convenient and simple one; that is to say, the bars 800 move in the opposite direction to, but in synchronism with, the restoring bar 370 during that part of the latter's excursion nearest the front of the machine when the stud 808 acts on the lever arm 807 (Fig. 10) to operate the bars 800. When, at the beginning of a cycle, the link 460 and restoring bar 370 begin to move toward the rear of the machine the bars 800 move synchronously toward the front with the result that during the first part of the movement, the gag bar 364B moved rightward in Fig. 13 at the same time that the pawl 374 is itself moving in that direction; and if the type bar happens to be at zero, to the same extent.

In the drawing the upper part of each comb plate 811 is shown formed off into an inclined flange on which is mounted a sort of scale plate

815. For convenience, the sets of slides are numbered as hereinbefore described and the scale plate 815 serves to identify each of the settable links 798 by its number.

Special punching

When any type bar in the tabulator is set to a numeric position and the appropriate connections set up, the corresponding gag bar of the punch will be set to that numeric position, and will result in the depression of the appropriate plunger or plungers 320 in the wiring unit. The Bowden operated by a plunger so depressed, however, need not necessarily punch that number. For example, in Fig. 22, the "seven" plunger 320 is shown operating a Bowden which is Y-wired at 820, resulting in the operation of the "zero" and "seven" punches, this being the code for the letter C. Moreover, this punching may be effected in any column of the card by appropriately leading the Bowdens. Even if this particular plunger, under the conditions mentioned, operated only one Bowden to punch one hole, that hole, by suitable wiring, can be punched anywhere desired in the card, and may, if desired, not represent a designation, but be a control hole to cause some special operation of the machine when the summary card is subsequently used in the tabulator or some other machine. When the summary card is used, the corresponding sensing pin will come up in the tabulator and set one of the set pins, but in the wiring unit of the tabulator this set pin may lead to anywhere desired, either to set up a letter or a number, or to control some operation of the machine.

It is sometimes desirable to print a letter on the tabulator and have the type bar by which that letter was printed set up the summary punch in such a way as to punch something, such, for example, as the code for that letter. In the manner now to be described, it is possible to punch a limited number of letters with the summary punch.

Punching characters

In the illustrated tabulator, the two type bars immediately at the right of each accumulator are usually used to print letters to characterize certain printed numbers, as subtracted items, group totals, negative totals, etc. The manner in which these characters are printed in the tabulator itself is fully described in Patent 2,381,361. Each type bar has projecting from its side a lower stop stud 821 and an upper stop stud 822, and on total taking operations the two corresponding type bars are released and allowed to rise. If the total is from the lower accumulator, the lower stud 821 will be arrested by the one or the other of three stops which are shown in Figs. 3 and 37, but are not lettered in the former on account of the closeness of the drawing. When the accumulator is set for addition (as shown in Fig. 3) a stop 823 on the lower shifting frame of the accumulator moves, when the accumulator is thrown into mesh with the rack, into the path of the stud 821 on the first or left hand character bar and arrests said bar in position to print the letter T to characterize a positive group total. At the same time a pin or stud 824 on the stop arm 823 enters between two rack teeth of the second character bar and prevents the latter from rising. When the accumulator is set for subtraction its lower shifting frame is pulled forward and its upper shifting frame is pushed rearward, and then when the accumulator is moved into mesh, a stop arm 825 moves into the path of the stud 821 on the first character bar and arrests the latter in position to print the letter C. At the same time, a second arm 826 moves into the path of the lower stud 821 of the second character bar and arrests it in position to print the letter T. The two character bars, therefore, print CT to characterize a negative group total. Similarly, in the upper or grand total accumulator there is a stop 827 which arrests the stud 822 of the first character bar at G to characterize a positive grand total, the second character bar being held down by a stud 828; and on the upper or subtract shift frame of the accumulator, a stop 830 arrests the stud 822 of the second bar to print a G and the stop 831 arrests the first bar in position to print a C so that CG will be printed to characterize a negative grand total.

In Fig. 37, the first nine stops 132 which arrest a type bar in the tabulator are drawn diagrammatically, and at the right of each is the code of punching to represent the several letters and numerals. It will be recalled that when one of the stops 132 is projected its full distance it passes over the top of the block 137 secured to each type bar, and arrests that type bar in a numeric position. When, however, the stop is projected only part way it arrests a shoulder 832 on the block 137 so that the type bar moves one half space higher, and prints one of the letters of the alphabet, nine of which letters are thus interspersed between the numeral types. In these characterizing bars, the three letters that are used are T, G, and C, and an inspection of the figure will show that, as one may say, T is 4½, G is 5½, and C is 7½, that is to say, C is selected by the "seven" stop projected only part way, so that the type bar comes a one-half space above the "seven" position. It is desired to use these two characterizing bars to punch these three letters selectively in the summary card, and the means to that end in the specific instance illustrated are as follows:

When one of these character bars moves up to C, its sensing bar in the punch would be drawn to a half space beyond its "seven" position. Accordingly, the bell-cranks 1601 (Fig. 37) which cooperate with these two special type bars are foreshortened to the extent of a half space of the type bar. Thus, the bell-cranks 1601 swing a half space further than the type bars rise, so that if the type bar is set at C, this extra half space motion will carry it to the "eight" numeric position, when the type bar is set at G the sensing slide will move on to 6, and when the type bar is set at T the sensing bar will be set at 5. Passing now to the punch, Fig. 22 shows the arrangement in the wiring unit for the first of the two character bars and Fig. 23 the arrangement for the second of said bars. These said arrangements involve no modification whatever of the main mechanism of the punch but only of the removable and interchangeable wiring unit. The one for this particular run of cards is made as shown in Figs. 22 and 23. The first type bar prints T, G and C, and the arrangement shown in Fig. 22 is, therefore, adopted to punch the code representations of these letters. Since the gag bar is set at 5 to punch a T and at 6 to punch a G, then ordinarily the "six" plunger 320 would be depressed both for the T and for the G which would cause confusion. In order to distinguish between the 5 and the 6, this particular plunger is, as it were, cut in two so that when the gag bar stands at 5 it will depress the right hand one 3205 to punch "T" (Fig. 22), and when it stands at 6 it will depress the left hand one 3206 to punch "G." The code for T is 3, 7, 9. The Bowden, therefore, from this "five" plunger is divided, according to the Y-wire fashion familiar in these machines, into three branches to depress the 3, the 7, and the 9 set pins in the punch. The plunger "six" is Y-wired to punch 5 and 7; the code for "G"; and the plunger "seven" is Y-wired to "zero" and "seven," the code for "C." It will be noted that all three of these codes include seven and, therefore, the three branches come together in what is known in the art as an inverted Y, and any one of them when operated will set the "seven" set pin.

In the second character bar the only two letters punched are T and G, and as shown in Fig. 23, the whole arrangement is the same as for the first bar (Fig. 22) except that the "seven" plunger 320 is not wired.

In these two positions the remaining plungers 320 do not operate any Bowdens, and when punching both the letter G and the letter C, the "nine" plunger 320 is depressed ineffectively since it has no Bowden.

It will be readily understood that quite a variety of punchings may be obtained with mechanism made and working on the principles above indicated, that is to say, by suitably wiring the plungers 320 and, where necessary, by dividing one or more of them; and also, if needful, by shortening one or more feeling levers as shown at 1601.

In some instances, it is not desired to punch the letters T and G in the summary card, and, if so, the arrangement above described would be modified accordingly. However, the summary cards produced by the present invention are themselves used in subsequent bookkeeping operations as item cards, and in those instances where negative totals are liable to occur, it is needful that either the letter C or a control hole having the same effect be punched in the summary card when the total is negative. When this card is used in conjunction with other cards that particular total will be subtracted instead of added.

It will be recalled that in the tabulator described in Patent 2,381,361, the accumulator is set for subtraction under the control of one of the character bars. In the present instance this is done by the second one of the two control bars but may be done by the first one. It will be recalled that in that patented machine a bell-crank is pivoted to the side of the accumulator and follows the character type bar upward after much the same fashion as the present bell-cranks 160, and said bell-crank is connected by a link to a lever or guide link 833 (Fig. 3) at the front part of the accumulator, and to said guide link is pivoted a link 834 which operates mechanism here designated generally as 835. As described in the patent, the link 834 is under spring tension downward to cause the said bell-crank to follow the movement of the rack. When the link 834 moves downward and rearward, this mechanism is operated in such a manner as to set both the upper and lower accumulators to subtraction. In the present mechanism, however, there is one of the bell-cranks 160 or 1601 under every type bar, and this bell-crank itself is utilized to control the subtract mechanism. To this end, a link 836 (Fig. 3) is provided, pivoted to the guide link 833 and extending parallel with the slide 163. The rear end of this link passes through a suitable opening in the guide plate or comb plate 164. This guide plate has perforations that guide the slides 163, but above each such perforation is a smaller one adapted to guide one of the links 836. A link 836 would be inserted only in that denominational position that is to be used to set the machine for subtraction. There is one of these links for each accumulator, and its rear end abuts against the depending arm of the bell-crank 1601 or 160 and is controlled by it. This particular bell-crank, therefore, serves two purposes. When tabulating a set of cards, it is actuated by the spring urged link 834 and the link 836, and causes the machine to be set for subtraction, and when taking totals, it, through the slide 163, controls the punching of a character in a summary card. Where a summary card recording a negative total or grand total is itself used as an item card, both character type bars will rise to print the negative characterization, and the rising of the second bar will cause the number to be subtracted.

In setting up the punch to punch the characterizing letters, as just above described, the set pieces 473 (Fig. 9) associated with these two type bars would be set to release the type bar slides 362 by means of the front release bar 475, the same as the setting for those slides that record the amount of the total itself.

However, it is sometimes worth while to use one or two letters in connection with designating numbers. For example, a group might be designated as "C756." In that event, the wiring unit would be arranged on the general principle illustrated in Figs. 22 and 23, and the slide or slides would have their set piece 473 set to be operated by the releasing bar 478 for first card after total. If a letter is associated with designatory matter picked up from some card other than the first of a group and having a control hole, as hereinbefore described, this slide would be set to be released by one of the other releasing bars 476 or 477, the same as other matter picked up in that manner.

*Preventing punching under special conditions*

It is sometimes desired not to punch a summary card under certain special conditions. For example, in some applications it is not desired to punch a summary card when the balance or total is zero, in which event no sensing bar 363 in the total field will advance beyond its zero position. Means now to be described are provided pre-settable to bring it about that unless at least one of these sensing bars does advance beyond zero, no card will be fed at that total taking operation. To this end a lock is provided for the card feed and a trip for said lock to free the card feed when one of said sensing bars advances beyond zero.

Each sensing bar 363 has pivoted to its rear end a bar 840 (Fig. 14), said bars near their rear ends being supported and guided by cross frame bars 841, 842, 843 and 844 connecting the slide plates 440. When any sensing bar 363 advances, the rear end of its bar 840 moves rearward beyond the said cross frame bars. It will be recalled that the sensing bars 363 are arranged in pairs and designated A and B. The bars 840B lie above and the bars 840A beneath the restoring bar 370 and springs 368. The tripping means for the lock is actuated by these bars. Pivoted in the side plates 440 behind the cross bar 844 are two rock shafts 845A and 845B, each having a pair of bail arms 846 fast thereon supporting a bail bar 847, here shown as an angle bar of sheet metal. The shafts 845A and 845B are connected together by arms and a link 849 (Figs. 10 and 42) to rock in unison, so that in effect they act as one shaft. Supported by the side plates 449 are two transverse bars 848A and 848B (Fig. 14), each having a series of hand-settable pieces 850 pivoted thereto by a comb plate 851 adapted to be engaged by notches 852 in the pieces 850. There is one of these set pieces 850 behind each of the bars or slides 840 and each passes through a vertical slot in a suitably supported comb plate 853 and is pressed downward by a leaf spring 854. In Fig. 14, a set piece 850B is shown with its middle notch engaging the pivot 851; but by lifting the rear end of it by hand, it can be slid toward the rear of the machine until its forward notch 852 engages the comb plate, as shown at 850A. Each of the settable pieces 850 has just forward of the guide plate 853 an inclined lower edge 854 followed by a notch 855; and the end of said piece 850 is formed off into an ear 856 (Fig. 15). When a piece 850 is set with its middle notch engaging the pivot plate 851 this ear stands at a distance from the rear end of the slide 840, such that when said bar advances to zero position the rear end of the slide 840 just about abuts the flange 856. This flange is made at an inclination so that if the slide 840 proceeds further rearward than its zero position the front end of the piece 850 will be cammed upward, as shown in the case of the piece 850A in Fig. 15. When the piece 850 is thus swung upward at its front end, a hump 857 thereon lifts the bail bar 847 and slightly rocks the shaft 845 counter-clockwise. In the instance where this is used to prevent punching on zero balance, all of the set pieces 850 in the total field (and no others) will be set with their middle notch engaging the comb plate 851, and will operate as above described, so that if on the total cycle any sensing slide in that field advances beyond its zero position, these two rock shafts will be rocked counter-clockwise. In other fields, the pieces 850 are set like the piece 850A in Fig. 14 with their front notches engaging the pivot plate 851. When the piece is set rearward to this position the incline 854 cams the front end of the piece 850 upward until the notch 855 engages the comb plate 853, raising the flange 856 out of the path of the bar 840. This movement of the piece 850 also moves the hump 857 out from under the bail bar 847 so that the latter is not raised. In this position the mechanism in question is inactive and without effect.

The mechanism above described has for its function to prevent punching of a summary card except when some amount is set up in the field controlled by the active pieces 850. This is preferably done by locking the card feed and unlocking it under the control of the said mechanism so that, although the machine goes through all its regular movements, no card is fed and, therefore, none punched. The machine operates in this way because it is not until the punch has been set into operation and the data has come over from the tabulator and been set up in the punch that the machine knows that no card is wanted. It will be recalled that the card feed is normally locked by the latch 677 (Figs. 43 and 46) and is unlocked only when a card feed is desired. In the present instance, an additional lock for the card feed is provided, which when the present mechanism is in use, also normally locks the card feed which is released only when the shafts 845 are rocked.

On the picker operating shaft 274 is an arm 860 (Figs. 11 and 43) to which is pivoted a long link 861, extending toward the back of the machine and pivoted to a bell-crank 862, to the horizontal arm of which is pivoted a link 863, which (Fig. 10) extends upward and terminates a little below the rock shaft 845A (see also Figs. 9 and 42). The construction is such that when the shaft 274 is rocked to operate the picker knife the link 861 moves toward the rear of the machine, and through bell-crank 862 pulls down the link 863. The means whereby the mechanism in question locks this link 863 and prevents card feed is best shown in Fig. 42. The upper end of the link 863 has a slot 864 guided on a headed screw 865 threaded into a block 866 screwed to the outside face of the frame plate 449. Said link has an ear 866 normally engaging a shoulder on a block 867 slidable on the upper surface of the block 866; and when said ear is so engaged the link 863 is locked against downward movement, locking the card feed through the chain of linkage just described. Means are provided whereby, when the shafts 845 are rocked, the block 867 is slid rearward to release the link 863. To this end the upper shaft 845B has fast thereon an arm 868 having an open ended slot which embraces two pins projecting from the block 867, namely, a lower pin 870 which moves the block when the shaft 845 is rocked and a headed pin 871 passing through the upper part of the slot in the arm, which upper part is widened so that its walls do not touch the pin 871, the function of which is by its wide flat head to hold the block 867 face to face with the arm 868. It will be perceived that by the described means the card picker is normally locked but will be released as far as the link 863 is concerned when one of the shafts 845 is rocked. It will, of course, be understood that this locking mechanism may be varied quite widely in details of construction and arrangement.

In order to disable this no-balance-no-card mechanism entirely when its function is not desired, any suitable disabling device may be provided, the one shown in Fig. 42 being simple and effective. An arm 872 is fast on the lower rock shaft 845A and projects upward therefrom. A disabling button 873 is provided of familiar construction and including a hollow post 874 riveted to the arm 868 and within which is a plunger of which the button 873 is the head. These buttons are so arranged that the plunger may be withdrawn to inactive position and held there, and projected to active position by hand. This one is so disposed that if the rock shaft 845 be rocked clockwise in Fig. 42, the arm 868 carrying the plunger or button 873 and the arm 872 will be rocked toward the front of the machine and if then the plunger be projected into the plane of said arm the two shafts will be locked in their operated positions with the block 867 out of the path of the ear 866 on the link 863. Whenever the picker is then operated said link will move down and up without obstruction and without effect.

It may be remarked that when the machine is set for punching a series of total cards, followed by a grand total card, in the event that the last group of cards in a stack happened to yield a zero balance the operation would be as follows:

At the time, namely, in the first part of the total cycle when the total summary card is ordinarily fed from the stack, the picker would be locked and no card would be fed; but the grand total card is fed out by the picker in the first part of the grand total cycle at which time the grand total has itself been set up on the same sensing bars as are used for the group total and the picker would, therefore, be unlocked and feed the grand total card. In the event (perhaps a rare one) that the grand total was itself zero, then no grand total summary card would be fed.

The device above described may be useful in a variety of ways. For example, if there happens to be a piece of work in which a summary card is wanted only in case the balance is negative, this mechanism can be set to have that effect. In the described tabulating mechanism, the second or right hand one of the two characterizing type bars associated with an accumulator rises above the zero position only when the total is negative. Therefore, if the sensing slide controlled by said second characterizing type bar be set active and no other, then a summary card will be fed and punched only when the total is negative.

Tabulators are sometimes set up in such a manner that the amounts are run by Y wires into two accumulators, and the subtraction mechanism is so controlled that debit items are all added into, say, the left hand one of these accumulators and subtracted in the right hand one, and credit items are added in the right hand accumulator and subtracted in the left hand one. In this set-up of the machine a debit balance will appear as a positive total in the left hand and negative in the right hand accumulator; whereas a credit balance will appear positive in the right hand accumulator and negative in the left hand accumulator. The tabulator can be so set up as to print only from whichever one of the two accumulators shows a positive balance, with the result that debit balances are printed in one column of the paper and credit balances in another. These balances may be punched in the summary card the same as any other balances, but in some instances it is desired to punch a summary card only for debit balances and not for credit balances, or vice versa. In the first instance, a summary card is wanted if the balance is debit, and it is not wanted if the balance is credit. This might be brought about by the use of this mechanism in which the settable devices 859 are set active only in the debit column. In case of a credit balance the type bars would not rise in the debit column and no summary card would be punched at all, but in case of a debit balance, these type bars will rise and the corresponding sensing slides would be advanced and the summary card would be fed and punched.

*Locking the sensing slides*

All of the sets of slides are normally locked by the latches 369 (Fig. 14), and none of them operates unless the appropriate latches are released, as hereinbefore described, except that at every cycle the restoring bar 378 advances and the sensing slides 363 advance until the lost motion is taken up between them and the type bar slides 362. In many runs of cards the great majority of these sensing slides are not used at all and this unnecessary movement at each cycle of the machine may advantageously be avoided. To this end means are provided to lock against even this slight movement any sensing slides that are not to be used in a particular run of cards. Any suitable hand settable lock may, of course, be provided. In the present instance, this function is conveniently and advantageously accomplished by a third setting of any of the set pieces 859, above described as parts of the no-balance-no-card device. This piece has a third notch for engagement with the plate 851, as shown in the case of the piece 859B in Fig. 15. When this piece is moved by hand from its active position shown in Fig. 14 to its locking position shown in Fig. 15, the inclined edge of the hump 857 is cammed down by the guide plate 853, moving the ear 856 down behind the bar 849, and substantially in contact with it. With the parts in this position, the piece 859B cannot move rearward on account of the notch engaging the plate 851 and the plate 853 prevents it from moving upward. It, therefore, locks the bar 849 and the sensing slide 863 in their extreme restored position.

From the description of the mode of operation of the mechanism when punching grand totals immediately following group totals, it will be apparent that the machine will continue to run for a succession of cycles and punch a succession of cards containing the matter sent over from the type bars of the tabulator as long as one or the other of the pushers 576 is held depressed together, if needed, with one of the pushers 5761. The operation described, that of punching a grand total immediately following a group total, called for only two successive cards, but it is obvious that if this machine were set up for taking great grand totals or if for any other reason these pushers were held down, the machine would continue to operate as long as they were so held.

It will be noted from the above description that the operation of the punch takes place simultaneously with that of the tabulator so that the production of summary cards in no wise interferes with or retard the action of the tabulator.

In the course of the foregoing description it has been pointed out that the invention is not limited to the specific construction illustrated and described in detail, but that many changes may be made in both detail and arrangement. It will be apparent from the foregoing description that many such changes other than those actually referred to may be made without departing from the invention. It will also be apparent that some of the features of the invention may be used without others, and that some of them are applicable or adaptable to machines differing quite considerably from that described.

What is claimed is:

1. In a combined tabulator and summary punch, the combination of a sensing bar advanced to differential positions under control of the tabulator mechanism, a restoring bar for said sensing bar, a gag bar set differentially by the return of said sensing bar, a lock to prevent advance of said sensing bar, and a release for said lock acting only on certain cycles of the tabulator.

2. In a combined tabulator and summary punch, the combination of a sensing bar advanced to differential positions under control of the tabulator mechanism, a restoring bar for said sensing bar, a gag bar, a pawl and ratchet to connect said gag bar to said sensing bar to set said gag bar on the return of said sensing bar, a lock to prevent advance of said sensing bar, a release for said lock acting only on certain cycles of the tabulator, and a clearing device to trip said pawl to free said gag bar from said sensing bar.

3. In a combined tabulator and summary punch, the combination of a sensing bar advanced to differential positions under control of the tabulator mechanism, a restoring bar for said sensing bar, a gag bar connectable with said sensing bar differentially by pawl and ratchet and set by the return of said sensing bar, a lock to prevent advance of said sensing bar, a release for said lock acting only on certain cycles of the tabulator, punching mechanism set up by said gag bar, and a clearing device to trip said pawl to free said gag bar from said sensing bar after the punching mechanism has been so set up.

4. In a combined tabulator and summary punch, the combination of a sensing bar advanced to differential positions under control of the tabulator mechanism, a restoring bar for said sensing bar, a gag bar set differentially by said sensing bar, a lock to prevent advance of said sensing bar, a release bar for said lock acting only on certain cycles of the tabulator, and a device settable to connect said lock to be released by said bar or not, as desired.

5. In a combined tabulator and summary punch, the combination of a sensing bar advanced to differential positions under control of the tabulator mechanism, a restoring bar for said sensing bar, a gag bar set differentially by said sensing bar, a lock to prevent advance of said sensing bar, a release bar acting only on one cycle of the tabulator, a second release bar acting only on another cycle of the tabulator, and a member settable to connect said lock to be unlocked by one or the other of said release bars.

6. In a combined tabulator and summary punch, the combination of a sensing bar advanced to differential positions under control of the tabulator mechanism, a restoring bar for said sensing bar, a gag bar, a pawl and ratchet to connect said gag bar to said sensing bar to set said gag bar on the return of said sensing bar, a lock to prevent advance of said sensing bar, a release for said lock acting only on certain cycles of the tabulator, a clearing bar, a device operated by said clearing bar to free said gag bar from said sensing bar and settable to connect said device to be so operated or not as desired, and means under the control of the tabulator to operate said clearing bar at the end of a total taking operation.

7. In a combined tabulator and summary punch, the combination of a sensing bar advanced to differential positions under control of the tabulator mechanism, a restoring bar for said sensing bar, a gag bar, a pawl and ratchet to connect said gag bar to said sensing bar to set said gag bar on the return of said sensing bar, a lock to prevent advance of said sensing bar, a release for said lock acting only on certain cycles of the tabulator, a clearing device to trip said pawl to free said gag bar from said sensing bar, a plurality of clearing bars, and means to operate one of said bars at the end of a total cycle of the tabulator and the other of said bars at the end of a grand total cycle, said clearing device being settable to be operated by one or the other of said clearing bars as desired.

8. In a combined tabulator and summary punch, the combination of a sensing bar advanced to differential positions under control of the tabulator mechanism, a restoring bar for said sensing bar, a gag bar, a pawl and ratchet to connect said gag bar to said sensing bar to set said gag bar on the return of said sensing bar, a lock to prevent advance of said sensing bar, a release for said lock acting only on certain cycles of the tabulator, a clearing device to trip said pawl to free said gag bar from said sensing bar, a plurality of clearing bars, and means to operate one of said bars on one cycle of the machine and another bar on another cycle, said clearing device being settable to be operated by one or the other of said clearing bars as desired.

9. In a combined tabulator and summary punch, the combination of a series of sensing bars, each advanced differentially under control of the tabulator mechanism, a restoring bar for said sensing bars, a series of gag bars each connectable with one of said sensing bars differentially and each set by its sensing bar, locks to prevent advance of the several sensing bars, a first releasing bar to free certain of said locks on certain cycles of the tabulator, and a second releasing bar to free certain other of said locks on certain other cycles of the tabulator.

10. In a combined tabulator and summary punch, the combination of a series of sensing bars, each advanced differentially under control of the tabulator mechanism, a restoring bar for said sensing bars, a series of gag bars each connectable with one of said sensing bars differentially and each set by its sensing bar, locks to prevent advance of the several sensing bars, a first releasing bar to free certain of said locks on certain cycles of the tabulator, and a second releasing bar to free certain other of said locks on certain other cycles of the tabulator, punching mechanism set up by said gag bars after both groups of gag bars have been set, and clearing means to free both groups of gag bars from their sensing bars after the punching mechanism has been set up.

11. In a combined tabulator and summary punch, the combination of a series of sensing bars, each advanced differentially under control of the tabulator mechanism, a restoring bar for said sensing bars, a series of gag bars each connectable with one of said sensing bars differentially and each set by its sensing bar, locks to prevent advance of the several sensing bars, a first releasing bar acting on certain cycles of the tabulator, a second releasing bar acting on certain other cycles of the tabulator, and devices settable to connect selected ones of said locks to said locks to said first releasing bar and other selected ones of said locks to said second releasing bar.

12. In a combined tabulator and summary punch, the combination of a series of sensing bars, each advanced differentially under control of the tabulator mechanism, a restoring bar for said sensing bars, a series of gag bars each connectable with one of said sensing bars differentially and each set by its sensing bar, locks to prevent advance of the several sensing bars, a first releasing bar acting on certain cycles of the tabulator, a second releasing bar acting on certain other cycles of the tabulator, and devices settable to connect selected ones of said locks to said first releasing bar and other selected ones of said locks to said second releasing bar, and settable also to an inactive position.

13. In a combined tabulator and summary punch, the combination of a series of sensing bars, each advanced differentially under control of the tabulator mechanism, a restoring bar for said sensing bars, a series of gag bars each connectable with one of said sensing bars differentially and each set by its sensing bar, locks to prevent advance of the several sensing bars, a first releasing bar acting on certain cycles of the tabulator, a second releasing bar acting on certain other cycles of the tabulator, and devices settable to connect selected ones of said locks to said first releasing bar and other selected ones of said locks to said second releasing bar and settable also to an inactive position, a clearing bar, and devices settable to be operated by said clearing bar to free their associate gag bars from their sensing bars or not to be so operated, as desired.

14. In a combined tabulator and summary punch, the combination of a series of sensing bars, each advanced differentially under control of the tabulator mechanism, a restoring bar for said sensing bars, a series of gag bars each connectable with one of said sensing bars differentially by a pawl and ratchet and each set by its sensing bar, locks to prevent advance of the several sensing bars, a first releasing bar acting on certain cycles of the tabulator, a second releasing bar acting on certain other cycles of the tabulator, clearing devices to trip said pawls to free said gag bars from their sensing bars, a plurality of clearing bars, and means to operate one of said bars at the end of a total cycle of the tabulator and the other of said bars at the end of a grand total cycle, said devices being settable to be operated by one or the other of said clearing bars as desired.

15. In a combined tabulator and summary punch, the combination of a series of sensing bars, each advanced differentially under control of the tabulator mechanism, a restoring bar for said sensing bars, a series of gag bars each connectable with one of said sensing bars differentially by a pawl and ratchet and each set by its sensing bar, locks to prevent advance of the several sensing bars, a first releasing bar acting on certain cycles of the tabulator, a second releasing bar acting on certain other cycles of the tabulator, clearing devices to trip said pawls to free said gag bars from their sensing bars, a plurality of clearing bars, and means to operate one of said bars on one cycle of the machine and another bar on another cycle, said devices being settable to be operated by one or the other of said clearing bars as desired.

16. In a punch the combination of a sensing bar advanced to differential positions, a restoring bar for said sensing bar, a gag bar set differentially by the return of said sensing bar, a lock to prevent advance of said sensing bar, and a release for said lock acting only on certain cycles of the machine.

17. In a punch the combination of a series of sensing bars, each advanced differentially, a restoring bar for said sensing bars, a series of gag bars each connectable with one of said sensing bars differentially and each set by its sensing bar, locks to prevent advance of the several sensing bars, a first releasing bar to free certain of said locks on certain cycles of the machine, and a second releasing bar to free certain other of said locks on certain other cycles of the machine.

18. In a machine of the class described, the combination of gag bars set to differential positions, a reciprocating set pin unit comprising a set pin basket and an interchangeable wiring unit, and a punch basket comprising punches to perforate a card, said set pin unit being reciprocated up to take the setting of said gag bars and down to depress said punches.

19. In a machine of the class described, the combination of gag bars set to differential positions, a reciprocating set pin unit comprising a set pin basket and an interchangeable wiring unit, a punch basket comprising punches to perforate a card, said set pin unit moving up to take the setting of said gag bars and down to depress said punches, and an independently reciprocating stripper plate for the punches.

20. In a machine of the class described, the combination of gag bars set to differential positions, a reciprocating set pin unit comprising a set pin basket and an interchangeable wiring unit, and a punch basket comprising punches to perforate a card, said set pin unit being reciprocated up to take the setting of said gag bars after said gag bars have been set and down to depress said punches while said gag bars are being reset.

21. In a tabulating machine having a total and a grand total linkage, a signalling device comprising in combination, a first slide operated by said total linkage, a second slide operated by said grand total linkage, a plurality of pairs of settable pieces, each such pair including a piece settable to be operated by said first slide and another piece settable to be operated by said second slide and both pieces settable so as not to be so operated, a plurality of pairs of pushers, each pusher operated by one of said settable pieces, and a plurality of signal transmitting plungers, one or more adapted to be operated by one only of said pushers and one or more others adapted to be operated by either pusher of a pair.

22. In a tabulating machine having a total and a grand total linkage, a signalling device comprising in combination, a first slide operated by said total linkage, a second slide operated by said grand total linkage, a piece settable to be operated by said first slide, a piece settable to be operated by said second slide and both pieces settable so as not to be so operated, a pusher operated by each of said pieces, and a plurality of signal transmitting plungers, one or more adapted to be operated by one only of said pushers and one or more others adapted to be operated by either of said pushers.

23. In a combined tabulator and punch, the combination of a part (558) in the tabulator operated preparatory to a total cycle, a second part (605) of said tabulator operated at a later period, an interponent (606) set by the first said part to be operated by the said second part, and a signal transmitter (600) to the punch operated by said interponent.

24. In a combined tabulator and summary punch the combination of a series of tabulator type bars advanced to differential set positions, levers to sense the settings of said type bars, slides to advance said levers, spring urged sensing slides in the punch, type bar slides advanced by said sensing slides, Bowden wires connecting the first said slides and the type bar slides, the advance of said type bar slides pulling the first said slides and advancing said levers, a restoring bar acting to restore said sensing slides prior to the restoration of said sensing levers by the tabulator mechanism, the first said slides when restored acting through the Bowden wires to pull said type bar slides to restored position.

25. In a combined tabulator and summary punch the combination of a signal transmitter in the tabulator, a clutch in the punch closed on signal from said transmitter, means to open said clutch including a power driven part and an interponent normally in active position but moved to inactive position on signal from said transmitter, a latch to hold said interponent in inactive position, and means to release said interponent from said latch.

26. In a combined tabulator and summary punch the combination of a signal transmitter in the tabulator, a clutch in the punch closed on signal from said transmitter, means normally active to open said clutch at the end of one cycle, means to disable said opening means on signal from said transmitter, a latch to hold said opening means disabled and means to release said opening means from said latch after a predetermined number of cycles.

27. In a combined tabulator and summary punch the combination of a signal transmitter in the tabulator, a clutch in the punch closed on signal from said transmitter, a normally active opener for said clutch, means to disable said opener on signal from said transmitter, a latch to hold said opener disabled, and a trip for said latch acting after a predetermined number of cycles to release said opener.

28. In a power driven machine of the class described, the combination of a clutch, means to open said clutch at the end of a cycle including a power driven part and an interponent normally in active position, means to move said interponent to inactive position, and a latch to hold said interponent in inactive position, said power driven part acting at the end of one cycle to free said interponent from said latch and acting at the end of a second cycle to open said clutch through said interponent.

29. In a combined tabulator and summary punch the combination of a total linkage and a grand total linkage in the tabulator, a clutch in the punch, means to open said clutch at the end of a cycle including a power driven part and an interponent normally in active position, means controlled by said total linkage and said grand total linkage to move said interponent to inactive position, said total linkage holding said interponent inactive for part of one cycle and said grand total linkage holding said interponent inactive for the remainder of that cycle and part of a second cycle and a latch to hold said interponent in inactive position for the remainder of said second cycle, said power driven part acting at the end of said second cycle to free said interponent from said latch and acting at the end of a third cycle to open said clutch through said interponent.

30. In a power driven machine of the class described, the combination of a clutch, means to open said clutch at the end of a cycle including a power driven part and an interponent normally in active position, means to move said interponent to inactive position, and a latch to hold said interponent in inactive position when in the course of a cycle said moving means ceases to act, said power driven part acting at the end of that cycle to free said interponent from said latch and acting at the end of an additional cycle to open said clutch through said interponent.

31. In a combined tabulator and summary punch the combination of a total linkage and a grand total linkage in the tabulator, a clutch in the punch, means to open said clutch at the end of a cycle including a power driven part and an interponent normally in active position, means controlled by said total linkage and said grand total linkage to move said interponent to inactive position, said total linkage holding said interponent inactive for part of one cycle and said grand total linkage holding said interponent inactive for the remainder of that cycle and part of a second cycle, a latch to hold said interponent in inactive position for the remainder of said second cycle, and a power driven part to free said interponent from said latch.

32. In a combined tabulator and summary card punch the combination of a punch clutch, means controlled by the total mechanism of the tabulator to close said clutch, card controlled means in the tabulator to close said clutch, means to open said clutch at the end of one cycle, means controlled by said total mechanism to disable said clutch opening means for one or more cycles, a normally locked card feed mechanism in the punch, means controlled by said total mechanism to free said card feed, a series of tabulator type bars advanced to differential positions, a series of normally locked punch set-up devices connected to said type bars, means controlled by said card controlled means to free certain of said set-up devices when said clutch is closed by said card controlled means, means controlled by said total mechanism to free others of said set-up devices when said clutch is closed by said total mechanism, a punch mechanism, and means to operate said punch mechanism in the cycle following that in which the set-up devices are freed by said total mechanism.

33. In a combined tabulator and summary card punch the combination of a series of tabulator type bars settable to differential positions, a series of punch set-up slides adapted to be set differentially under control of said type bars but normally locked against such setting, means to free certain of said set-up devices on a first cycle and others on a subsequent cycle, a punch unit, a reciprocating set bar unit acting in each of said cycles to sense the setting of said set-up devices and acting in the cycle following said subsequent cycle to operate said punch unit, a normally locked card feed mechanism, and means to free said card feed mechanism to feed a card into said punch unit to be punched in the cycle following said subsequent cycle.

34. In a combined summary punch and tabulator the combination of a series of tabulator type bars advanced to differential set positions, a series of normally locked punch set-up slides set differentially under control of said type bars, means to free certain of said set-up slides on a first cycle, means to free others of said set-up slides on a subsequent cycle and again on the cycle following said subsequent cycle, a punch unit, a normally locked card feed mechanism, means to free said card feed mechanism to feed a card into said punch unit on said subsequent cycle and also on the cycle following said subsequent cycle, means to operate said punch unit on the cycle following said subsequent cycle and also on the second cycle after said subsequent cycle, means to clear, during said subsequent cycle, certain of the set-up slides freed during said first cycle and all freed during said subsequent cycle, and means to clear, during the cycle following said subsequent cycle, the remainder of the slides freed on said first cycle and all the slides freed on the cycle following said subsequent cycle.

35. In a combined summary punch and tabulator, the combination of a series of tabulator type bars advanced to differential set positions, a series of normally locked punch set-up slides set differentially under control of said type bars, means to free certain of said set-up slides on a first cycle, means to free others of said set-up slides on a subsequent cycle and again on the cycle following said subsequent cycle, a punch unit, a normally locked card feed mechanism, means to free said card feed mechanism to feed a card into said punch unit on said subsequent cycle and also on the cycle following said subsequent cycle, means to operate said punch unit on the cycle following said subsequent cycle and also on the second cycle after said subsequent cycle, and means to clear the set-up slides.

36. In a combined summary punch and tabulator, the combination of a series of tabulator type bars advanced to differential set positions, a series of normally locked punch set-up slides set differentially under control of said type bars, means to free certain of said set-up slides on a plurality of successive cycles, a punch unit, a card feed mechanism to feed cards into said punch unit, and means to operate said punch unit on a plurality of successive cycles.

37. In a combined summary punch and tabulator the combination of a series of tabulator type bars advanced to differential set positions, a series of normally locked punch set-up slides set differentially under control of said type bars, means to free certain of said set-up slides on a plurality of successive cycles, a punch unit, a card feed mechanism to feed cards into said punch unit, means to operate said punch unit on a plurality of successive cycles, and means to clear said set-up slides between cycles.

38. In the primary set-up mechanism of a machine of the class described, the combination of a plurality of releasing bars each connected at each end to a slide, a power driven actuator, a plurality of interponents normally out of the path of said actuator, levers to connect the slides at each end of the releasing bars, each with one of said interponents, a plurality of setting levers, one for each of said interponents and adapted to set said interponent in the path of said actuator, a plurality of plungers selectively operable to actuate said setting levers, and means connecting each of said plungers with an interponent at each end of a releasing bar.

39. In the primary set-up mechanism of a machine of the class described, the combination of a releasing bar (478) connected at each end to a slide, a power driven actuator, an interponent for each of said slides, a lever to connect each slide with its interponent, a setting lever for each of said interponents and adapted to set said interponent in the path of said actuator, a plunger to actuate said setting levers, means connecting said plunger and levers, and an escapement for each of said interponents, said escapements retaining said interponents in the path of said actuator for a cycle following their release by the setting levers and then releasing them.

40. The combination of a gag bar, means to set said gag bar to numeric positions other than zero, a timed reciprocating bar, and a connection settable effective or ineffective between said bar and said gag bar, said reciprocating bar acting to advance said gag bar to zero position when said connection is set effective.

41. In a combined tabulator and summary punch the combination of a sensing bar advanced differentially under control of the tabulator, a gag bar normally in an inactive position and having a pawl and ratchet connection with said sensing bar to advance said gag bar to numeric positions other than zero on the return of said sensing bar, a timed reciprocating bar, and a connection settable effective and ineffective between said reciprocating bar and said gag bar, said reciprocating bar acting to advance said gag bar to zero position when said connection is effective and said gag bar is not advanced by said sensing bar.

42. In a combined tabulator and summary punch the combination of a sensing bar advanced from a normal position to numeric positions including zero under control of the tabulator, a gag bar normally in inactive position and having a pawl and ratchet connection with said sensing bar to advance said gag bar to numeric positions other than zero on the return of said sensing bar to its normal position, a timed reciprocating bar, and a connection settable effective and ineffective between said reciprocating bar and said gag bar, said reciprocating bar acting to advance said gag bar to zero position when said connection is effective and said gag bar is not advanced by said sensing bar.

43. The combination of a series of gag bars, means to set said gag bars to numeric positions other than zero, a timed reciprocating bar and connections selectively settable effective or ineffective between said bar and said gag bars, said reciprocating bar acting to advance said gag bars to zero position when said connections are set effective.

44. In a combined tabulator and summary punch the combination of a series of sensing bars advanced differentially under control of the tabulator, a series of gag bars normally in inactive position and having pawl and ratchet connections with said sensing bars to advance said gag bars to numeric positions other than zero on the return of said sensing bars, a timed reciprocating bar, and connectons selectively settable effective or ineffective between said reciprocating bar and said gag bars, said reciprocating bar acting to advance said gag bars to zero position when said connections are effective and said gag bars are not advanced by said sensing bars.

45. In a combined summary punch and tabulator the combination of a series of sensing bars advanced from a normal position to numeric positions including zero under control of the tabulator, a series of gag bars normally in inactive position and having pawl and ratchet connections with said sensing bars to advance said gag bars to numeric positions other than zero on the return of said sensing bars to normal position, a timed reciprocating bar, and connections selectively settable effective or ineffective between said reciprocating bar and said gag bars, said reciprocating bar acting to advance said gag bars to zero position when said connections are effective and said gag bars are not advanced by said sensing bars.

46. In a combined tabulator and summary punch the combination of a type bar in the tabulator, a sensing slide having an advance movement under control of said type bar, a gag bar having nine ratchet teeth for the numerals one to nine, said gag bar normally standing a certain distance beyond zero and said sensing bar normally standing an equal distance beyond the position to which it advances if the type bar stands at zero, a pawl on said sensing bar engaging the said ratchet teeth to advance said gag bar on the return of said sensing bar from a position greater than zero, and means settable active and inactive to advance said gag bar to zero position.

47. In a combined tabulator and summary punch the combination of a type bar in the tabulator, a sensing slide having an advance movement under control of said type bar, a gag bar having nine ratchet teeth for the numerals one to nine, said gag bar normally standing a certain distance beyond zero and said sensing bar normally standing an equal distance beyond the position to which it advances if the type bar stands at zero, a pawl on said sensing bar engaging the said ratchet teeth to advance said gag bar on the return of said sensing bar from a position greater than zero, a timed reciprocating bar, and a connection settable effective and ineffective between said reciprocating bar and said gag bar, said reciprocating bar acting to advance said gag bar to zero position when said connection is effective and said gag bar is not advanced by said sensing bar.

48. In a combined tabulator and summary punch the combination of a series of type bars having letter types interspersed with numeral types, sensing levers to sense the settings of said type bars, some of said sensing levers having an advance sensing movement greater than others by a distance equal to the spacing between a numeral and a letter type, and summary punch set up slides advanced to numeric positions under control of said sensing levers, those sensing levers having said greater advance movement permitting their associate slides to advance to the next higher numeric position when its type bar is set at one of said letter positions.

49. In a summary punch the combination of a series of slides advanced differentially to select the character to be punched, a normally locked card feed mechanism and a trip actuated by one or more of said slides to free said card feed mechanism.

50. In a combined tabulator and summary punch the combination of a series of slides advanced differentially under control of the tabulator, a card feed mechanism, a lock normally holding said card feed mechanism inactive, means controlled by the tabulator to trip said lock, a second lock normally holding said card feed inactive, and a trip for said second lock settable to be actuated by the advance of a selected one or ones of said slides.

51. In a summary punch the combination of a series of slides advanced differentially to select the character to be punched, a normally locked card feed mechanism, a trip to free said card feed mechanism including a universal bar, and settable pieces to connect said universal bar with selected ones of said slides to be actuated by the advance of the latter.

52. In a summary punch the combination of a series of slides advanced differentially to select the character to be punched, a card feed mechanism, a lock settable active and inactive to hold said card feed mechanism disabled, a trip to free said card feed mechanism from said lock when the latter is set active including a universal bar, and settable pieces to connect said universal bar with selected ones of said slides to be actuated by the advance of the latter.

53. In a summary punch the combination of a series of slides advanced differentially to select the character to be punched, a normally locked card feed mechanism, a trip to free said card feed mechanism, and cooperating settable pieces each settable to three positions, in one of which said piece connects its associate slide with said universal bar to actuate said bar by the advance of said slide, in the second of said positions said piece is inactive, and in the third of which positions said piece acts as a lock to prevent advance of its slide.

ANNA WHITTAKER.

*Administratrix of the Estate of John Mueller, Deceased.*

REFERENCES CITED

The following references are of record in the file of this patent:

UNITED STATES PATENTS

| Number | Name | Date |
|---|---|---|
| 2,010,642 | Pierce | Aug. 6, 1935 |
| 2,093,529 | Tauschek | Sept. 21, 1937 |
| 2,099,628 | Sampson | Nov. 16, 1937 |
| 2,244,790 | Maier | June 10, 1941 |
| 2,290,827 | Thomas | July 21, 1942 |
| 2,354,549 | Rindfleisch | July 25, 1944 |
| 2,381,361 | Mueller | Aug. 7, 1945 |